US011879097B2

(12) United States Patent
Miyazaki et al.

(10) Patent No.: US 11,879,097 B2
(45) Date of Patent: Jan. 23, 2024

(54) PHOTOCHROMIC COMPOUND, CURABLE COMPOSITION CONTAINING SAID PHOTOCHROMIC COMPOUND, AND OPTICAL ARTICLE

(71) Applicant: TOKUYAMA CORPORATION, Shunan (JP)

(72) Inventors: Masayuki Miyazaki, Tsukuba (JP); Junji Takenaka, Tsukuba (JP)

(73) Assignee: TOKUYAMA CORPORATION, Shunan (JP)

( * ) Notice: Subject to any disclaimer, the term of this patent is extended or adjusted under 35 U.S.C. 154(b) by 771 days.

(21) Appl. No.: 17/047,659

(22) PCT Filed: Apr. 15, 2019

(86) PCT No.: PCT/JP2019/016230
§ 371 (c)(1),
(2) Date: Oct. 14, 2020

(87) PCT Pub. No.: WO2019/203205
PCT Pub. Date: Oct. 24, 2019

(65) Prior Publication Data

US 2021/0032532 A1 Feb. 4, 2021

(30) Foreign Application Priority Data

Apr. 17, 2018 (JP) ................................ 2018-079303
Apr. 17, 2018 (JP) ................................ 2018-079468

(51) Int. Cl.
*C09K 9/02* (2006.01)
*C08G 18/72* (2006.01)
*C08L 83/06* (2006.01)
*C08G 65/332* (2006.01)
*C08G 77/14* (2006.01)
*C08K 5/1545* (2006.01)

(52) U.S. Cl.
CPC .............. *C09K 9/02* (2013.01); *C08G 18/722* (2013.01); *C08G 65/332* (2013.01); *C08G 77/14* (2013.01); *C08K 5/1545* (2013.01); *C08L 83/06* (2013.01); *C09K 2211/1088* (2013.01)

(58) Field of Classification Search
CPC C09K 9/02; C09K 2211/1088; C08G 18/722; C08G 65/332; C08G 77/14; C08K 5/1545; C08L 83/06
See application file for complete search history.

(56) References Cited

U.S. PATENT DOCUMENTS 5,961,892 A * 10/1999 Gemert ................ C07D 311/94 546/281.1
2006/0226400 A1 10/2006 Xiao et al.
2006/0226401 A1 10/2006 Xiao et al.
2011/0143141 A1 6/2011 He et al.
2011/0248415 A1 10/2011 Alvarez-Carrigan et al.
2011/0249235 A1 10/2011 Duis et al.
2012/0126185 A1 * 5/2012 He ...................... C07D 311/92 568/732
2012/0132870 A1 5/2012 Xiao et al.
2012/0136148 A1 * 5/2012 Lu ........................... G03C 1/73 549/382
2014/0054520 A1 2/2014 Takenaka et al.
2014/0154527 A1 6/2014 Izumi et al.
2015/0241601 A1 8/2015 Xiao et al.
2019/0048122 A1 2/2019 Kasori et al.
2019/0129067 A1 5/2019 Xiao et al.

FOREIGN PATENT DOCUMENTS

CN 101180575 A 5/2008
CN 101208621 A 6/2008
CN 103354813 A 10/2013
CN 103517899 A 1/2014
JP 2014-510718 A 5/2014
KR 10-2016-0000890 A 1/2016
KR 20160000890 A * 1/2016 .......... C08K 5/1545
WO WO 00/15630 A1 3/2000
WO WO 01/70719 A2 9/2001
WO WO 2004/041961 A1 5/2004
WO WO 2013/090220 A1 6/2013
WO WO 2014/152259 A1 9/2014
WO WO 2015/077177 A1 5/2015
WO WO 2017/047745 A1 3/2017

OTHER PUBLICATIONS

Extended European Search Report for corresponding European Application No. 19787775.6, dated Oct. 1, 2021.
International Search Report for PCT/JP2019/016230 (PCT/ISA/210) dated Jul. 2, 2019.
Written Opinion of the International Searching Authority for PCT/JP2019/016230 (PCT/ISA/237) dated Jul. 2, 2019.
Chinese Office Action and Search Report for corresponding Chinese Application No. 201980026159.1, dated Apr. 28, 2023.

* cited by examiner

*Primary Examiner* — Bijan Ahvazi
(74) *Attorney, Agent, or Firm* — Birch, Stewart, Kolasch & Birch, LLP

(57) ABSTRACT

The invention is a photochromic compound having an indenonaphthopyran skeleton, and the indenonaphthopyran skeleton has an alkenyl group having 10 to 30 carbon atoms, and an oligomer chain group A having 3 or more recurring units selected from a polyalkylene oxide oligomer chain group, a polyester oligomer chain group, a polysiloxane chain group and a polyester polyether oligomer chain group. The invention can provide a photochromic compound capable of expressing excellent photochromic characteristics in various cured products and capable of preventing cured products from becoming cloudy.

13 Claims, No Drawings

PHOTOCHROMIC COMPOUND, CURABLE COMPOSITION CONTAINING SAID PHOTOCHROMIC COMPOUND, AND OPTICAL ARTICLE

TECHNICAL FIELD

The present invention relates to a novel photochromic compound, a novel photochromic curable composition containing the photochromic compound, and an optical article.

BACKGROUND ART

A photochromic compound typified by a chromene compound, a fulgide compound and a spirooxazine compound has such characteristics (photochromic performance) that it rapidly changes its color when irradiated with light including UV rays such as sunlight or light from a mercury lamp, and when photoirradiation is stopped and the compound is kept in a dark place, it restores to the original color, and taking advantage of the characteristics, the compound is used in various applications especially for optical materials.

For example, a photochromic eyeglass lens that uses a photochromic compound and is given a photochromic performance rapidly colors in an outdoor area where it is irradiated with light including UV rays such as sunlight, and functions as sunglasses, but in an indoor area with no such photoirradiation, it discolors and functions as transparent ordinary eyeglasses, and a demand for such a photochromic eyeglass lens is increasing these days.

For imparting photochromic performance to an optical material, in general, a photochromic compound is used along with a plastic material, and specifically the following methods are known.

(a) A method of dissolving a photochromic compound is in a compound and polymerizing it to directly form an optical material such as a lens. The method is called a kneading method.

(b) A method of providing a resin layer containing a photochromic compound dispersed therein, on the surface of a plastic shaped article such as a lens, by coating or casting polymerization. The method is called a lamination method.

(c) A method of bonding two optical sheets via an adhesive layer formed of an adhesive resin containing a photochromic compound dispersed therein. The method is called a binder method.

Optical materials such as optical articles given photochromic performance are further required to have the following characteristics.

(I) Low degree of coloration in a visible light region before irradiation with UV rays (initial coloration).

(II) High degree of coloration in irradiation with UV rays (coloration density).

(III) High rate to be restored to the original state after stopping irradiation with UV rays (decoloration rate).

(IV) Good recurring durability for reversible action of coloration to decoloration.

(V) High storage stability.

(VI) Easy shapability to various forms.

Heretofore various photochromic compounds have been reported, and it is reported that some photochromic compounds even having good optical responsivity in a liquid matrix tend to have poor optical responsivity in a solid matrix and to have a long decoloration half-value period. This is considered to be because a free space is overwhelmingly small in a solid matrix as compared with that in a liquid matrix, and therefore the structural change of a photochromic compound would be restricted in a solid matrix. As a method for solving the problem, a photochromic compound that may be nano-encapsulated is proposed. Specifically recently a photochromic compound having an oligomer chain group such as a polyalkleneoxy oligomer chain group or a polysiloxane oligomer chain group (hereinafter referred to as a polymeric photochromic compound) has been disclosed. It is reported that such a polymeric photochromic compound has a low matrix dependency and therefore exhibits excellent optical responsivity even in a solid matrix (see PTLs 1 and 2).

The above-mentioned polymeric photochromic compound is a technique that has drawn attention recently but it is known that a cured product containing a polymeric photochromic compound becomes cloudy. As a solution, it is known that a (thio)urethane-based lens can be made to express photochromic characteristics by controlling the equivalent ratio of the functional groups in the isocyanate compound and the difunctional alcohol and, in addition, the lens can be prevented from becoming cloudy (see PTL 3).

CITATION LIST

Patent Literature

PTL 1: WO2004/041961
PTL 2: WO2000/015630
PTL 3: WO2017/047745

SUMMARY OF INVENTION

Technical Problem

As described above, a polymeric photochromic compound expresses high photochromic characteristics in each matrix. On the other hand, however, it is known that the resultant photochromic cured product becomes cloudy which appears to be caused by aggregation of a polymeric photochromic compound during curing.

On the other hand, a low-molecular photochromic compound not having an oligomer chain group does not aggregate in a solid matrix and can give a transparent photochromic cured product. However, it has a high matrix dependency and therefore has a problem in point of the decoloration rate in a solid matrix.

In addition, both a polymeric photochromic compound and a low-molecular photochromic compound are desired to be rapidly soluble in a monomer composition that is to be a substrate for optical articles, from the viewpoint of production of photochromic cured products.

As described above, recently, it has become desired to develop a photochromic compound capable of expressing photochromic characteristics not depending on a matrix, excellent in solubility in a monomer composition to be a substrate for optical articles, and capable of stably dispersing and existing but not aggregating in a process of optical substrate formation (during curing).

Accordingly an object of the present invention is to provide a photochromic compound having the above-mentioned effects.

Solution to Problem

The present inventors have made assiduous studies for solving the above-mentioned problems. With that, the inventors have investigated for introduction of various substituents into a polymeric photochromic compound capable of exhibiting excellent photochromic characteristics in a solid matrix, in order that the compound can highly disperse in a matrix. As a result, the inventors have found that a polymeric photochromic compound having an alkenyl group having 10 to 30 carbon atoms is useful for solving the above-mentioned problems. Specifically the inventors have found that, by introducing an alkenyl group having 10 to 30 carbon atoms into a polymeric photochromic compound, the resultant compound can maintain photochromic characteristics in a solid matrix and can show excellent solubility in a monomer composition, and is suppressed from aggregating during curing, and have completed the present invention.

Namely a first aspect of the present invention is:

a photochromic compound having an indenonaphthopyran moiety in which:

the indenonaphthopyran moiety has:

an alkenyl group having 10 to 30 carbon atoms, and an oligomer chain group A having 3 or more recurring units selected from a polyalkylene oxide oligomer chain group, a polyester oligomer chain group, a polysiloxane chain group and a polyester polyether oligomer chain group.

A second aspect of the present invention is a photochromic curable composition containing the photochromic compound of the first aspect of the present invention and a polymerizable compound.

A third aspect of the present invention is a photochromic optical article produced by polymerizing the photochromic curable composition of the second aspect of the present invention.

A fourth aspect of the present invention is a polymeric molded article containing, as dispersed therein, the photochromic compound of the first aspect of the present invention.

A fifth aspect of the present invention is an optical article coated with a polymeric film containing, as dispersed therein, the photochromic compound of the first aspect of the present invention.

Advantageous Effects of Invention

The photochromic compound of the present invention exhibits excellent photochromic characteristics in a polymeric matrix. In the case where an already-existing photochromic compound is used, there may often occur a problem that a cured product becomes cloudy but when the photochromic compound of the present invention is used, a photochromic cured product that has good photochromic characteristics and mechanical characteristics and is transparent can be produced.

DESCRIPTION OF EMBODIMENTS

The photochromic compound of the present invention is a photochromic compound characterized by having an indenonaphthopyran moiety in which the indenonaphthopyran moiety has an alkenyl group having 10 to 30 carbon atoms, and an oligomer chain group A having 3 or more recurring units selected from a polyalkylene oxide oligomer chain group, a polyester oligomer chain group, a polysiloxane chain group and a polyester polyether oligomer chain group.

In the photochromic compound of the present invention, the number of the indenonaphthopyran moieties is not specifically limited so far as it is at least one or more. Above all, in consideration of the productivity the photochromic characteristics and the solubility of the photochromic compound of the present invention, the number of the indenonaphthopyran moieties is preferably 1 to 10, more preferably 1 to 6, even more preferably 1 to 4, most preferably 1 to 2.

In the case where the compound has plural indenonaphthopyran moieties, the indenonaphthopyran moieties may have the same structure or each may have a different structure. In the present invention, having 3 or more recurring units means that the group has "3 or more bonding moieties having the same composition". Specifically the polyalkylene oxide oligomer chain group having 3 or more recurring units is a group represented by the following formula:

$$—(R—O)_s—$$

wherein R represents an alkylene group, and s indicates a recurring unit and is 3 or more.

In the case where the number of the recurring units is less than 3 in the oligomer chain group A, excellent photochromic characteristics cannot be attained in a solid matrix, and therefore such is unfavorable. The upper limit of the number of the recurring units is not specifically limited, and can be appropriately determined depending on the photochromic characteristics of the intended photochromic compound. In consideration of the productivity of the photochromic compound itself of the present invention and of the photochromic characteristics thereof, the recurring number of the oligomer chains is preferably less than 200, more preferably 3 to 170, even more preferably 10 to 150, most preferably 15 to 80.

In the case where the average molecular weight of the oligomer chain group A is small (where the oligomer chain length is short), the matrix dependency-reducing effect tends to lower. This is presumed to be because nanocapsules to encapsulate the photochromic compound would be difficult to form or the size of nanocapsules would be small so that a free space could not be sufficiently secured. On the other hand, when the average molecular weight is large, the proportion of the photochromic compound per unit weight reduces and the coloration density tends to be insufficient. Consequently the amount of the photochromic compound to be added needs to be increased. The average molecular weight of the oligomer chain group A is, though not specifically limited, in consideration of the above-mentioned situations, preferably 300 to 30,000, more preferably 350 to 25,000, even more preferably 400 to 20,000, especially preferably 440 to 15,000.

In the photochromic compound of the present invention, the number of the oligomer chain groups A is not specifically limited, and may be at least one in one molecule of the photochromic compound. Above all, in consideration of the productivity and the photochromic characteristics of the photochromic compound itself of the present invention the number of the oligomer chain groups A in one molecule of the photochromic compound is preferably 1 to 10, more preferably 1 to 5. Also preferably the number of the oligomer chain groups A in one indenonaphthopyran moiety is preferably 0.25 to 6, more preferably 0.25 to 3, even more preferably 0.5 to 2. Above all, in consideration of the productivity and the photochromic characteristics of the photochromic compound of the present invention, the number is preferably 0.5 to 1. The case where the number of the oligomer chain groups A in one indenonaphthopyran moiety is 0.5 corresponds to a case where the indenonaphthopyran moiety is present at both terminals of the oligomer chain group A. In the case where the compound has plural oligomer chain groups A, the oligomer chain groups A may be the same groups or different groups. However, in consideration of the productivity of the photochromic compound of the present invention, preferably the groups are the same. In consideration of the photochromic characteristics thereof, the group is most preferably a polyalkylene oxide oligomer chain group or a polysiloxane oligomer chain group.

In consideration of the productivity and the photochromic characteristics of the photochromic compound of the present invention, preferably the oligomer chain group A substitutes at the 3-position, 6-position, 7-position, 11-position or 13-position of the indenonaphthopyran moiety.

In the present invention, the number of the alkenyl groups having 10 to 30 carbon atoms or the groups having an alkenyl group having 10 to 30 carbon atoms at the terminal thereof is not specifically limited, and may be at least one in the photochromic compound, and can be appropriately varied depending on the kind and the molecular weight of the oligomer chain group A and on the number of the substituents. Above all, in consideration of the productivity and the photochromic characteristics of the photochromic compound itself of the present invention and of the capability of suppressing the photochromic cured product that is produced using the compound from becoming cloudy the number of the alkenyl groups having 10 to 30 carbon atoms or the groups having an alkenyl group having 10 to 30 carbon atoms at the terminal thereof is preferably 1 to 12 in one oligomer chain group A, more preferably 1 to 6, even more preferably 1 to 4, most preferably 1 to 2.

In the present invention, among the alkenyl groups having 10 to 30 carbon atoms or the groups having an alkenyl group having 10 to 30 carbon atoms at the terminal thereof, one capable of exhibiting an especially excellent effect is preferably a group in which the moiety of the alkenyl group has 15 to 25 carbon atoms, more preferably 15 to 20 carbon atoms. Above all, in consideration of the productivity of the photochromic compound, an oleyl group having 18 carbon atoms, or a group having an oleyl group having 18 carbon atoms at the terminal thereof is preferred.

The alkenyl group having 10 to 30 carbon atoms or the group having an alkenyl group having 10 to 30 carbon atoms at the terminal thereof may be present on the oligomer chain group A. In the indenonaphthopyran moiety, the group may be present at a position different from the oligomer chain group A. The group may be present in both the two. In the case where the group is present on the oligomer chain group A, preferably the alkenyl group having 10 to 30 carbon atoms is introduced into the terminal of the oligomer chain group A. Above all, in consideration of the photochromic characteristics and the productivity of the photochromic compound itself of the present invention, the group is present at a position different from the oligomer chain group A. The position at which the alkenyl group having 10 to 30 carbon atoms is present is not specifically limited, but in consideration of the productivity of the photochromic compound itself of the present invention, preferably the group substitutes at the 3-position, 6-position, 7-position, 11-position or 13-position of the indenonaphthopyran moiety.

<Preferred Photochromic Compound>

In the photochromic compound of the present invention, preferably, the indenonaphthopyran moiety is a structure represented by the following formula (1):

(1)

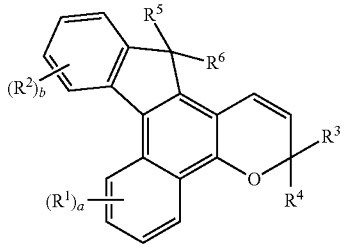

Hereinunder the photochromic compound having the moiety may be simply referred to as a "chromene compound".

<Regarding a, b>

In the formula (1), a represents the number of $R^1$'s. b represents the number of $R^2$'s. With that, a is an integer of 0 to 4, b is an integer of 0 to 4, in the case where a is 2 to 4, plural $R^1$'s may be the same or different, in the case where b is 2 to 4, plural $R^2$'s may be the same or different.

<In the Case where a and b Each are 2 or More>

In the case where a is 2 to 4 and the compound has neighboring $R^1$'s, the neighboring $R^1$'s may form together and along with the carbon atom bonding to these $R^1$'s, a ring optionally containing an oxygen atom, a sulfur atom, a carbon atom or a nitrogen atom, and further the ring may have a substituent. The ring may have 2 or more atoms of an oxygen atom, a sulfur atom, a carbon atom or a nitrogen atom at the same time. Combinations of the neighboring $R^1$'s include the 5-position and the 6-position, or the 6-position and the 7-position, or the 7-position and the 8-position of the chromene compound.

In the case where b is 2 to 4 and the compound has neighboring $R^2$'s, the neighboring $R^2$'s may form together and along with the carbon atom bonding to these $R^2$'s, a ring optionally containing an oxygen atom, a sulfur atom, a carbon atom or a nitrogen atom, and further the ring may have a substituent. The ring may have 2 or more atoms of an oxygen atom, a sulfur atom, a carbon atom or a nitrogen atom at the same time. Combinations of the neighboring $R^2$'s include the 9-position and the 10-position, or the 10-position and the 11-position, or the 11-position and the 12-position of the chromene compound.

At least one oligomer chain group A needs to bond to the indenonaphthopyran moiety represented by the formula (1). Namely at least one of $R^1$, $R^2$, $R^3$, $R^4$, $R^5$, and $R^6$ may be the oligomer chain group A (or a group having the oligomer chain group A).

Specific substituents are described sequentially below. A preferred number and a preferred kind of the indenonaphthopyran moiety represented by the formula (1), and a preferred number and a preferred kind of the oligomer chain group A are the same as those described hereinabove.

<$R^1$, and $R^2$>

Preferably $R^1$ and $R^2$ each are independently the above-mentioned oligomer chain group A having 3 or more recurring units, the above-mentioned alkenyl group having 10 to 30 carbon atoms, a group having an alkenyl group having 10 to 30 carbon atoms at the terminal thereof, a hydroxy group, an alkyl group, a haloalkyl group, a cycloalkyl group optionally having a substituent, an alkoxy group, an amino group, a substituted amino group, a heterocyclic group optionally having a substituent, a cyano group, a halogen atom, an alkylthio group, an arylthio group optionally having a substituent, a nitro group, a formyl group, a hydroxycarbonyl group, an alkylcarbonyl group, an alkoxycarbonyl group, an aralkyl group optionally having a substituent, an aralkoxy group optionally having a substituent, an aryloxy group optionally having a substituent, an aryl group optionally having a substituent, a heteroaryl group optionally having a substituent, a thiol group, an alkoxyalkylthio group, a haloalkylthio group, or a cycloalkylthio group optionally having a substituent.

The alkyl group that $R^1$ and $R^2$ can take is, though not specifically limited, preferably an alkyl group having 1 to 6 carbon atoms. Preferred examples of the alkyl group having 1 to 6 carbon atoms include a methyl group, an ethyl group, an n-propyl group, an isopropyl group, an n-butyl group, an s-butyl group, a t-butyl group, a pentyl group and a hexyl group.

The haloalkyl group is, though not specifically limited, preferably a haloalkyl group having 1 to 6 carbon atoms. The haloalkyl group having 1 to 6 carbon atoms is preferably an alkyl group substituted with a fluorine atom, a chlorine atom or a bromine atom. Preferred examples of the haloalkyl group include a trifluoromethyl group, a tetrafluoroethyl group, a chloromethyl group, a 2-chloroethyl group, and a bromomethyl group.

The cycloalkyl group is, though not specifically limited, preferably a cycloalkyl group having 3 to 8 carbon atoms (a cycloalkyl group having 3 to 8 ring carbon atoms). Examples of the cycloalkyl group having 3 to 8 carbon atoms include a cyclopropyl group a cyclobutyl group, a cyclopentyl group, and a cyclohexyl group. The cycloalkyl group may have a substituent, but the number of the carbon atoms mentioned above (3 to 8 carbon atoms) does not include the number of the carbon atoms of the substituent.

The alkoxy group is, though not specifically limited, preferably an alkoxy group having 1 to 6 carbon atoms. Preferred examples of the alkoxy group having 1 to 6 carbon atoms include a methoxy group, an ethoxy group, an n-propoxy group, an isopropoxy group, an n-butoxy group, an s-butoxy group, and a t-butoxy group.

The amino group is a primary amino group ($—NH_2$), and the substituted amino group is a secondary or tertiary amino group in which one or two hydrogen atoms are substituted. The substituent that the substituted amino group has includes, though not specifically limited, the above-mentioned oligomer chain group A, the above-mentioned alkenyl group having 10 to 30 carbon atoms, an alkyl group having 1 to 6 carbon atoms, a haloalkyl group having 1 to 6 carbon atoms, an alkoxy group having 1 to 6 carbon atoms, a cycloalkyl group having 3 to 7 carbon atoms, an aryl group having 6 to 14 carbon atoms, and a heteroaryl group having 4 to 14 carbon atoms. Preferred examples of the amino group include an amino group, a methylamino group, a dimethylamino group, an ethylamino group, a diethylamino group, a phenylamino group, and a diphenylamino group.

The heterocyclic group optionally having a substituent is preferably a heterocyclic group having 3 to 10 carbon atoms. Specifically, examples thereof include an aliphatic heterocyclic group such as a morpholino group, a piperidino group, a pyrrolidinyl group, a piperazino group, and an N-methylpiperazino group; and an aromatic heterocyclic group such as an indolinyl group. Naturally the heterocyclic group may have a substituent, and preferred substituents include the above-mentioned oligomer chain group A, the above-mentioned alkenyl group having 10 to 30 carbon atoms, and an alkyl group having 1 to 6 carbon atoms. Preferred examples of the heterocyclic group having a substituent include a 2,6-dimethylmorpholino group, a 2,6-dimethylpiperidino group, and a 2,2,6,6-tetramethylpiperidinogroup.

Examples of the halogen atom include a fluorine atom, a chlorine atom, a bromine atom, and an iodine atom.

The alkylthio group is, though not specifically limited, preferably an alkylthio group having 1 to 6 carbon atoms. The alkylthio group having 1 to 6 carbon atoms includes a methylthio group, an ethylthio group, an n-propylthio group, an isopropylthio group, an n-butylthio group, an s-butylthio group, and a t-butylthio group.

The arylthio group optionally having a substituent is, though not specifically limited, preferably an arylthio group having 6 to 10 carbon atoms. The arylthio group having 6 to 10 carbon atoms includes a phenylthio group, a 1-naphthylthio group, and a 2-naphthylthio group. Naturally the arylthio group may have a substituent. Preferred substituents include the above-mentioned oligomer chain group A, the above-mentioned alkenyl group having 10 to 30 carbon atoms, an alkyl group having 1 to 6 carbon atoms, and the above-mentioned group having an alkenyl group having 10 to 30 carbon atoms at the terminal thereof.

The group having an alkenyl group having 10 to 30 carbon atoms at the terminal thereof is preferably an oxyalkenyl group, a monoalkylene glycol oxyalkenyl group, or a dialkylene glycol oxyalkenyl group. (In these three groups, the terminal alkenyl group has 10 to 30 carbon atoms. Hereinunder these three groups may be simply referred to as “terminal alkenyl groups”.) The alkylene glycol moiety is preferably an ethylene glycol or a propylene glycol. The group having an alkenyl group having 10 to 30 carbon atoms at the terminal thereof may be the above-mentioned oligomer chain group A in which the terminal is the above-mentioned “terminal alkenyl group”. Among the groups having an alkenyl group having 10 to 30 carbon atoms at the terminal thereof, when a preferred group is represented by a general formula, the group can be represented by, for example, “$—O—(R^{16}O)_n—R^{17}$”. $R^{16}$ represents an alkylene group having 1 to 10 carbon atoms, preferably an alkylene group having 2 to 3 carbon atoms. $R^{17}$ represents an alkenyl group having 10 to 30 carbon atoms. n represents an integer of 0 to 2.

The alkylcarbonyl group is, though not specifically limited, preferably an alkylcarbonyl group having 2 to 7 carbon atoms. The alkylcarbonyl group having 2 to 7 carbon atoms includes an acetyl group and an ethylcarbonyl group.

The alkoxycarbonyl group is, though not specifically limited, preferably an alkoxycarbonyl group having 2 to 7 carbon atoms. The alkoxycarbonyl group having 2 to 7 carbon atoms includes a methoxycarbonyl group and an ethoxycarbonyl group.

The aralkyl group optionally having a substituent is, though not specifically limited, preferably an aralkyl group having 7 to 11 carbon atoms. The aralkyl group having 7 to 11 carbon atoms includes a benzyl group, a phenylethyl group, a phenylpropyl group, a phenylbutyl group, and a naphthylmethyl group. Naturally the aralkyl group may have a substituent. Preferred substituents include the above-mentioned oligomer chain group A, the above-mentioned alkenyl group having 10 to 30 carbon atoms, an alkyl group having 1 to 6 carbon atoms, and the above-mentioned group having an alkenyl group having 10 to 30 carbon atoms at the terminal thereof.

The aralkoxy group optionally having a substituent is, though not specifically limited, preferably an aralkoxy group having 7 to 11 carbon atoms. The aralkoxy group having 7 to 11 carbon atoms includes a benzyloxy group, and a naphthylmethoxy group. Naturally the aralkoxy group may have a substituent. Preferred substituents include the above-mentioned oligomer chain group A, the above-mentioned alkenyl group having 10 to 30 carbon atoms, an alkyl group having 1 to 6 carbon atoms, and the above-mentioned group having an alkenyl group having 10 to 30 carbon atoms at the terminal thereof.

The aryloxy group optionally having a substituent is, though not specifically limited, preferably an aryloxy group having 6 to 12 carbon atoms. The aryloxy group having 6 to 12 carbon atoms includes a phenyloxy group, and a naphthyloxy group. Naturally the aryloxy group may have a substituent. Preferred substituents include the above-mentioned oligomer chain group A, the above-mentioned alkenyl group having 10 to 30 carbon atoms, an alkyl group having 1 to 6 carbon atoms, and the above-mentioned group having an alkenyl group having 10 to 30 carbon atoms at the terminal thereof.

The aryl group optionally having a substituent is, though not specifically limited, preferably an aryl group having 6 to 12 carbon atoms. The aryl group having 6 to 12 carbon atoms includes a phenyl group, a 1-naphthyl group and a 2-naphthyl group. Naturally the aryl group may have a substituent. Preferred substituents include the above-mentioned oligomer chain group A, the above-mentioned alkenyl group having 10 to 30 carbon atoms, an alkyl group having 1 to 6 carbon atoms, and the above-mentioned group having an alkenyl group having 10 to 30 carbon atoms at the terminal thereof.

The heteroaryl group optionally having a substituent is, though not specifically limited, preferably a heteroaryl group having 3 to 12 carbon atoms. The heteroaryl group having 3 to 12 carbon atoms having a thienyl group, a furyl group, a pyrrolinyl group, a pyridyl group, a benzothienyl group, a benzofuranyl group, and a benzopyrrolinyl group. Naturally the heteroaryl group may have a substituent. Preferred substituents include the above-mentioned oligomer chain group A, the above-mentioned alkenyl group having 10 to 30 carbon atoms, an alkyl group having 1 to 6 carbon atoms, and the above-mentioned group having an alkenyl group having 10 to 30 carbon atoms at the terminal thereof.

The alkoxyalkylthio group is, though not specifically limited, preferably an alkoxyalkylthio group having 2 to 9 carbon atoms. The alkoxyalkylthio group having 2 to 9 carbon atoms includes a methoxymethylthio group, a methoxyethylthio group, a methoxy-n-propylthio group, a methoxy-n-butylthio group, an ethoxyethylthio group, and an n-propoxypropylthio group.

The haloalkylthio group is, though not specifically limited, preferably a haloalkylthio group having 1 to 6 carbon atoms. The haloalkylthio group having 1 to 6 carbon atoms includes a trifluoromethylthio group, a tetrafluoroethylthio group, a chloromethylthio group, a 2-chloroethylthio group, and a bromomethylthiogroup.

The cycloalkylthio group is, though not specifically limited, preferably a cycloalkylthio group having 3 to 8 carbon atoms. The cycloalkylthio group having 3 to 8 carbon atoms includes a cyclopropylthio group, a cyclobutylthio group, a cyclopentylthio group, and a cyclohexylthio group. The cycloalkylthio group may have a substituent, but the carbon number (3 to 8 carbon atoms) of the group does not include the carbon number of the substituent.

The cycloalkyl group, the arylthio group, the aralkyl group, the aralkoxy group, the aryloxy group, the aryl group, the heteroaryl group and the cycloalkylthio group may be unsubstituted. In the case where these groups have a substituent, 1 to 8 hydrogen atoms in the group to form a ring, preferably 1 to 4 hydrogen atoms therein is preferably substituted with a substituent selected from the above-mentioned oligomer chain group A, the above-mentioned alkenyl group having 10 to 30 carbon atoms, a group having an alkenyl group having 10 to 30 carbon atoms at the terminal, a hydroxy group, an alkyl group having 1 to 6 carbon atoms, a haloalkoxy group having 1 to 6 carbon atoms, a cycloalkyl group having 3 to 8 carbon atoms, an alkoxy group having 1 to 6 carbon atoms, an amino group, a substituted amino group, a heterocyclic group having 3 to 8 carbon atoms, a cyano group, a nitro group and a halogen atom. Specific examples of these substituents include the same groups as those mentioned hereinabove.

The carbon number of the aralkyl group, the aralkoxy group, the aryloxy group, the aryl group and the heteroaryl group does not includes the carbon number of the substituent.

In the case where a and b each are 2 or more, neighboring $R^1$'s and $R^2$'s each independently can form a cyclic group optionally containing an oxygen atom, a sulfur atom, a carbon atom or a nitrogen atom. The cyclic group is, though not specifically limited, preferably a ring having 5 to 7 ring atoms including the carbon atom to which $R^1$ and $R^2$ bond. The ring may optionally have a substituent, and the substituent may be a substituent selected from the above-mentioned oligomer chain group A, the above-mentioned alkenyl group having 10 to 30 carbon atoms, a group having an alkenyl group having 10 to 30 carbon atoms at the terminal thereof, a hydroxy group, an alkyl group having 1 to 6 carbon atoms, a haloalkyl group having 1 to 6 carbon atoms, a cycloalkyl group having 3 to 8 carbon atoms, an alkoxy group having 1 to 6 carbon atoms, an amino group, a substituted amino group, a heterocyclic group having 3 to 8 carbon atoms, a cyano group, a nitro group and a halogen atom. Specific examples of these substituents include the same groups as those mentioned hereinabove. Among them, a ring represented by a formula (3) to be mentioned hereinunder is preferred.

<Especially Preferred $R^1$ and $R^2$>

Among the above-mentioned groups, in consideration of the coloration tone and the coloration density of the resultant photochromic compound and of the presence or absence of cloudiness of the resultant cured product, $R^1$ and $R^2$ are preferably the above-mentioned oligomer chain group A, the above-mentioned alkenyl group having 10 to 30 carbon atoms, a group having an alkenyl group having 10 to 30 carbon atoms at the terminal thereof, the above-mentioned alkyl group, the above-mentioned alkoxy group, the above-mentioned heterocyclic group optionally having a substituent, the above-mentioned aryl group optionally having a substituent, or the above-mentioned arylthio group optionally having a substituent. Also preferably neighboring $R^1$'s or neighboring $R^2$'s together bond to be a ring-forming group. The substituent for the group optionally having a substituent may be the above-mentioned oligomer chain group A or the above-mentioned alkenyl group having 10 to 30 carbon atoms.

<$R^3$ and $R^4$>

$R^3$ and $R^4$ each independently represent an aryl group optionally having a substituent, or a heteroaryl group optionally having a substituent.

The substituent each independently includes a substituent selected from the above-mentioned oligomer chain group A, the above-mentioned alkenyl group having 10 to 30 carbon atoms, a hydroxy group, an alkyl group having 1 to 6 carbon atoms, a haloalkyl group having 1 to 6 carbon atoms, a cycloalkyl group having 3 to 8 carbon atoms, an alkoxy group having 1 to 6 carbon atoms, an amino group, a heterocyclic group, a cyano group, a halogen atom, an alkylthio group having 1 to 6 carbon atoms, an arylthio group having 6 to 10 carbon atoms optionally having a substituent, a nitro group, and a group having an alkenyl group having 10 to 30 carbon atoms at the terminal thereof. Specific examples of these substituents include the groups specifically exemplified for <$R^1$ and $R^2$> hereinabove. Above all, the above-mentioned oligomer chain group A or a group having an alkenyl group having 10 to 30 carbon atoms at the terminal thereof is preferred.

The substituent for the aryl group and the heteroaryl group is, especially from the viewpoint of exhibiting excellent photochromic characteristics, preferably a group selected from the above-mentioned oligomer chain group A, the above-mentioned alkenyl group having 10 to 30 carbon atoms, the above-mentioned alkyl group, the above-mentioned alkoxy group, the above-mentioned amino group, the above-mentioned substituted amino group, the above-mentioned heterocyclic group, the above-mentioned halogen atom, the above-mentioned arylthio group, and a group having an alkenyl group having 10 to 30 carbon atoms at the terminal. Specific examples of these substituents include the groups specifically exemplified for <$R^1$ and $R^2$> hereinabove.

<$R^5$ and $R^6$>

$R^5$ and $R^6$ each independently represent the above-mentioned alkenyl group having 10 to 30 carbon atoms, a group having an alkenyl group having 10 to 30 carbon atoms at the terminal thereof, the above-mentioned oligomer chain group A, a hydrogen atom, a hydroxy group, an alkyl group, a haloalkyl group, a cycloalkyl group, an alkoxy group, an alkoxyalkyl group, a formyl group, a hydroxycarbonyl group, an alkylcarbonyl group, an alkoxycarbonyl group, a halogen atom, an aralkyl group optionally having a substituent, an aralkoxy group optionally having a substituent, an aryloxy group optionally having a substituent, an aryl group optionally having a substituent and a heterocyclic group optionally having a substituent. These substituents include the same groups as those already described hereinabove in the section of <$R^1$ and $R^2$>.

$R^5$ and $R^6$ may together form, along with the 13-positioned carbon atom in the indenonaphthopyran moiety to which they bond, an aliphatic ring having 3 to 20 ring carbon atoms, a condensed polycyclic ring formed by condensation of the aliphatic ring with an aromatic ring or an aromatic hetero ring, a hetero ring having 3 to 20 ring atoms, or a condensed polycyclic ring formed by condensation of the hetero ring with an aromatic ring or an aromatic hetero ring. These rings may have a substituent. Also they may form, along with the 13-positioned carbon atom in the indenonaphthopyran moiety to which they bond, an aliphatic hydrocarbon ring having 3 to 20 ring carbon atoms, a condensed polycyclic ring formed by condensation of the aliphatic hydrocarbon ring with an aromatic ring or an aromatic hetero ring, a hetero ring having 3 to 20 ring atoms, or a condensed polycyclic ring formed by condensation of the hetero ring with an aromatic hydrocarbon ring or an aromatic hetero ring. Naturally the carbon number and the atom number in the cyclic ring each indicate the number of ring-forming carbon atoms and the number of ring-forming atoms, respectively and do not include the carbon number or the atom number in the substituent.

Examples of the aliphatic ring include a cyclopentane ring, a cyclohexane ring, a cyclooctane ring, a cycloheptane ring, a norbornane ring, a bicyclononane ring, an adamantane ring, and a spirodicyclohexane ring.

Examples of the condensed polycyclic ring formed by condensation of the aliphatic ring with an aromatic ring or an aromatic hetero ring include a phenanthrene ring. Examples of the hetero ring include a thiophene ring, a furan ring, and a pyridine ring. Examples of the condensed polycyclic ring formed by condensation of the hetero ring with an aromatic ring or an aromatic hetero ring include a phenylfuran ring and a biphenylthiophene ring.

The above-mentioned aliphatic ring, the above-mentioned condensed polycyclic ring formed by condensation of the aliphatic ring with an aromatic ring or an aromatic hetero ring, the above-mentioned hetero ring, or the above-mentioned condensed polycyclic ring formed by condensation of the hetero ring with an aromatic ring or an aromatic hetero ring may have a substituent. The substituent that may be on the ring (or condensed polycyclic ring) includes substituents selected from the above-mentioned oligomer chain group A, the above-mentioned alkenyl group having 10 to 30 carbon atoms, an alkyl group having 1 to 6 carbon atoms, a haloalkyl group having 1 to 6 carbon atoms, a cycloalkyl group having 3 to 8 carbon atoms, an alkoxy group having 1 to 6 carbon atoms, an amino group, a substituted amino group, and a halogen atom. These substituents include the same groups as those already described hereinabove in the section of <$R^1$ and $R^2$>.

Among the substituents on these rings, preferred groups with which the chromene compound of the present invention can exhibit an excellent effect include an alkyl group having 1 to 6 carbon atoms, a cycloalkyl group, a haloalkyl group having 1 to 6 carbon atoms, and an alkoxy group having 1 to 6 carbon atoms. Specific examples of these substituents include the groups exemplified hereinabove for <$R^1$ and $R^2$>.

<Especially preferred $R^5$ and $R^6$>

$R^5$ and $R^6$ each independently represent the above-mentioned oligomer chain group A, the above-mentioned alkenyl group having 10 to 30 carb on atoms, a group having an alkenyl group having 10 to 30 carbon atoms at the terminal thereof, a hydrogen atom, a hydroxy group, an alkyl group, a haloalkyl group, a cycloalkyl group, an alkoxy group, an alkoxyalkyl group, a formyl group, a hydroxycarbonyl group, an alkylcarbonyl group, an alkoxycarbonyl group, a halogen atom, an aralkyl group optionally having a substituent, an aralkoxy group optionally having a substituent, an aryloxy group optionally having a substituent, or a heterocyclic group optionally having a substituent. Specific examples of these substituents include the groups specifically exemplified hereinabove for <$R^1$ and $R^2$>.

Two of $R^5$'s and $R^6$'s may together form, along with the 13-positioned carbon atom in the indenonaphthopyran moiety to which they bond, an aliphatic ring having 3 to 20 ring carbon atoms, a condensed polycyclic ring formed by condensation of the aliphatic ring with an aromatic ring or an aromatic hetero ring, a hetero ring having 3 to 20 ring atoms, or a condensed polycyclic ring formed by condensation of the hetero ring with an aromatic ring or an aromatic hetero ring. These rings may have a substituent. Also they may form, along with the 13-positioned carbon atom in the indenonaphthopyran moiety to which they bond, an aliphatic hydrocarbon ring having 3 to 20 ring carbon atoms, a condensed polycyclic ring formed by condensation of the aliphatic hydrocarbon ring with an aromatic ring or an aromatic hetero ring, a hetero ring having 3 to 20 ring atoms, or a condensed polycyclic ring formed by condensation of the hetero ring with an aromatic hydrocarbon ring or an aromatic hetero ring.

In the present invention, preferred substituents for $R^5$ and $R^6$ includes the above-mentioned oligomer chain group A, the above-mentioned alkenyl group having 10 to 30 carbon atoms, a group having an alkenyl group having 10 to 30 carbon atoms at the terminal thereof, a hydroxy group, an alkyl group, an alkoxy group, and a case of forming a ring along with the 13-positioned carbon atoms in the indenonaphthopyran moiety to which $R^5$ and $R^6$ bond. Specific examples of these substituents include the groups specifically exemplified hereinabove for <$R^1$ and $R^2$>.

Among these, from the viewpoint that the photochromic compound can exhibit excellent photochromic characteristics and has high durability, the case of forming a ring along with the 13-positioned carbon atom in the indenonaphthopyran moiety to which the groups bond is preferred. Above all, especially from the viewpoint of a rapid decoloration rate, a case of forming an aliphatic ring or a condensed polycyclic ring formed by condensation of the aliphatic ring with an aromatic ring or an aromatic hetero ring is more preferred, and in particular, from the viewpoint of reducing initial coloration by thermochromism, a case of forming an aliphatic ring is especially more preferred.

Preferred examples of the aliphatic ring group to be formed by $R^5$ and $R^6$ include an unsubstituted aliphatic hydrocarbon ring group having 6 to 16 ring carbon atoms, and an aliphatic hydrocarbon ring group having at least one substituent selected from an alkyl group, a haloalkyl group, a cycloalkyl group, an alkoxy group, an amino group, an aralkyl group, an aryl group and a halogen atom. Specific examples of these substituents include the groups specifically exemplified hereinabove for <$R^1$ and $R^2$>.

Among the aliphatic hydrocarbon ring group, an especially preferred group is an aliphatic hydrocarbon ring group substituted with an alkyl group having 1 to 6 carbon atoms (preferably an alkyl group having 1 to 3 carbon atoms, or the aliphatic hydrocarbon ring group bonded or condensed with a cycloalkyl group having 3 to 8 carbon atoms.

Among these, from the viewpoint of attaining excellent decoloration rate and high coloration density the aliphatic hydrocarbon ring group is preferably a ring selected from a cyclopentane ring, a cyclohexane ring, a cycloheptane ring, a cyclooctane ring, a cyclononane ring, a cyclodecane ring, a cycloundecane ring, a cyclododecane ring and a spirodicyclohexane ring (especially preferably a cyclohexane ring), and the ring may have 1 to 10 substituents selected from an alkyl group having 1 to 3 carbon atoms and a cycloalkyl group having 5 to 7 carbon atoms, or the ring may be a condensed ring with a cycloalkyl group having 5 to 7 carbon atoms.

Specific examples of especially preferred aliphatic hydrocarbon ring groups include the following formulae:

[Chem. 2]

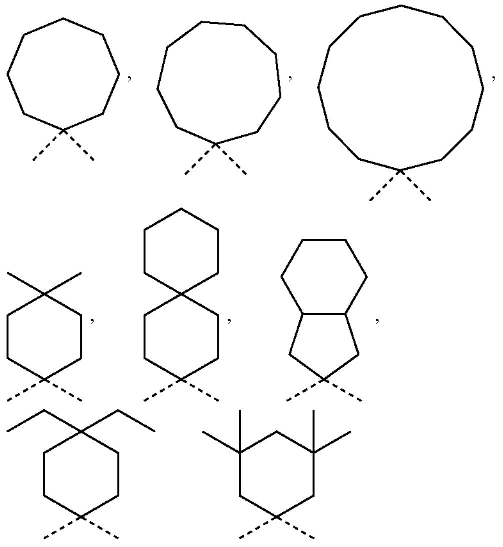

In these formulae, the carbon atom having bonds of dotted lines is a 13-positioned carbon atom of the indenonaphthopyran moiety.

Substituents in different positions of a chromene compound have been described hereinabove, and as described above, the substituent for the group optionally having a substituent may be the oligomer chain group A so that the compound has at least one above-mentioned oligomer chain group A in the molecule. The substituent for the group optionally having a substituent may also be the above-mentioned group having an alkenyl group having 10 to 30 carbon atoms or a group having an alkenyl group having 10 to 30 carbon atoms at the terminal thereof in such a manner that the number of the alkenyl groups having 10 to 30 carbon atoms is 1 to 12 in one oligomer chain group A in one molecule. The number of the alkenyl groups having 10 to 30 carbon atoms (1 to 12) is a total number of all the alkenyl groups, including the number of substituent groups in which the terminal of the substituent is an alkenyl group having 10 to 30 carbon atoms.

Preferred oligomer chain groups A are described below.

<Oligomer Chain Group A>

The chromene compound of the present invention may be any one in which the indenonaphthopyran moiety represented by the formula (1) has at least the above-mentioned oligomer chain group A, and at least one of $R^1$, $R^2$, $R^3$, $R^4$, $R^5$ and $R^6$ can be the oligomer chain group A (or a group having an oligomer chain group).

The oligomer chain group A is not specifically limited so far as it has 3 or more recurring units. Above all, a group having a polyalkylene oxide oligomer chain or a polysiloxane oligomer chain having 3 or more recurring units is preferred. The number of the recurring units of the oligomer chain group A is, as described above, preferably 3 to 200, more preferably 3 to 170, most preferably 15 to 80. Also preferably the average molecular weight of the oligomer chain group A is 300 to 30,000, more preferably 350 to 25,000, even more preferably 400 to 20,000, especially more preferably 440 to 15,000.

In the present invention, the average molecular weight of the oligomer chain group A in one mole of the indenonaphthopyran moiety is extremely important. Specifically, for the purpose of exhibiting an excellent effect in an especially rigid matrix (resin), the average molecular weight of the oligomer chain group A in one mole of the indenonaphthopyran moiety is preferably 350 to 10000, more preferably 440 to 5000. The average molecular weight of the oligomer chain group A can be controlled depending on the kind of the raw material to be used in synthesizing the photochromic compound. The average molecular weight as referred to herein means a number-average molecular weight. The number-average molecular weight can be confirmed from the raw material compound in synthesizing the photochromic compound of the present invention. After synthesis of the photochromic compound, the number-average molecular weight can be determined by $^1$H-NMR of the compound.

Among the above-mentioned oligomer chain group A, for attaining excellent photochromic characteristics and for reducing matrix dependency, groups represented by the following formulae (5a) to (5d) and described in detail hereinunder are preferred. A chromene compound necessarily having one such group and having an alkenyl group having 10 to 30 carbon atoms exhibits an especially excellent effect.

<Preferred Oligomer Chain Group A>

In the present invention, the oligomer chain group A to be used is not specifically limited so far as it is an oligomer chain group having 3 or more recurring units and selected from a polyalkylene oxide oligomer chain group, a polyester oligomer chain group, a polysiloxane chain group and a polyester polyether oligomer chain group. As the especially preferred oligomer chain groups A, the following formulae (5a) to (5d):

(5a)

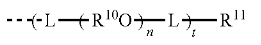

(5b)

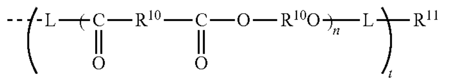

(5c)

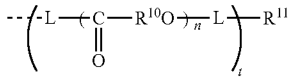

(5d)

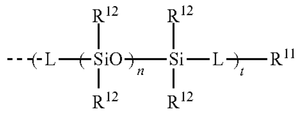

are exemplified.

In the formulae (5a) to (5c), $R^{10}$ represents a linear or branched alkylene group having 1 to 20 carbon atoms, and in the case where the compound has plural $R^{10}$'s in one molecule, $R^{10}$'s may be the same or different. From the viewpoint of production, $R^{10}$ is preferably an ethylene group, a propylene group or a butylene group, and especially preferably a propylene group. n indicates the number of the recurring units in the oligomer chain group A, and is an integer of 3 to 200. In consideration of the productivity and the photochromic characteristics of the photochromic compound, n is preferably 3 to 170, especially preferably 15 to 80.

In the formulae (5a) to (5d), the broken line indicates a bond to the indenonaphthopyran moiety and t indicates the number of the oligomer chain groups A, and is an integer of 1 to 10.

In the case where t is 1, $R^{11}$ represents an alkenyl group having 10 to 30 carbon atoms, a hydrogen atom, an alkyl group having 1 to 20 carbon atoms, or a group having an alkenyl group having 10 to 30 carbon atoms at the terminal thereof, when t is 2, $R^{11}$ is a bond or a divalent organic residue, when t is 3 to 10, $R^{11}$ is an organic residue having the same valence as the number of t.

Naturally the group having an alkenyl group having 10 to 30 carbon atoms at the terminal thereof, as described herein, is preferably the same group as the above-mentioned "terminal alkenyl group".

In the formula (5d), $R^{12}$ represents a linear or branched alkyl group having 1 to 20 carbon atoms, or an aryl group having 6 to 14 carbon atoms, and when the compound has plural $R^{12}$'s in one molecule, $R^{12}$'s may be the same or different. From the viewpoint of production, $R^{12}$ is preferably a methyl group, an ethyl group, a propyl group, a butyl group, or a phenyl group.

In the formulae (5a) to (5d), L represents a divalent bonding group, and a group represented by the following formula (6):

(6)

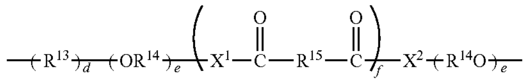

is exemplified.

In the formula (6), $R^1$ represents a divalent group, and is a linear or branched alkylene group having 1 to 20 carbon atoms, a cycloalkylene group having 3 to 12 ring carbon atoms and optionally having a substituent, an arylene group having 6 to 12 ring carbon atoms and optionally having a substituent, or a heterocyclic group having 3 to 12 ring atoms and optionally having a substituent.

$R^{14}$ represents a divalent group, and is a linear or branched alkylene group having 1 to 20 carbon atoms, a cycloalkylene group having 3 to 12 ring carbon atoms and optionally having a substituent, or an arylene group having 6 to 12 ring carbon atoms and optionally having a substituent.

$R^{15}$ represents a divalent group, and is a linear or branched alkylene group having 1 to 20 carbon atoms, a cycloalkylene group having 3 to 12 ring carbon atoms and optionally having a substituent, or an arylene group having 6 to 12 ring carbon atoms and optionally having a substituent. $X^1$ and $X^2$ each represent a divalent group, and is independently a direct bond, an oxygen atom, a sulfur atom, an amino group, a substituted amino group, a (thio)amide group, or a (thio)ester group.

The substituent for the group optionally having a substituent may be the above-mentioned alkenyl group having 10 to 30 carbon atoms or a group having the alkenyl group having 10 to 30 carbon atoms at the thermal thereof.

d represents an integer of 0 to 50, e represents an integer of 0 to 50, f represents an integer of 0 to 50.

When d is 2 or more, plural $R^1$'s may be the same as or different from each other, when e is 2 or more, plural divalent groups of the unit of e may be the same as or different from each other, when f is 2 or more, plural divalent groups of the unit of f may be the same as or different from each other.

Plural L's may be the same as or different from each other.

As the especially preferred examples for L, divalent groups represented by the following formulae:

[Chem. 5]

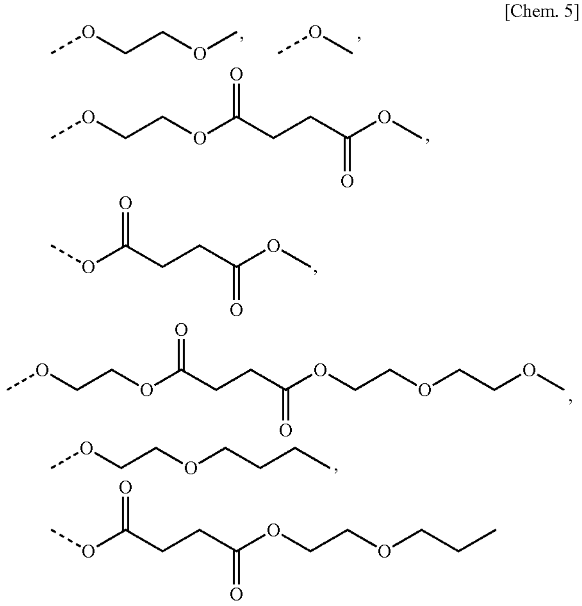

are exemplified.

In the oligomer chain group A represented by the above formulae (5a) to (5d), t corresponds to the number of the oligomer chain groups A. When t is 1, that is, when the number of the oligomer chain group A is 1, the alkyl group having 1 to 20 carbon atoms for $R^{11}$ is preferably a methyl group, an ethyl group, a propyl group, a butyl group, a pentyl group, or a hexyl group. When t is 1, also preferably, the terminal of the oligomer chain is an alkenyl group having 10 to 30 carbon atoms, or a group having an alkenyl group having 10 to 30 carbon atoms at the terminal thereof.

When t is 2, $R^{11}$ may be a bond. Namely in the case where $R^{11}$ is a bond, the length of the oligomer chain is substantially twice, and the chain has the indenonaphthopyran moiety at both terminals thereof.

When t is 3 to 10, $R^{11}$ is an organic residue having a valence corresponding to the number of t, and in this case, t is preferably 3 to 6. Regarding preferred examples, the organic residue ($R^{11}$) is an polyvalent organic residue represented by any of the following formulae:

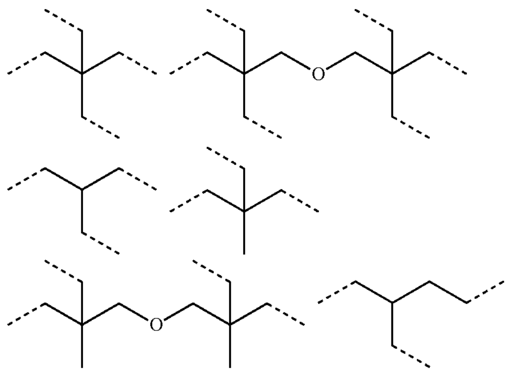

-continued

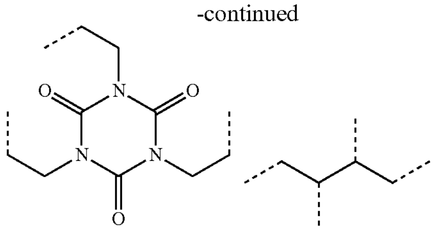

In the polyvalent organic residues, the broken line indicates a bond to L.

Preferred examples of the oligomer chain group A have been described above.

<Preferred Substitution Position of Oligomer Chain Group A>

The photochromic compound of the present invention needs to have at least one above-mentioned oligomer chain group A in the molecule. Accordingly in the group of $R^1$, $R^2$, $R^3$, $R^4$, $R^5$, and $R^6$, the substituent for the group optionally having a substituent may be the oligomer chain group. Above all, the oligomer chain group A is preferably positioned at the 3-position ($R^3$, and $R^4$), or the 6-position ($R^1$), or the 7-position ($R^1$), or the 11-position ($R^2$), or the 13-position ($R^5$, and $R^6$) in the indenonaphthopyran moiety for the purpose of enhancing the effect of the present invention and enhancing the productivity of the chromene compound itself.

The oligomer chain group A may directly bond to the position, or the oligomer chain group A may be introduced as a substituent that the group bonding to the position has.

<Preferred Substitution Position of Alkenyl Group Having 10 to 30 Carbon Atoms>

The photochromic compound of the present invention needs to have at least one above-mentioned alkenyl group having 10 to 30 carbon atoms in the molecule. The alkenyl group having 10 to 30 carbon atoms may directly bond to the oligomer chain group A as a substituent (the terminal of the oligomer chain group A becomes the alkenyl group having 10 to 30 carbon atoms), or may bond to a substitution position of the indenonaphthopyran moiety different from the oligomer chain group A as a substituent, or may bond to both the two. Above all, in consideration of the effect of the present invention and the productivity of the chromene compound itself, the alkenyl group bonds preferably to the 3-position ($R^3$, and $R^4$), the 6-position ($R^1$), the 7-position ($R^1$), the 11-position ($R^2$), or the 13-position ($R^5$, and $R^6$) as a substituent.

The alkenyl group having 10 to 30 carbon atoms may directly bond to that position, or the alkenyl group having 10 to 30 carbon atoms may be introduced as a substituent that the group bonding to that position has. The substituent for the group optionally having a substituent may be the alkenyl group having 10 to 30 carbon atoms or a group having an alkenyl group having 10 to 30 carbon atoms at the terminal thereof in such a manner that the number of the alkenyl groups having 10 to 30 carbon atoms in one oligomer chain group Ain one molecule is 1 to 12.

<Especially Preferred Chromene Compound>

In the present invention, a chromene compound represented by the following formula (2) is preferred. Naturally the chromene compound needs to have at least one above-mentioned oligomer chain group A and the above-mentioned alkenyl group having 10 to 30 carbon atoms in the molecule.

(2)

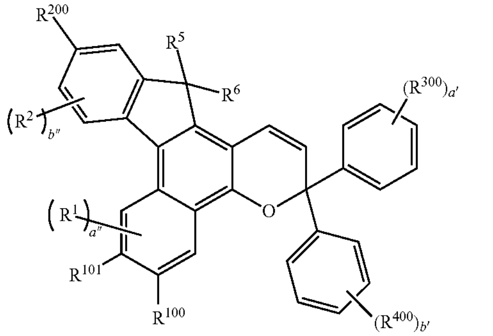

In the formula:

$R^1$, $R^2$, $R^5$, and $R^6$ have the same meanings as those in the formula (1).

a" represents an integer of 0 to 2, and when a" is 2, plural $R^1$'s may be the same as or different from each other; b" represents an integer of 0 to 3, and when b" is 2 or 3, plural $R^2$'s may be the same as or different from each other.

<$R^{100}$, and $R^{101}$>

$R^{100}$ and $R^{101}$ are preferably the following groups among the groups described hereinabove in <$R^1$, and $R^2$>. Specifically the groups include the above-mentioned oligomer chain group A, the above-mentioned alkenyl group having 10 to 30 carbon atoms, a group having the above-mentioned alkenyl group having 10 to 30 carbon atoms at the terminal thereof, a hydrogen atom, a hydroxy group, an alkyl group having 1 to 6 carbon atoms, a haloalkyl group having 1 to 6 carbon atoms, a cycloalkyl group having 3 to 8 carbon atoms, an alkoxy group having 1 to 6 carbon atoms, an amino group, a substituted amino group, a heterocyclic group optionally having a substituent, a cyano group, a halogen atom, an alkylthio group having 1 to 6 carbon atoms, an arylthio group having 6 to 10 carbon atoms and optionally having a substituent, a nitro group, a formyl group, a hydroxycarbonyl group, an alkylcarbonyl group having 2 to 7 carbon atoms, an alkoxycarbonyl group having 2 to 7 carbon atoms, an aralkyl group having 7 to 11 carbon atoms and optionally having a substituent, an aralkoxy group having 7 to 11 carbon atoms and optionally having a substituent, an aryloxy group having 6 to 12 carbon atoms and optionally having a substituent, an aryl group having 6 to 12 carbon atoms and optionally having a substituent, a heteroaryl group having 3 to 12 carbon atoms and optionally having a substituent, a thiol group, an alkoxyalkylthio group having 2 to 9 carbon atoms, a haloalkylthio group having 1 to 6 carbon atoms, and a cycloalkylthio group having 3 to 8 carbon atoms. Specific examples of these groups are the same as those for the groups described hereinabove in <$R^1$, and $R^2$>.

$R^{100}$, and $R^{101}$ may together form a ring represented by the following formula (3):

(3)

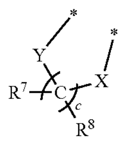

wherein c represents an integer of 1 to 3.

In the formula, * indicates the 6-position or 7-position carbon atom of the indenonaphthopyran moiety.

<X, and Y>

In the formula, one or both of X and Y are a sulfur atom, a methylene group, an oxygen atom or a group represented by the following formula (4):

(4)

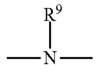

In the formula, $R^9$ represents the above-mentioned oligomer chain group A, the above-mentioned alkenyl group having 10 to 30 carbon atoms, a group having the above-mentioned alkenyl group having 10 to 30 carbon atoms at the terminal thereof, a hydrogen atom, a hydroxy group, an alkyl group having 1 to 6 carbon atoms, a haloalkyl group having 1 to 6 carbon atoms, a cycloalkyl group having 3 to 8 carbon atoms, an alkoxy group having 1 to 6 carbon atoms, an aryl group having 6 to 12 carbon atoms and optionally having a substituent, or a heteroaryl group having 3 to 12 carbon atoms and optionally having a substituent. Specific examples of these groups include the groups specifically exemplified hereinabove for <$R^1$, and $R^2$>, and preferred examples thereof are also the same groups.

<$R^7$, and $R^8$>

Preferably $R^7$ and $R^8$ each independently represent the above-mentioned oligomer chain group A, the above-mentioned alkenyl group having 10 to 30 carbon atoms, a group having the above-mentioned alkenyl group having 10 to 30 carbon atoms at the terminal thereof, a hydroxy group, an alkyl group having 1 to 6 carbon atoms, a haloalkyl group having 1 to 6 carbon atoms, a cycloalkyl group having 3 to 8 carbon atoms, an alkoxy group having 1 to 6 carbon atoms, an amino group, a substituted amino group, a heterocyclic group optionally having a substituent, a cyano group, a nitro group, a formyl group, a hydroxycarbonyl group, an alkylcarbonyl group having 2 to 7 carbon atoms, an alkoxycarbonyl group having 2 to 7 carbon atoms, a halogen atom, an aralkyl group having 7 to 11 carbon atoms and optionally having a substituent, an aralkoxy group having 7 to 11 carbon atoms and optionally having a substituent, an aryl group having 6 to 12 carbon atoms and optionally having a substituent, a thiol group, an alkylthio group having 1 to 6 carbon atoms, an alkoxyalkylthio group having 2 to 9 carbon atoms, a haloalkylthio group having 1 to 6 carbon atoms, a cycloalkylthio group having 3 to 8 carbon atoms, or an arylthio group having 6 to 10 carbon atoms and optionally having a substituent. Specific examples of these groups include the groups specifically exemplified hereinabove for <$R^1$, and $R^2$>, and preferred examples thereof are also the same groups.

$R^7$ and $R^8$ may form, along with the carbon atom to which they bond, an aliphatic ring optionally having a substituent. Specific examples of the aliphatic ring include a cyclopentane ring and a cyclohexane ring. The substituent that the aliphatic ring has is not specifically limited, and preferably 1 to 8 hydrogen atoms, especially preferably 1 to 4 hydrogen atoms of the group to form the ring are substituted with a substituent selected from the above-mentioned oligomer chain group A, the above-mentioned alkenyl group having 10 to 30 carbon atoms, a hydroxy group, an alkyl group having 1 to 6 carbon atoms, a haloalkyl group having 1 to 6 carbon atoms, a cycloalkyl group having 3 to 8 carbon atoms, an alkoxy group having 1 to 6 carbon atoms, an amino group, a substituted amino group, a heterocyclic group having 3 to 8 atoms, a cyano group, a nitro group and a halogen atom. Specific examples of these groups include the same groups as described hereinabove for <$R^1$, and $R^2$>.

<Especially Preferred $R^{100}$, and $R^{101}$>

Among the above-mentioned groups, in consideration of the coloration tone and the coloration density of the resultant photochromic compound, $R^{100}$ and $R^{101}$ each are preferably the above-mentioned oligomer chain group A, the above-mentioned alkenyl group having 10 to 30 carbon atoms, a group having the above-mentioned alkenyl group having 10 to 30 carbon atoms at the terminal, a hydrogen atom, the above-mentioned alkyl group, the above-mentioned alkoxy group, the above-mentioned heterocyclic group, the above-mentioned aryl group or the above-mentioned arylthio group. Specific examples of these groups include the groups specifically exemplified hereinabove for <$R^1$, and $R^2$>. The groups may form a ring represented by the formula (3). The substituent for the group optionally having a substituent may be the oligomer chain group A or the alkenyl group having 10 to 30 carbon atoms.

<$R^{200}$>

$R^{200}$ is preferably any of the following groups among the groups described hereinabove for <$R^1$, and $R^2$>. Specifically the group includes the above-mentioned oligomer chain group A, the above-mentioned alkenyl group having 10 to 30 carbon atoms, a group having the above-mentioned alkenyl group having 10 to 30 carbon atoms at the terminal thereof, a hydrogen atom, a hydroxy group, an alkyl group having 1 to 6 carbon atoms, a haloalkyl group having 1 to 6 carbon atoms, a cycloalkyl group having 3 to 8 carbon atoms, an alkoxy group having 1 to 6 carbon atoms, an amino group, a substituted amino group, a heterocyclic group optionally having a substituent, a cyano group, a nitro group, a formyl group, a hydroxycarbonyl group, an alkylcarbonyl group having 2 to 7 carbon atoms, an alkoxycarbonyl group having 2 to 7 carbon atoms, a halogen atom, an aralkyl group having 7 to 11 carbon atoms and optionally having a substituent, an aralkoxy group having 7 to 11 carbon atoms and optionally having a substituent, an aryl group having 6 to 12 carbon atoms and optionally having a substituent, a thiol group, an alkylthio group having 1 to 6 carbon atoms, an alkoxyalkylthio group having 2 to 9 carbon atoms, a haloalkylthio group having 1 to 6 carbon atoms, a cycloalkylthio group having 3 to 8 carbon atoms, or an arylthio group having 6 to 10 carbon atoms and optionally having a substituent. Specific examples of these groups include the same groups as described hereinabove for <$R^1$, and $R^2$>, and preferred examples thereof are also the same groups.

<Especially preferred $R^{200}$>

Among the above-mentioned groups, in consideration of the coloration tone and the coloration density of the resultant photochromic compound, $R^{200}$ is preferably the above-mentioned oligomer chain group A, the above-mentioned alkenyl group having 10 to 30 carbon atoms, a group having the above-mentioned alkenyl group having 10 to 30 carbon atoms, a hydrogen atom, the above-mentioned alkoxy group, the above-mentioned heterocyclic group, or the above-mentioned aryl group. Specific examples of these groups include the groups specifically exemplified hereinabove for <$R^1$, and $R^2$>, and preferred examples thereof are also the same groups. The substituent for the group having a substituent may be the above-mentioned oligomer chain group A, or may be the above-mentioned alkenyl group having 10 to 30 carbon atoms or a group having the above-mentioned alkenyl group having 10 to 30 carbon atoms at the terminal thereof.

<$R^{300}$ and $R^{400}$>

Preferably $R^{300}$ and $R^{400}$ each are independently the above-mentioned oligomer chain group A, the above-mentioned alkenyl group having 10 to 30 carbon atoms, a group having the above-mentioned alkenyl group having 10 to 30 carbon atoms at the terminal thereof, a hydroxy group, an alkyl group having 1 to 6 carbon atoms, a haloalkyl group having 1 to 6 carbon atoms, a cycloalkyl group having 3 to 8 carbon atoms, an alkoxy group having 1 to 6 carbon atoms, an amino group, a substituted amino group, a heterocyclic group optionally having a substituent, a cyano group, a halogen atom, an alkylthio group having 1 to 6 carbon atoms, or an arylthio group having 6 to 10 carbon atoms and optionally having a substituent. Specific examples of these groups include the groups specifically exemplified hereinabove for <$R^1$, and $R^2$>, and preferred examples thereof are also the same groups.

a' represents the number of $R^{300}$'s, and is an integer of 0 to 5. When a' is 2 or more, $R^{300}$'s may be the same as or different from each other.

b' represents the number of $R^{400}$'s, and is an integer of 0 to 5. When b' is 2 or more, $R^{400}$'s may be the same as or different from each other.

<Especially Preferred $R^{300}$ and $R^{400}$>

Among the above-mentioned groups, in consideration of the coloration tone and the coloration density of the resultant photochromic compound, and of the presence or absence of cloudiness of the resultant cured product, $R^{300}$ and $R^{400}$ each are preferably the above-mentioned oligomer chain group A, the above-mentioned alkenyl group having 10 to 30 carbon atoms, the above-mentioned alkyl group, the above-mentioned alkoxy group, the above-mentioned substituted amino group, or the the above-mentioned heterocyclic group. The substituent for the group optionally having a substituent may be the above-mentioned oligomer chain group A, the above-mentioned alkenyl group having 10 to 30 carbon atoms, or a group having the above-mentioned alkenyl group having 10 to 30 carbon atoms at the terminal thereof.

<Preferred Substitution Position of Preferred Oligomer Chain Group A>

Preferably, the oligomer chain group A is at the 3-position ($R^{300}$, or $R^{400}$), the 6-position ($R^{00}$), the 7-position ($R^{101}$), the 11-position ($R^{200}$), or the 13-position ($R^5$, or $R^6$) of the indenonaphthopyran, from the viewpoint of enhancing the effect of the present invention and the productivity of the chromene compound itself. In the case where the group is at the 3-position ($R^{300}$, or $R^{400}$), preferably the phenyl group having $R^{300}$, or the phenyl group having $R^{400}$ is a phenyl group having the oligomer chain group A at the para-position, or a phenyl group having "the terminal alkenyl group at the para-position".

<Preferred Substitution Position of Alkenyl Group Having 10 to 30 Carbon Atoms>

Preferably the alkenyl group having 10 to 30 carbon atoms is at the 3-position ($R^{300}$, or $R^{400}$), the 6-position ($R^{100}$), the 7-position ($R^{101}$), the 11-position ($R^{200}$), or the 13-position ($R^5$, or $R^6$) of the indenonaphthopyran, from the viewpoint of enhancing the effect of the present invention and the productivity of the chromene compound itself. In the case where the group is at the 3-position ($R^{300}$, or $R^{400}$), preferably the phenyl group having $R^{300}$, or the phenyl group having $R^{400}$ is a phenyl group having the "terminal alkenyl group" at the para-position, or a phenyl group having the alkenyl group having 10 to 30 carbon atoms. From the viewpoint of further improving the effect of the present invention and the productivity of the chromene compound itself, preferably the alkenyl group having 10 to 30 carbon atoms or the terminal alkenyl group and the oligomer chain group A are at different substitution positions in the indenonaphthopyran moiety.

<Specific Examples of Especially Preferred Chromene Compound>

In the present invention, specifically some especially preferred chromene compounds are exemplified below. The following compounds are preferred.

In the following formulae, $C_{18}H_{35}$ which is a type of an alkenyl group having 10 to 30 carbon atoms represents an oleyl group.

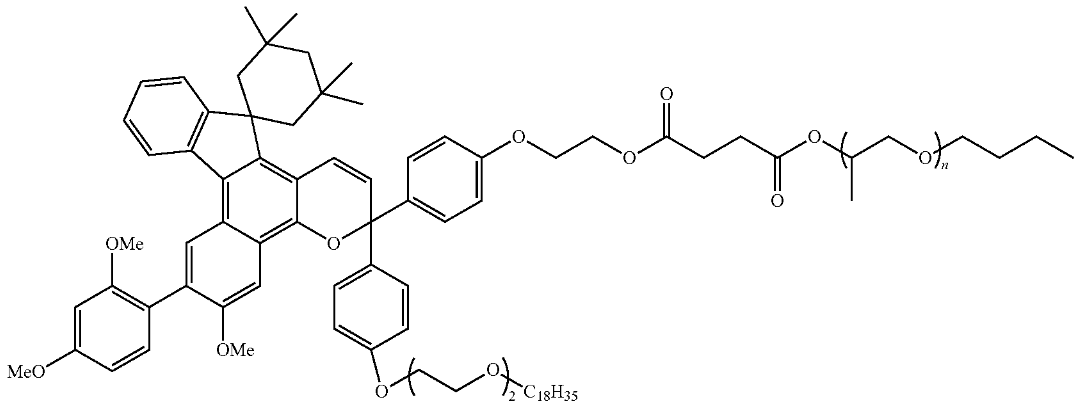

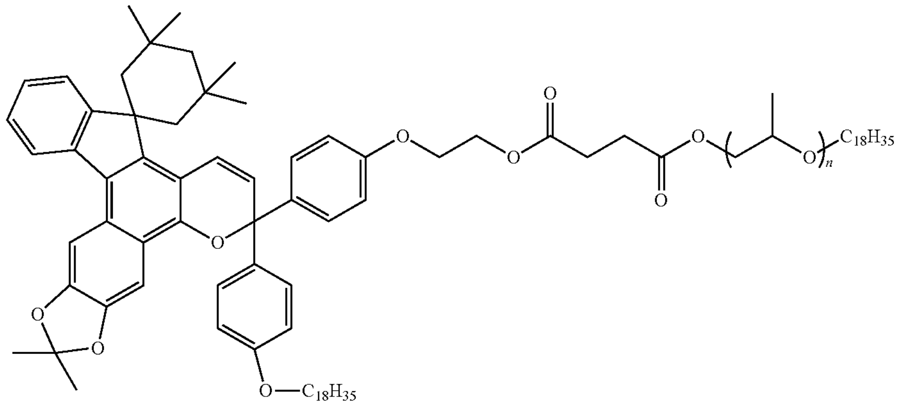

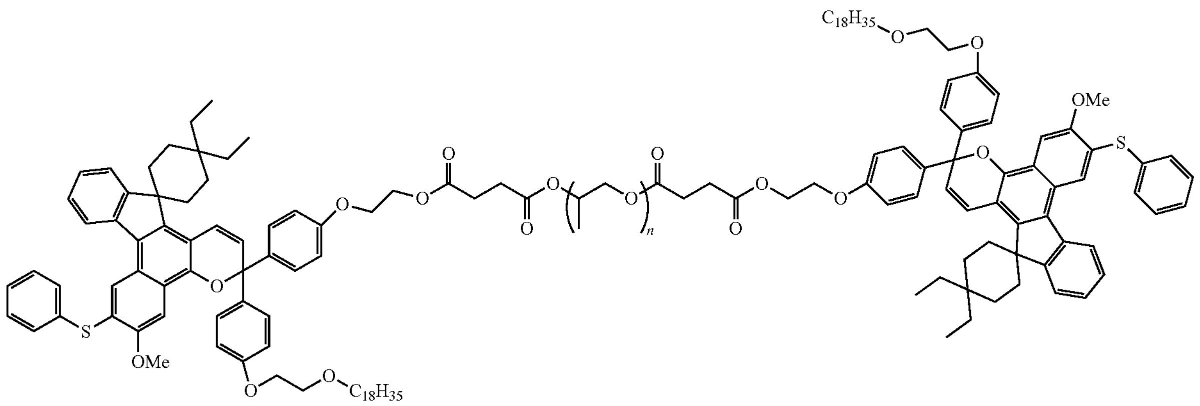

-continued

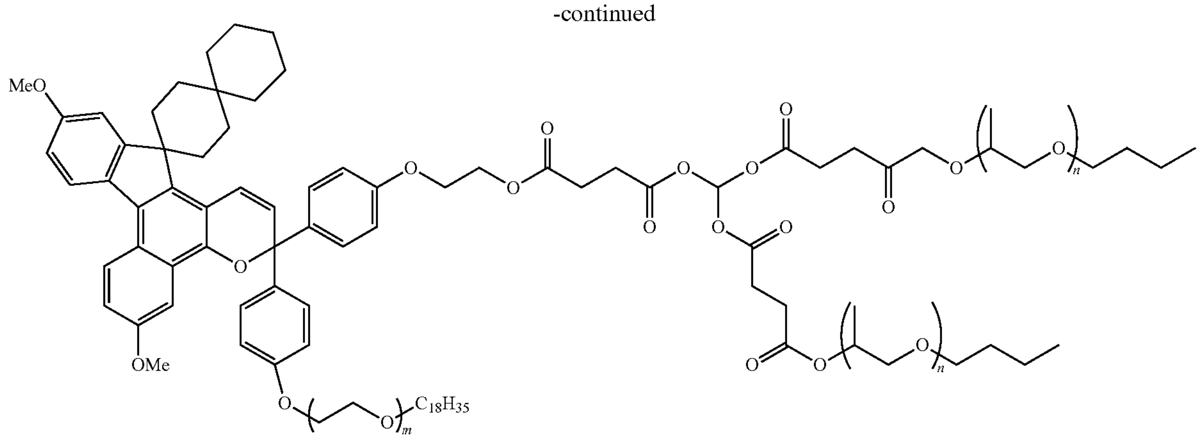

In the above-mentioned formulae, n is preferably 3 to 200, more preferably 3 to 170, even more preferably 15 to 80. In the formulae, m is preferably 0 to 2.

<Production Method for Photochromic Compound of the Invention>

The photochromic compound of the present invention can be produced in any synthesis method. Typical examples of a production method for the chromene compound are described below, but the photochromic compound of the present invention is not restricted to those produced according to the method. In the following description, the signs in the formulae have the same meanings as those described for the above-mentioned formulae, unless otherwise specifically indicated.

For producing the chromene compound, preferably a naphthol compound represented by the following formula (7):

(7)

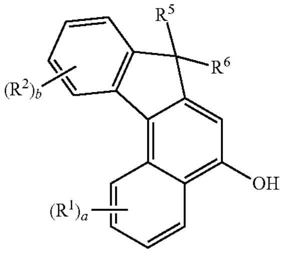

is reacted with a propargyl alcohol compound represented by the following formula (8):

(8)

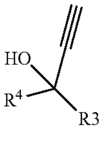

in the presence of an acid catalyst to produce a chromene compound. The reaction ratio of the naphthol compound to the propargyl alcohol compound is preferably selected from a range of 1/10 to 10/1 (molar ratio). The acid catalyst to be used includes sulfuric acid, benzenesulfonic acid, p-toluenesulfonic acid, and acidic alumina. The acid catalyst is used preferably in an amount falling within a range of 0.1 to 10 parts by weight relative to 100 parts by weight of the sum total of the naphthol compound and the propargyl alcohol compound. The reaction temperature is preferably 0 to 200° C. The solvent is preferably an aprotic organic solvent, and preferred examples thereof to be used include N-methylpyrrolidone, dimethylformamide, tetrahydrofuran, benzene, and toluene. A purification method for the product obtained according to the reaction is not specifically limited. For example, the product can be purified through silica gel chromatography or recrystallization.

A production example for a chromene compound with a polyalkylene oxide oligomer chain group A (for example, the oligomer chain group A represented by the above-mentioned formula (5a)) introduced thereinto is exemplified below. First, a method of substituting the naphthol compound represented by the formula (7) with a polyalkylene oxide oligomer chain group is exemplified below.

First, a polyalkylene glycol monoalkyl ether represented by the following formula (9):

$$HO-R^{10}\text{-}(OR^{10})_{n-1}\text{-}OR^{11} \quad (9)$$

is converted into a compound represented by the following formula (10):

$$Y-R^{10}\text{-}(OR^{10})_{n-1}\text{-}OR^{11} \quad (10)$$

In the formula (10), Y represents a highly-releasable substituent such as a tosyl group or a halogen atom.

A preferred method for converting into a tosyl group includes reacting with p-toluenesulfonyl chloride in the presence of a basic catalyst such as a tertiary amine, e.g., triethylamine. For the method of converting into an iodine atom, a bromine atom or a chlorine atom, Appel reaction is usable. Specifically, it is preferable that the ether is reacted with carbon tetrachloride, iodine, methyl iodide, hexahalogenylacetone or triphosgene in the presence of triphenyl phosphine.

Subsequently a benzophenone compound having a hydroxy group is reacted with the compound represented by the formula (10) in an aprotic polar solvent such as dimethylformamide or dimethyl sulfoxide in the presence of a base such as potassium carbonate to give a benzophenone compound represented by the following formula (11):

(11)

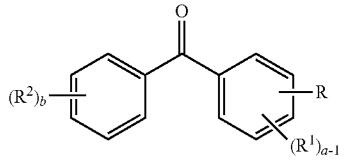

In the formula (11), R represents a polyalkylene oxide oligomer chain group.

Subsequently according to a known method, the benzophenone compound of the formula (11) is converted into a carboxylic acid represented by the following formula (12):

(12)

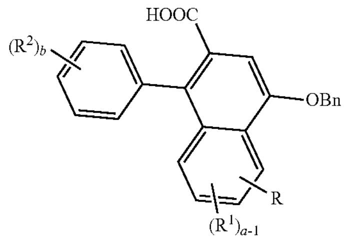

In the formula (12), Bn represents a benzyl group.

Specific examples of the known method include Stobbe reaction, cyclization reaction, ester hydrolysis reaction using an alkali or an acid, benzyl protection of a hydroxy group and a carboxylic acid, and benzyl ester hydrolysis reaction using an alkali or an acid. The carboxylic acid represented by the formula (12) is converted into an amine according to a method of Curtius rearrangement, Hofmann rearrangement, or Lossen rearrangement. Subsequently a diazonium salt is prepared from the resultant amine according to a known method, and the diazonium salt is converted into a bromide according to Sandmeyer reaction. The resultant bromide is reacted with magnesium or lithium to prepare an organic metal compound. The organic metal compound is reacted with a ketone represented by the following formula (13):

(13)

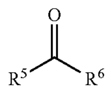

at −80 to 70° C. for 10 minutes to 4 hours in an organic solvent to give an alcohol compound. The resultant alcohol compound is subjected to Friedel-Crafts reaction. Namely under a neutral to acidic condition, the compound is reacted at 10 to 120° C. for 10 minutes to 2 hours so that the alcohol moiety is converted into a spiro structure through nucleophilic substitution reaction to synthesize a naphthol compound represented by the following formula (14):

(14)

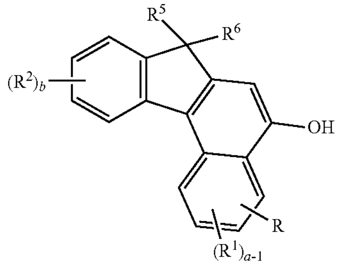

In the reaction, the reaction ratio of the organic metal compound to the ketone represented by the formula (13) is preferably selected from a range of 1/10 to 10/1 (molar ratio). The reaction temperature is preferably −80 to 70° C. As the solvent, an aprotic organic solvent is preferably used, and examples thereof include diethyl ether, tetrahydrofuran, benzene and toluene. Preferably, the Friedel-Crafts reaction is carried out using, for example, an acid catalyst such as acetic acid, hydrochloric acid, sulfuric acid, benzenesulfonic acid, p-toluenesulfonic acid, or acidic alumina. In the reaction, for example, an aprotic organic solvent such as tetrahydrofuran, benzene or toluene is used.

By reacting a naphthol compound represented by the formula (14) and a propargyl alcohol represented by the formula (8), a photochromic compound of the present invention having a polyoxyalkylene oxide oligomer chain group introduced into the indeno-position or the naphtho-position ($R^1$ or $R^2$) is produced.

As a method of introducing a polyalkylene oxide oligomer chain group into a propargyl alcohol represented by the formula (8), a propargyl alcohol represented by the following formula (15):

(15)

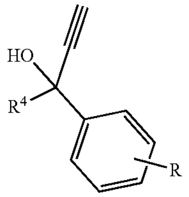

is synthesized from a benzophenone compound having a polyalkylene oxide oligomer chain group represented by the formula (11), and then the resultant compound is reacted with a naphthol compound represented by the formula (7), as synthesized based on the reaction method described in patent publications of WO2001/60881 and WO2005/028465, to give a photochromic compound of the present invention having the polyalkylene oxide oligomer chain is substituted as $R^3$ and $R^4$.

Besides the method where an oligomer chain is introduced in the initial stage in the above-mentioned synthesis (for example, an oligomer chain is introduced into a naphthol compound or a benzophenone compound), an oligomer chain can be introduced in a final stage to give a photochromic compound of the present invention. Specifically a chromene compound having a reactive functional group such as a hydroxy group, a primary or secondary amino group or a thiol group in the position into which an oligomer chain is desired to be introduced is produced. Subsequently the resultant compound is reacted with an oligomer chain group having a substituent capable of reacting with the functional group (preferably the substituent is a group to form the above-mentioned divalent bonding group L) to give a photochromic compound of the present invention.

For example, the above-mentioned L can be formed by esterification with a polyalkylene oxide oligomer having a carboxy group. Specifically in a solvent such as toluene in the presence of a mineral acid such as sulfuric acid or hydrochloric acid, an organic acid such as an aromatic sulfonic acid, or a Lewis acid such as boron fluoride ether, and with stirring optionally with heating, the reaction can be carried out while removing the formed water. In the esterification reaction, water can be removed by azeotropy, or using a drying agent such as anhydrous magnesium sulfate or molecular sieves.

The above-mentioned L can also be formed by esterification with a polyalkylene oxide oligomer having a carboxylic acid halide. Specifically a method can be employed in which, in an ether solvent such as tetrahydrofuran in the presence of a base such as pyridine or dimethylaniline, and with stirring optionally with heating, the formed hydrogen halide is removed.

Apolyalkylene oxide oligomer having a carboxy group or a carboxylic acid halide can be synthesized according to a known method. Specifically a polyalkylene oxide oligomer monoalkyl ether represented by the the above-mentioned formula (9) can be reacted with a cyclic acid anhydride such as succinic anhydride in the presence of a base or an acid catalyst to give a polyalkylene oxide oligomer monoalkyl ether having a carboxy group. A polyalkylene oxide oligomer monoalkyl ether having a halogen atom of the formula (10) can be reacted with magnesium, lithium, or the like to prepare an organic metal compound, which is then reacted with carbon dioxide to give a polyalkylene oxide oligomer monoether having a carboxy group. The resultant polyalkylene oxide oligomer monoether having a carboxy group can be reacted with thionyl chloride or oxalyl chloride to give a polyalkylene oxide oligomer monoether having a carboxylic acid halide.

A method of producing a photochromic compound of the present invention by introducing a polyalkylene glycol chain group into an indenonaphthopyran moiety has been described hereinabove, and the same method can be employed for introducing any other oligomer chain group. Specifically in place of a compound having a polyalkylene oligomer chain (group), a compound having a polyester oligomer chain (group) or a polyester polyether oligomer chain (group) is used and processed in the same manner. Using an alcohol compound having an alkenyl group having 10 to 30 carbon atoms (for example, an oleyl group), a group having an alkenyl group having 10 to 30 carbon atoms at the terminal thereof (terminal alkenyl group) can be introduced into an indenonaphthopyran moiety according to the same method.

(Identification of Photochromic Compound>

The photochromic compound of the present invention generally exists as a solid or a viscous liquid at room temperature and under normal pressure, and can be identified according to the following method. Specifically, according to a separation technique such as thin-layer chromatography silica gel column chromatography, high-performance liquid chromatography or gas chromatography, absence of raw material compounds and side products such as coloring substances except the polymeric photochromic compound can be confirmed.

The resultant photochromic compound can be analyzed through proton nuclear magnetic resonance spectrometry ($^1$H-NMR) to observe peaks based on aromatic protons and alkene protons at around δ: 5.0 to 9.0 ppm, and peaks based on alkyl group and alkylene group protons at around δ: 1.0 to 4.0 ppm. By relatively comparing the individual spectral intensity data, the number of the protons of the bonding group can be known. From a photochromic curable composition and a cured product of the curable composition, the chromene compound can be extracted and can be identified according to the same method as above.

The photochromic compound of the present invention well dissolves in an ordinary organic solvent such as toluene, chloroform or tetrahydrofuran. When the photochromic compound of the present invention represented by the above-mentioned formula (1) is dissolved in such a solvent, in general, the resultant solution is almost colorless and transparent, and when irradiated with sunlight or UV rays, it rapidly colors and when blocked from the light, it is rapidly restored to the original colorless state. Thus, the photochromic compound of the present invention exhibits such a good photochromic performance.

<Method of Using Photochromic Compound of the Invention>

The photochromic compound of the present invention can be widely used as a photochromic material (photochromic optical article), and for example, can be used as various memory materials substitutable for silver salt photosensitive materials, and also as other various memory materials such as copying materials, printing photosensitive materials, memory materials for cathode ray tubes, laser photosensitive materials, and holography photosensitive materials. In addition, the photochromic material using the photochromic compound of the present invention can also be used as photochromic lens materials, optical filter materials, display materials, actinometers and photochromic optical articles for decoration. The photochromic optical articles can be produced, for example, as described below, by polymerizing a photochromic curable composition containing a photochromic compound and a polymerizable compound, or the surface of a substrate such as a plastic lens can be coated with a polymer film containing a photochromic compound dispersed therein to produce an optical article.

The photochromic compound of the present invention exhibits excellent photochromic characteristics even in a polymeric solid matrix, and therefore can be used by dispersing it in a polymeric solid matrix, or can be formed into a polymeric molded article containing the photochromic compound dispersed therein. As the dispersion method, any known method is employable. For example, herein employable is a method of melt-kneading the photochromic compound of the present invention with a thermoplastic resin to make the photochromic compound dispersed in the resin, or a method of dissolving the polymeric photochromic compound of the present invention in a polymerizable compound, then adding a polymerization catalyst thereto, and polymerizing the compound by heat or light to thereby make the photochromic compound dispersed in the resin, or a method of dyeing the surface of a polymeric solid matrix with the polymeric photochromic compound of the present invention to thereby make the photochromic compound dispersed in the resin.

Examples of the polymeric solid matrix are described. Optically preferred examples thereof include polyacrylates, polymethacrylates, poly($C_1$-$C_{12}$) alkyl methacrylates, polyoxy(alkylene methacrylates), poly(alkoxylated phenol methacrylates), cellulose acetates, cellulose triacetates, cellulose acetate propionates, cellulose acetate butyrates, poly(vinyl acetates), poly(vinyl alcohols), poly(vinyl chlorides), poly (vinylidene chlorides), poly(vinylpyrrolidones), poly((meth) acrylamides), poly(dimethylacrylamides), poly(hydroxyethyl methacrylates), poly((meth)acrylic acids), thermoplastic polycarbonates, polyesters, polyurethanes, polythiourethanes, poly(ethylene terephthalates), polystyrenes, and poly(α-methylstyrenes).

For example, for use for photochromic lenses, the method is not specifically limited so far as the resultant lenses can be given uniform photochromic performance, and examples of the method include a method of sandwiching a polymer film prepared by uniformly dispersing the photochromic material of the present invention, between lenses; a method of dispersing the photochromic compound of the present invention in a polymerizable compound followed by polymerizing it according to a predetermined method; and a method of dissolving the compound in, for example, a silicone oil, then infiltrating it into the surface of a lens at 150 to 200° C. over 10 to 60 minutes, and further coating the surface with a curable substance to give a photochromic lens. Also employable is a method of applying the polymer film on the surface of a lens, and then coating the surface with a curable substance to give a photochromic lens. Further, a coating agent of a polymerizable curable composition containing the photochromic compound of the present invention may be applied to the surface of a lens substrate and the coating film may be cured. At that time, the lens substrate may be previously surface-treated with an alkaline solution or surface-treated by plasma treatment, and further, in combination with such surface treatment or with no such surface treatment, a primer may be applied to the lens substrate for improving the adhesiveness between the substrate and the coating film.

<Photochromic Curable Composition>

In the present invention, the photochromic compound of the present invention may be blended with a polymerizable compound, and the resultant photochromic curable composition may be used. The photochromic compound of the present invention can be used singly, but depending on the intended object, and for example, for obtaining various color tones required for photochromic lenses, the photochromic compound of the present invention can be combined with any other photochromic compound. As the photochromic compound to be combined, any known photochromic compound is usable with not limitation. Examples thereof include a fulgide compound, a fulgimide compound, a spirooxazine compound and a chromene compound. Above all, from the viewpoint of keeping a uniform color tone in coloration and decoloration so as to prevent color shift in coloration owing to degradation of the photochromic compound, and further to control initial coloration, a chromene compound is especially preferred. Also from the viewpoint of preventing color shift of the color tone in coloration and decoration owing the difference in matrix dependency preferably the other photochromic compound is also a photochromic compound having an oligomer chain. Further in the case of using a photochromic compound having an oligomer chain, from the viewpoint of preventing the cured product from becoming cloudy preferably the photochromic compound having an oligomer chain is a photochromic compound having at least one alkenyl group having 10 to 30 carbon atoms. Especially preferably plural kinds of the photochromic compound of the present invention are used for color tone control.

In the photochromic curable composition of the present invention, the blending amount of the photochromic compound is not specifically limited, and can be appropriately selected in consideration of the coloration intensity of the photochromic compound and the thickness of the resultant photochromic cured product. Specifically the amount of the photochromic compound containing a photochromic compound of the present invention is preferably 0.001 to 10 parts by mass relative to 100 parts by mass of the polymerizable compound.

In the present invention, the coloration intensity of the photochromic cured product depends on the thickness of the cured product, and therefore it is important to consider the thickness of the product. This is described in detail below. For example, in the case of forming a thin film having a thickness of 100 μm or less using a photochromic curable composition of the present invention, preferably the photochromic compound containing a polymeric photochromic compound of the present invention is used in an amount of 0.001 to 10 parts by mass relative to 100 parts by mass of the polymerizable compound to control the color tone. In the case where a photochromic cured product having a thickness of 1 mm or more is formed, preferably the photochromic compound containing a polymeric photochromic compound of the present invention is used in an amount of 0.001 to 1 part by mass relative to 100 parts by mass of the polymerizable compound for color tone control.

<Polymerizable Compound>

In the present invention, as the polymerizable compound, any known compound can be used with no limitation, and examples thereof include a radical-polymerizable compound such as a (meth)acrylate compound, a cationic-polymerizable compound such as an epoxy compound and an oxetane compound, and a polymerizable compound such as an isocyanate compound and an alcohol compound.

<Iso(Thio) Cyanate Compound>

A composition containing an iso(thio)cyanate compound and an active hydrogen-having compound is preferably used. An iso(thio) cyanate compound indicates a compound having an isocyanate group or an isothiocyanate group, and may also be a compound having both an isocyanate group and an isothiocyanate group.

Any known iso(thio)cyanate compound is usable with no specific limitation, but preferred is an iso(thio)cyanate compound containing a polyisocyanate group having a polyiso (thio)cyanate group having 2 or more iso(thio)cyanate groups in one molecule. Especially preferred are a polyiso (thio)cyanate compound having an aromatic ring such as m-xylylene diisocyanate and 4,4'-diphenylmethane diisocyanate, and an aliphatic polyiso(thio)cyanate compound such as norbornane diisocyanate and dicyclohexylmethane-4,4'-diisocyanate.

<Active Hydrogen-Having Compound>

Any active hydrogen-having compound is usable with no specific limitation, but preferred is a compound having a hydroxy group and/or a thiol group. In particular, a polyfunctional compound having 2 or more active hydrogens in one molecule is preferred. Specific examples of the active hydrogen-having compound include a polyfunctional thiol compound such as pentaerythritol tetrakis(3-mercaptopropionate) and 4-mercaptomethyl-3,6-dithia-octanedithiol, and a polyfunctional alcohol such as trimethylolpropane and pentaerythritol. Preferably, the composition contains any of these.

<Preferred Combination of Polymerizable Compounds>

Among the above-mentioned iso(thio)cyanate compound and the above-mentioned active hydrogen-having compound, the following combination can give a photochromic curable composition capable of suppressing cloudiness of the resultant photochromic cured product and capable of exhibiting better photochromic characteristics.

Specifically, a photochromic curable composition is preferred, in which:

the polymerizable compound contains:

(A) a polyiso(thio)cyanate compound having 2 or more iso(thio)cyanate groups in the molecule (hereinafter may be simply referred to as "component (A)"), (B) a polyfunctional compound having 2 or more active hydrogens in one molecule (hereinafter may be simply referred to as "component (B)"), and (C) a monofunctional compound having one active hydrogen in one molecule (hereinafter may be simply referred to as "component (C)"), and in which:

the amount of the component (C) is 1 to 2000 mol per mol of the oligomer chain group A in the photochromic compound.

<(A) Polyiso(thio)cyanate Compound>

The polyiso(thio)cyanate compound (A) to constitute the photochromic curable composition of the present invention is a compound having 2 or more iso(thio)cyanate group in the molecule. In the present invention, an iso(thio)cyanate group indicates an isocyanate group or an isothiocyanate group. "Having 2 or more iso(thio)cyanate groups in the molecule" means that the compound has 2 or more isocyanate groups in the molecule, or has 2 or more isothiocyanate groups in the molecule, or the total number of the isocyanate groups and the isothiocyanate groups in the molecule is 2 or more.

In the component (A), the number of the iso(thio)cyanate groups is not specifically limited so far as the number is 2 or more. Above all, from the viewpoint of easy polymerization control, the number is preferably 2 to 6, more preferably 2 to 4, even more preferably 2.

Of the polyiso(thio)cyanate compound, the polyisocyanate compound (compound having 2 or more isocyanate groups in the molecule) includes an aliphatic isocyanate compound, an alicyclic isocyanate compound, an aromatic isocyanate compound, a sulfur-containing aliphatic isocyanate compound, an aliphatic sulfide-based isocyanate compound, an aromatic sulfide-based isocyanate compound, an aliphatic sulfone-based isocyanate compound, an aromatic sulfone-based isocyanate compound, a sulfonate-based isocyanate compound, an aromatic sulfonamide-based isocyanate compound, and a sulfur-containing heterocyclic isocyanate compound.

<Preferred Polyisocyanate Compound (A)>

Among the above-mentioned polyisocyanate compounds, a compound favorable for forming optical articles excellent in transparency and mechanical strength, especially a compound favorable for forming optical articles containing a photochromic compound includes the following compounds.

Preferred examples of the polyisocyanate compound (A) include compounds represented by the following formulae (I) to (VIII).

<Alkylene Chain-Having Polyisocyanate Compound>

A compound represented by the following formula (I) is preferably used.

$$OCN—R^{100}—NCO \quad (I)$$

In the formula:

$R^{100}$ represents an alkylene group having 1 to 10 carbon atoms, and a part of methylene groups in the chain of the alkylene group may be substituted with a sulfur atom.

$R^{100}$ is an alkylene group having 1 to 10 carbon atoms, and may be a linear or branched group. Above all, a linear group such as a pentamethylene group, a hexamethylene group, a heptamethylene group or an octamethylene group, or a branched group in which a part of the hydrogen atom in a pentamethylene group, a hexamethylene group, a heptamethylene group or an octamethylene group is substituted with a methyl group is preferred. As an alkylene group in which a part of the methylene group is substituted with a sulfur atom, a group of $—CH_2CH_2SCH_2CH_2SCH_2CH_2—$ is preferred.

Specific examples of the compound represented by the formula (I) include pentamethylene diisocyanate, hexamethylene diisocyanate, heptamethylene diisocyanate, octamethylene diisocyanate, and 2,4,4-trimethylhexamethylene diisocyanate 1,2-bis(2-isocyanatoethylthio)ethane. One alone or two or more kinds of these compounds may be used.

<Polyisocyanate Compound Having Phenyl Group or Cyclohexane Group (Ring)>

Using a compound represented by the following formula (II) or the following formula (III) is preferred.

(II)

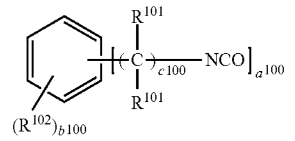

(III)

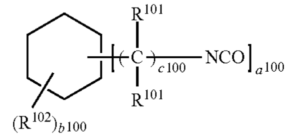

In the formulae:

$R^{101}$ each represents an alkyl group having 1 to 4 carbon atoms, or a hydrogen atom, and this may be the same group or a different group, $R^{102}$ represents an alkyl group having 1 to 4 carbon atoms, and plural groups, if any, may be the same groups or different groups.

$a^{100}$ represents an integer of 2 or 3, $b^{100}$ represents an integer of 0 to 4, $c^{100}$ represents an integer of 0 to 4.

The difference between the compound represented by the formula (II) and the compound represented by the formula (III) is that the former is a compound having a phenyl group (compound represented by the formula (II)) and the latter is a compound having a cyclohexane group (ring) (compound represented by the formula (III)).

The alkyl group having 1 to 4 carbon atoms for $R^{101}$ may be a linear or branched group. Above all, $R^{101}$ is especially preferably a hydrogen atom, a methyl group or an ethyl group. The alkyl group having 1 to 4 carbon atoms for $R^{102}$ may be a linear or branched group. Above all, $R^{102}$ is especially preferably a methyl group or an ethyl group.

Specific examples of the compound represented by the formula (II) or the formula (III) include isophorone diisocyanate, xylene diisocyanate (o-, m-, p-), 2,4-tolylene diisocyanate, and 2,6-tolylene diisocyanate. One alone or two or more kinds of these compounds may be used.

<Polyisocyanate Compound Having Two Phenyl Groups or Two Cyclohexane Groups (Rings)>

Using a compound represented by the following formula (IV) or formula (V) is preferred.

(IV)

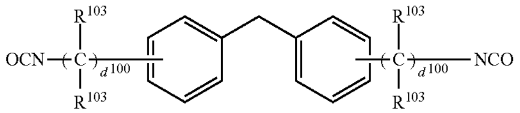

(V)

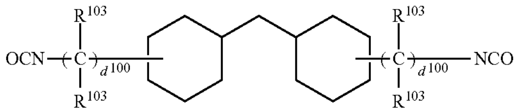

In the formulae:

$R^{103}$ each represents an alkyl group having 1 to 4 carbon atoms, or a hydrogen atom, and these may be the same groups or different groups, and $d^{100}$ represents an integer of 0 to 4.

The difference between the compound represented by the formula (IV) and the compound represented by the formula (V) is that the former is a compound having two phenyl groups (compound represented by the formula (IV)) and the latter is a compound having two cyclohexane groups (rings) (compound represented by the formula (V)).

The alkyl group having 1 to 4 carbon atoms for $R^{103}$ may be a linear or branched group. Above all, $R^{103}$ is especially preferably a hydrogen atom, a methyl group or an ethyl group.

Specific examples of the compound represented by the formula (IV) or the formula (V) include 4,4'-diphenylmethane diisocyanate, and dicyclohexylmethane-4,4'-diisocyanate. One alone or two or more kinds of these compounds may be used.

<Polyisocyanate Compound Having Norbornane Ring>

The compound is represented by the following formula (VI):

(VI)

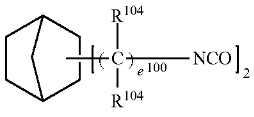

In the formula:

$R^{104}$ each represents an alkyl group having 1 to 4 carbon atoms, or a hydrogen atom, and these may be the same groups or different groups, and $e^{100}$ represents an integer of 0 to 4.

The alkyl group having 1 to 4 carbon atoms for $R^{104}$ may be a linear or branched group. Above all, $R^{104}$ is especially preferably a hydrogen atom, a methyl group or an ethyl group.

Specific examples of the compound represented by the formula (VI) include norbornane diisocyanate, 2,5-bis(isocyanatomethyl)-bicyclo[2,2,1]-heptane, and 2,6-bis(isocyanatomethyl)-bicyclo[2,2,1]-heptane. One alone or two or more kinds of these compounds may be used.

<Polyisocyanate Compound Having Thiophene Ring or Sulfur-Containing Hetero Ring>

Using a compound represented by the following formula (VII) or (VIII) is preferred.

(VII)

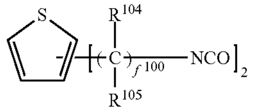

(VIII)

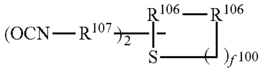

In the formulae:

$R^{105}$ each represents an alkyl group having 1 to 4 carbon atoms, or a hydrogen atom, and these may be the same groups or different groups, $R^{106}$ represents a methylene group, or a sulfur atom, $R^{107}$ represents an alkylene group having 1 to 6 carbon atoms, or a group of the alkylene group having 1 to 6 carbon atoms in which a part of the carbon atom in the chain of alkylene group is an —S— bond, and $f^{100}$ represents an integer of 0 to 2.

Specific examples of the compound represented by the formula (VII) or the formula (VIII) include 2,5-bis(isocyanatomethyl)thiophene, 2,5-bis(isocyanatomethyl)-1,4-dithiane, 3,4-bis(isocyanatomethyl)tetrahydrothiophene, and 4,5-bis (isocyanatomethyl)-1,3-dithiolane. One alone or two or more kinds of these compounds may be used.

Further, a halogen substitution product, an alkyl substitution product, an alkoxy substitution product, or a nitro substitution product of the polyisocyanate, as well as a prepolymer-type modification product with a polyalcohol, a carbodiimide modification product, an urea modification product, a biuret modification product, or a dimerization or trimerization reaction product thereof is also usable.

<Preferred Polyiso(Thio)Cyanate Compound (A) (Compound Having 2 or More Isothiocyanate Groups in the Molecule)>

The polyisothiocyanate compound includes the polyisocyanate compounds represented by the formulae (I) to (VIII) in which the isocyanate group is replaced with an isothiocyanate group. More specifically, the polyisothiocyanate compound includes an aliphatic isothiocyanate compound, an alicyclic isothiocyanate compound, an aromatic isothiocyanate compound, a hetero ring-containing isothiocyanate compound, a sulfur-containing aliphatic isothiocyanate compound, a sulfur-containing aromatic isothiocyanate compound, and a sulfur-containing heterocyclic isothiocyanate compound.

Preferred examples of the polyisocyanate compound having an alkylene chain include hexamethylene diisothiocyanate, 1,2-diisothiocyanatoethane, 1,3-diisothiocyanatopropane, 1,4-diisothiocyanatobutane, 1,6-diisothiocyanatohexane, 2,4,4-trimethylhexanemethylene diisothiocyanate, thiobis(3-isothiocyanatopropane), thiobis (2-isothiocyanatoethane), and dithiobis(2-isothiocyanatoethane).

Preferred examples of the polyisocyanate compound having a phenyl group or a cyclohexane group (ring) include p-phenylenediisopropylidene diisothiocyanate, 1,2-diisothiocyanatobenzene, 1,3-diisothiocyanatobenzene, 1,4-diisothiocyanatobenzene, 2,4-diisothiocyanatotoluene, isophorone diisothiocyanate, xylene diisothiocyanate (o-, m-, p-), 2,4-tolylene diisothiocyanate, 2,6-tolylene diisothiocyanate, and cyclohexane diisothiocyanate.

Preferred examples of the polyisocyanate compound having two phenyl groups or two cyclohexane groups (rings)

include 1,1'-methylenebis(4-isothiocyanatobenzene), 1,1'-methylenebis(4-isothiocyanato-2-methylbenzene), and 1,1'-methylenebis(4-isothiocyanato-3-methylbenzene).

Preferred examples of the polyisocyanate compound having a norbornane ring include 2,4-bis(isothiocyanatomethyl) norbornane, 2,5-bis(isothiocyanatomethyl)norbornane, 2,6-bis(isothiocyanatomethyl)norbornane, 3,5-bis (isothiocyanatomethyl)norbornane, and norbornane diisothiocyanate.

Preferred examples of the polyisocyanate compound having a thiophene ring or a sulfur-containing hetero ring include thiophene-2,5-diisothiocyanate, 1,4-dithiane-2,5-diisothiocyanate, 2,5-bis(isothiocyanatomethyl)-1,4-dithiane, and 4,5-bis(isothiocyanatomethyl)-1,3-dithiolane.

<Component (A); Polyisocyanate Compound Having Isocyanate Group and Isothiocyanate Group>

In the present invention, the compound having both an isocyanate group and an isothiocyanate group as the component (A) includes the following compounds. Examples of the compound include polyisocyanate compounds exemplified hereinabove, in which at least one isocyanate group is an isothiocyanate group. Examples thereof also include polyisothiocyanate compounds exemplified hereinabove, in which at least one isothiocyanate group is an isocyanate group.

<Preferred Examples of Component (A)>

Preferred examples of the polyiso(thio)cyanate compound of the component (A) include pentamethylene diisocyanate, hexamethylene diisocyanate, heptamethylene diisocyanate, octamethylene diisocyanate, isophorone diisocyanate, norbornane diisocyanate, 2,5-bis(isocyanatomethyl)-bicyclo[2,2,1]-heptane, 2,6-bis(isocyanatomethyl)-bicyclo[2,2,1]-heptane, 1,2-bis(2-isocyanatoethylthio)ethane, xylene diisocyanate (o-, m-, p-), 2,4-tolylene diisocyanate, 2,6-tolylene diisocyanate, and 4,4'-diphenylmethane diisocyanate. One alone or a mixture of these may be used.

Next, the polyfunctional compound (B) having 2 or more active hydrogens in one molecule is described.

<Polyfunctional Compound (B) Having 2 or More Active Hydrogens in One Molecule>

The polyfunctional compound having 2 or more active hydrogens in one molecule that constitutes the photochromic curable composition of the present invention is preferably a compound having 2 or more hydroxy groups (OH groups) or thiol groups (SH groups) in the compound. Using a compound having hydroxyl groups or thiol groups facilitates polymerization control.

Among the polyfunctional compound, the compound having 2 or more hydroxy groups or thiol groups may be simply referred to as "poly(thi)ol compound (B)". Regarding the poly(thi)ol compound (B), the compound having 2 or more active hydrogens (active hydrogen-containing groups) in the molecule indicates a compound having 2 or more hydroxy groups in the molecule or having 2 or more thiol groups in the molecule, or indicates a compound in which the total number of the hydroxy group and the thiol group in the molecule is 2 or more. In the component (B), the number of the active hydrogens (active hydrogen-containing groups) is not specifically limited so far as it is 2 or more. Above all, from the viewpoint of easiness in polymerization control, the number is preferably 2 to 6, more preferably 2 to 4, even more preferably 2.

Specifically, the poly(thi)ol compound (B) includes an aliphatic poly(thi)ol compound and an aromatic poly(thi)ol compound. More specifically, the following compounds are mentioned.

<Component (B); Preferred Polyfunctional Compound of Poly(Thi)Ol Compound>

Among the poly(thi)ol compound (B) mentioned above, compounds preferred for forming optical articles excellent in transparency and mechanical strength, especially compounds suitable for producing optical articles containing a photochromic compound include the following compounds. Specifically compounds represented by the following formulae (IX) to (XI), (XIII) to (XV), and (XVII) to (XXII) are mentioned.

(Component (B); Poly(Thi)Ol Compound Having Alkylene Chain or the Like)

Using a compound represented by the following formula (IX) is preferred.

$$R^{108}—B^{100}—R^{108} \quad \text{(IX)}$$

In the formula:

$B^{100}$ represents an alkylene group having 2 to 30 carbon atoms, or an alkenyl group, $R^{108}$ each represents a hydroxy group or an SH group, and these may be the same groups or different groups.

$B^{100}$ is an alkylene group having 2 to 30 carbon atoms, or an alkenyl group, and may be a linear or branched group. Preferably the group is a linear alkylene group having 2 to 15 carbon atoms. Specific examples of the compound represented by the formula (IX) include polyethylene polyol (carbon number, 2 to 15), 1,10-decane-dithiol, and 1,8-octane-dithiol.

<Component (B); Polyfunctional Compound Having 2 or More Ether Bonds or Ester Bonds>

Using a compound represented by the following formula (X) or formula (XI) is preferred.

$$R^{109} \text{—}( O—D^{100} )_{l^{100}} O—R^{109} \quad \text{(X)}$$

(XI)

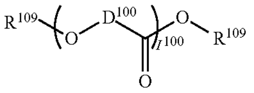

In the formulae:

$D^{100}$ represents an alkylene group having 2 to 15 carbon atoms, or an alkenyl group, $R^{109}$ each represents a hydrogen atom, or a group represented by the following formula (XII):

(XII)

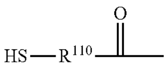

wherein $R^{110}$ represents an alkylene group having 1 to 6 carbon atoms, and these groups may be the same groups or different groups, $l^{100}$ represents an integer of 1 to 100 as an average value.

$D^{100}$ represents an alkylene group having 2 to 15 carbon atoms, or an alkenyl group, and may be a linear or branched group. Preferably the group is a linear alkylene group having 2 to 6 carbon atoms. $R^{110}$ represents an alkylene group having 1 to 6 carbon atoms, and may be a linear or branched group. Above all, $R^{110}$ is especially preferably a methylene group, an ethylene group, a trimethylene group, or a propylene group.

Specific examples of the compound represented by the formula (X) or the compound represented by the formula (XI) include polyethylene glycol (1=1 to 100), polycaprolactone polyol (1=1 to 100), tetraethylene glycol bis(3-mercaptopropionate), 1,4-butanediol bis(3-mercaptopropionate), and 1,6-hexanediol bis(3-mercaptopropionate).

<Component (B); Preferred Polycarbonate Polyol Compound (Polyfunctional Compound)>

Using a compound represented by the following formula (XIII) is preferred.

(XIII)

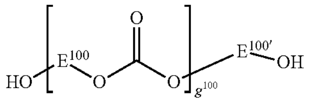

In the formula:

$E^{100}$ and $E^{100'}$ each represent an alkylene group having 2 to 15 carbon atoms, and these may be the same groups or different groups, $g^{100}$ represents a number of 1 to 20 as an average vale.

$E^{100}$ and $E^{100'}$ each are an alkylene group having 2 to 15 carbon atoms, and may be a linear or branched group. Above all, $E^{100}$ and $E^{100'}$ each are especially preferably a trimethylene group, a tetramethylene group, a pentamethylene group, a hexamethylene group, an octamethylene group, a nonamethylene group a dodecamethylene group, a pentadecamethylene group, a 1-methyltriethylene group, a 1-ethyltriethylene group, or a 1-isopropyltriethylene group. Specific examples of the compound represented by the formula (XIII) include polycarbonate polyol ($E^{100}$ and $E^{100}$ each are a pentamethylene group or a hexamethylene group, and $g^{100}$=4 to 10).

<Component (B); Polyfunctional Polyol Compound (Polyfunctional Compound)>

Using a compound represented by the following formula (XIV) is preferred.

(XIV)

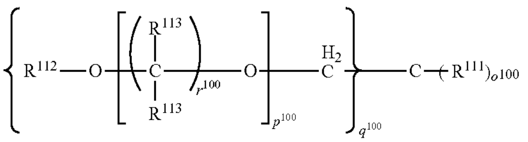

In the formula:

$R^{111}$ represents an alkyl group having 1 to 6 carbon atoms, and plural groups, if any, may be the same or different, $R^{112}$ represents a hydrogen atom or is the same as in the formula (XII), and these may be the same or different, $R^{113}$ each represents a hydrogen atom, a methyl group, an ethyl group, or a hydrogen atom, and these may be the same group or different, $o^{100}$ represents 0 to 2, $q^{100}$ represents 2 to 4, $o^{100}+q^{100}$ is 4, $p^{100}$ represents 0 to 10, $r^{100}$ represents 1 to 6.

$R^{111}$ represents an alkyl group having 2 to 15 carbon atoms, and may be a linear or branched group. Above all, $R^{111}$ is especially preferably a methyl group, an ethyl group, a trimethyl group, or a propyl group.

Specific examples of the compound represented by the formula (XIV) include trimethylolpropane tripolyoxyethylene ether (TMP-30 from Nippon Nyukazai Co., Ltd.), trimethylolpropane, pentaerythritol, trimethylolpropane tris(3-mercaptopropionate), and pentaerythritol tetrakis(3-mercaptopropionate).

<Component (B); Polyol Compound Having Ether Bond (Polyfunctional Compound)>

Using a compound represented by the following formula (XV) is preferred.

$$(F^{100})_3-C-O-C-(F^{100})_3 \qquad \text{(XV)}$$

In the formula:

$F^{100}$ each represents an alkyl group having 1 to 6 carbon atoms, or the following formula (XVI):

(XVI)

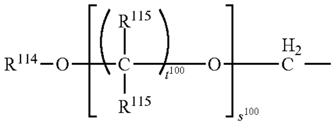

wherein, $R^{114}$ represents a hydrogen atom, or a group having the same meaning as in the formula (XII), and these may be the same group or a different group, $R^{115}$ each represents a methyl group, an ethyl group or a hydrogen atom, and these may be the same group or a different group, $s^{100}$ represents 0 to 10, $t^{100}$ represents 1 to 6, provided that at least two of $F^{100}$'s are a group represented by the formula (XVI).

At least two of $F^{100}$'s are a group represented by the formula (XVI). Examples of the other groups include an alkyl group having 1 to 6 carbon atoms, and may be a linear or branched group. Above all, $F^{100}$ is especially preferably a methyl group, an ethyl group, a trimethyl group, or a propyl group. Two or more $F^{100}$'s may be the same groups or different groups so far as they are a group represented by the formula (XVI). Specific examples of the compound represented by the formula (XV) include ditrimethylolpropane, and dipentaerythritolhexakis(3-mercaptopropionate).

<Component (B); polyol compound having two hydroxy groups (polyfunctional compound)>

Using a compound represented by the following formula (XVII) is preferred.

(XVII)

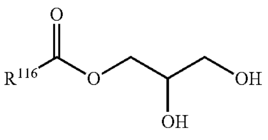

In the formula:

$R^{116}$ represents an alkyl group having 1 to 30 carbon atoms, or an alkenyl group.

$R^{116}$ represents an alkyl group having 1 to 30 carbon atoms, or an alkenyl group having 1 to 30 carbon atoms, and may be a linear or branched group. The formula (XVII) can be produced through condensation of a fatty acid and a glycerin, and specifically, therefore, $R^{116}$ includes an alkyl moiety or an alkenyl moiety of a fatty acid. The fatty acid includes capric acid, lauric acid, myristic acid, pentadecylic acid, palmitic acid, margaric acid, stearic acid, oleic acid, linolic acid, arachidic acid, behenic acid, and lignoceric acid.

Specific examples of the compound represented by the formula (XVII) include glyceryl monooleate (Monoolein from Tokyo Chemical Industry Co., Ltd.), monoelaidin, glyceryl monolinolate, and glyceryl monobehenate.

<Component (B); Polyfunctional Polythiol Compound (Polyfunctional Compound)>

Using a compound represented by the following formula (XVIII) is preferred.

$$(HS-R^{118})_{u100}-C-(R^{117})_{v100} \quad \text{(XVIII)}$$

In the formula:

$R^{117}$ represents a hydrogen atom, an alkyl group having 1 to 6 carbon atoms, or a group of the alkyl group having 1 to 6 carbon atoms in which a part of the methylene group in the chain is an —S— bond, plural $R^{117}$'s, if any may be the same groups or different groups, $R^{118}$ represents an alkylene group having 1 to 10 carbon atoms, a group of the alkylene group having 1 to 10 carbon atoms in which a part of the methylene group in the chain is an —S— bond, or a group of the alkylene group having 1 to 10 carbon atoms in which a part of the hydrogen atom in the chain is substituted with an SH group, and plural $R^{118}$'s, if any, may be the same groups or different groups, $u^{100}$ represents an integer of 2 to 4, and $v^{100}$ represents an integer of 0 to 2.

The alkyl group having 1 to 6 carbon atoms for $R^{117}$ may be a linear or branched group, and above all, $R^{117}$ is preferably a hydrogen atom, a methyl group or an ethyl group. Specifically the group of an alkyl group having 1 to 6 carbon atoms in which a part of the methylene groups in the chain is an —S— bond includes $-CH_2SCH_3$.

The alkylene group having 1 to 10 carbon atoms for $R^{118}$ may be a linear or branched group. Above all, $R^{118}$ is especially preferably a methylene group, an ethylene group, a trimethylene group or a propylene group. Specifically the group of an alkylene group having 1 to 10 carbon atoms in which a part of the methylene group in the chain is an —S— bond includes $-CH_2S-$, $-CH_2CH_2S-$, and $-CH_2CH_2CH_2S-$. The group of an alkyl group having 1 to 6 carbon atoms in which a part of the hydrogen atoms in the chain is substituted with an SH group includes $-CH_2SCH(SCH_2SH)-$.

Specific examples of the compound represented by the formula (XVIII) include 1,2-bis[(2-mercaptoethyl)thio]-3-mercaptopropane, 2,2-bis(mercaptomethyl)-1,4-butanedithiol, 4-mercaptomethyl-1,8-dimercapto-3,6-dithiaoctane, 1,1,1,1-tetrakis(mercaptomethyl)methane, 1,1,3,3-tetrakis (mercaptomethylthio)propane, and 1,1,2,2-tetrakis(mercaptomethylthio)ethane.

<Component (B); Cyclic Polythiol Compound (Polyfunctional Compound)>

Using a compound represented by the following formula (XIX) is preferred.

(XIX)

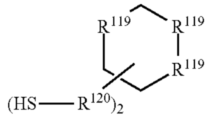

In the formula:

$R^{119}$ represents a methylene group or a sulfur atom, and at least two of three $R^{119}$'s are sulfur atoms, $R^{120}$ represents an alkylene group having 1 to 6 carbon atoms, or a group of the alkylene group having 1 to 6 carbon atoms in which a part of the methylene groups in the chain is an —S— bond.

The alkylene group having 1 to 6 carbon atoms for $R^{120}$ may be a linear or branched group. Above all, $R^{120}$ is preferably a methylene group, an ethylene group, a trimethylene group or a propylene group. Specifically the group of an alkylene group having 1 to 6 carbon atoms in which a part of the methylene groups in the chain is an —S— bond includes $-CH_2S-$, and $-CH_2CH_2S-$. Specific examples of the compound represented by the formula (XIX) include 2,5-bis(mercaptomethyl)-1,4-dithiane, and 4,6-bis(mercaptomethylthio)-1,3-dithiane.

<Component (B); Phenyl Group-Containing Polythiol Compound (Polyfunctional Compound)>

A compound represented by the following formula (XX) is preferably used.

(XX)

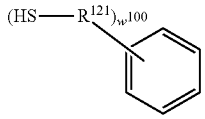

In the formula:

$R^{121}$ represents an alkylene group having 1 to 6 carbon atoms, or a group of the alkylene group having 1 to 6 carbon atoms in which a part of the methylene group in the chain is an —S— bond, and $w^{100}$ represents 2 to 3.

The alkylene group having 1 to 6 carbon atoms for $R^{121}$ may be a linear or branched group. Above all, $R^{121}$ is preferably a methylene group, an ethylene group, a trimethylene group or a propylene group. Specifically the group of an alkylene group having 1 to 6 carbon atoms in which a part of the methylene group in the chain is an —S— bond includes $-CH_2CH_2CH_2SCH_2-$, $-CH_2CH_2SCH_2-$, and $-CH_2SCH_2-$. Specific examples of the compound represented by the formula (XX) include 1,4-bis(mercaptopropylthiomethyl)benzene.

<Component (B); Poly(Thi)Ol Compound Having Triazine Ring (Polyfunctional Compound)>

Using a compound represented by the following formula (XXI) is preferred.

(XXI)

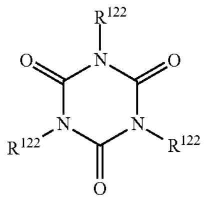

In the formula:

$R^{122}$ each represents an alkyl group having 1 to 6 carbon atoms, or a group represented by the following formula (XXII):

(XXII)

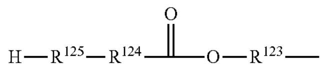

wherein, $R^{123}$ and $R^{124}$ each represents an alkylene group having 1 to 6 carbon atoms, $R^{125}$ represents an oxygen atom or a sulfur atom, provided that at least two $R^{122}$'s are a group represented by the formula (XXII), and $R^{122}$'s may be the same groups or different groups.

The alkylene group having 1 to 6 carbon atoms for $R^{123}$ and $R^{124}$ may be a linear or branched group. Above all, $R^{123}$ and $R^{124}$ are preferably a methylene group, an ethylene group, a trimethylene group or a propylene group. Specific examples of the compound represented by the formula (XXI) include tris-{(3-mercaptopropionyloxy)-ethyl} isocyanurate.

<Component (B); Compound Having Silsesquioxane Structure (Polyfunctional Compound)>

A compound having a silsesquioxane structure can be used as the component (B). A silsesquioxane polymerizable compound has various cage-type, ladder-type or random molecular structures, and is a compound represented by the following formula (XXIII):

$$R^{500}\text{—}SiO_{3/2})_{n^{100}} \quad \text{(XXIII)}$$

In the formula, plural $R^{500}$'s may be the same as or different from each other, and each represent a hydrogen atom, an alkyl group, a cycloalkyl group, an alkoxy group, a phenyl group, or an organic group having 2 or more hydroxy groups and/or thiol groups in one molecule, and the polymerization degree $n^{100}$ is an integer of 3 to 100.

<Preferred Examples of Component (B)>

In the present invention, the component (B) can be used with no specific limitation, and may be used singly or may be used as a combination of plural kinds of the component. In consideration of the photochromic characteristics of the resultant photochromic cured product, preferred examples of the poly(thi)ol compound for the component (B) include polyethylene polyol, polycaprolactone polyol, polycarbonate polyol, trimethylolpropane, pentaerythritol, trimethylolpropane tris(3-mercaptopropionate), pentaerythritol tetrakis (3-mercaptopropionate), dipentaerythritol hexakis(3-mercaptopropionate), tetraethylene glycol bis(3-mercaptopropionate), 1,4-butanediol bis(3-mercaptopropionate), 1,6-hexanediol bis(3-mercaptopropionate), 1,2-bis[(2-mercaptoethyl)thio]-3-mercaptopropane, 2,2-bis(mercaptomethyl)-1,4-butanedithiol, 1,4-bis(mercaptopropylthiomethyl)benzene, 2,5-bis(mercaptomethyl)-1,4-dithiane, 4-mercaptomethyl-1,8-dimercapto-3,6-dithiaoctane, 1,1,1,1-tetrakis(mercaptomethyl)methane, 1,1,3,3-tetrakis(mercaptomethylthio)propane, 1,1,2,2-tetrakis(mercaptomethylthio)ethane, 4,6-bis (mercaptomethylthio)-1,3-dithiane, 2-mercaptomethanol, and tris-{(3-mercaptopropionyloxy)-ethyl} isocyanurate.

Next, the functional compound (C) having one active hydrogen in one molecule is described.

<Monofunctional Compound (C) Having One Active Hydrogen in One Molecule>

In the present invention, the component (C) of a monofunctional compound having one active hydrogen in one molecule is preferably a compound having one hydroxy group (OH group) or one thiol group (SH group) in the compound. Using a compound having a hydroxy group or a thiol group facilitates polymerization control. Hereinunder the compound having one active hydrogen-containing group of a hydroxy group or a thiol group in one molecule may be simply referred to as a mono(thi)ol compound (C). Using a specific amount of the component (C) is one characteristic feature of the present invention.

The photochromic cured product to be obtained according to the method of the present invention is obtained, for example, by reacting the above-mentioned polyiso(thio) cyanate compound (A) and the poly(thi)ol compound (B), and therefore can be a rigid cured product having a network structure having a (thio)urethane bond. The photochromic compound for use in the present invention has an oligomer chain group A as mentioned hereinabove. By having the oligomer chain group A, a photochromic compound can exhibit excellent photochromic characteristics also in a photochromic cured product, but depending on the kind and the molecular weight of the oligomer chain group A to be used, the compound may have a poor miscibility with a polymer matrix, and the resultant photochromic cured product may often become cloudy, In the present invention, it is considered that, by using the component (C), the miscibility between the photochromic compound having an oligomer chain group A and the polymer matrix can be improved, and it is also considered that the resultant photochromic cured product can be prevented from becoming cloudy. Further, by controlling the amount of the component (C) to be added, the mechanical characteristics of the resultant cured product can be readily controlled. Comparing a photochromic curable composition containing only the poly(thi)ol compound (B) and a photochromic curable composition containing the mono(thi)ol compound (C), the number of hydrogen bonds can be reduced in the latter composition. Therefore, the viscosity of the photochromic curable composition can be reduced and it is considered that the handleability and the moldability of the composition in casting can be thereby improved.

In the present invention, as described above, by introducing an alkenyl group having 10 to 30 carbon atoms into a photochromic compound having an oligomer chain group A, the photochromic cured product obtained by curing the photochromic curable composition containing the photochromic compound can be prevented from becoming cloudy. Further, by adding the above-mentioned component (C) to the photochromic curable composition, the photochromic cured product can be more effectively prevented from becoming cloudy.

<Component (C); Monothiol Compound (Monofunctional Compound)>

In the present invention, the mono-ol compound (compound having one hydroxy group) among the mono(thi)ol compounds (C) includes a linear or branched, saturated or unsaturated alkyl alcohol.

Specifically, examples of the mono-ol compound include the following compounds:

A polyoxyethylene monoalkyl ether compound, a polyoxypropylene compound, and a polyoxyethylene polyoxypropylene monoalkyl ether compound are preferably used, in which the alkyl group is a hydrocarbon group having 1 to 50 carbon atoms. From the viewpoint of easy availability of the compound, the group is preferably a methyl group, an ethyl group, a propyl group, a butyl group, a lauryl group, a cetyl group, a stearyl group, an oleyl group, a myristyl group, an octyldodecyl group, a decyl group, an isodecyl group, a behenyl group, a 2-ethylhexyl group, a nonyl group, an isodecyl group, a tridecyl group, an isostearyl group or a cholesteryl group.

A polyoxyethylene alkyl phenyl ether compound is mentioned, including polyoxyethylene octyl phenyl ether, nonyl phenyl ether, dodecyl phenyl ether-chain polyoxyethylene phenyl ether, polyoxyethylene benzyl ether, polyoxyethylene bisphenol A ether, and polyoxyethylene bisphenol F ether.

A polyoxyethylene monoalkyl ester compound is mentioned, including polyoxyethylene monolaurate, polyoxyethylene monostearate, polyoxyethylene monooleate, polyoxyethylene monomyristate, and polyoxyethylene monoisostearate.

A polyoxypropylene monoalkyl ester compound is mentioned, including polyoxypropylene monolaurate, polyoxypropylene monooleate, and polyoxypropylene monoisostearate.

A glycerol bisester compound is mentioned, including glyceryl dioleate, glyceryl distearate, glyceryl dilaurate, and glyceryl diisostearate.

<Component (C); Monothiol Compound (Monofunctional Compound)>

In the present invention, the monothiol compound (compound having one thiol group) among the mono(thi)ol compounds (C) includes 3-methoxybutyl thioglycolate, 2-ethylhexyl thioglycolate, 2-mercaptoethyl octanoate, 3-methoxybutyl 3-mercaptopropionate, ethyl 3-mercaptopropionate, 2-octyl 3-mercaptopropionate, n-octyl 3-mercaptopropionate, methyl 3-mercaptopropionate, tridecyl 3-mercaptopropionate, stearyl 3-mercaptopropionate, and a linear or branched structure-having, saturated or unsaturated alkylthiol having 5 to 30 carbon atoms.

<Component (C); Preferred Compounds (Monofunctional Compounds)>

In the present invention, from the viewpoint that the resultant photochromic cured product can be prevented from becoming cloudy even by addition of small amounts of the compound, a polyoxyethylene monoalkyl ether, a polyoxypropylene monoalkyl ether, or a polyoxyethylene polyoxypropylene monoalkyl ether having an alkyl group having 3 to 50 carbon stoms substituted is preferred, and a polyoxyethylene monoalkyl ether is most preferred.

<Blending Ratio of Component (A), Component (B) and Component (C)>

In the present invention, where a photochromic curable composition containing the component (A), the component (B) and the component (C) is used, the (thio)urethane resin forms a base in the resultant photochromic cured product. Consequently the photochromic performance, the durability and the mechanical characteristics of the resultant photochromic cured product can be appropriately controlled by controlling the blending ratio of the components (A), (B) and (C). When the total molar number of the iso(thio) cyanate group in the component (A) is represented by n1, the total molar number of the active hydrogen in the component (B) is by n2, and the total molar number of the active hydrogen in the component (C) is by n3, the following is preferred for improving the photochromic performance, the durability and the mechanical characteristics of the resultant photochromic cured product.

Preferably n1/(n2+n3)=(0.9 to 1.5)/1, more preferably n1/(n2+n3)=(0.95 to 1.3)/1, even more preferably n1/(n2+n3)=(1.0 to 1.15)/1.

At that time, preferably n2/n3=(1 to 300)/1, more preferably n2/n3=(3 to 200)/1, even more preferably n2/n3=(5 to 150)/1.

Further, for improving the moldability in production of a photochromic cured product, it is effective to cure a photochromic curable composition having a low viscosity. Accordingly the component (C) having a high molecular weight can be used alone, but parallel use thereof with the component (C) having a low viscosity and a low molecular weight can improve the moldability.

<Preferred Blending Ratio for Photochromic Curable Composition Using Component (A), Component (B) and Component (C)>

In the present invention, from the viewpoint of preventing the photochromic cured product from becoming cloudy more effectively the blending ratio of the photochromic compound and the component (C) is preferably as follows.

Specifically, the amount of the component (C) is preferably within a range of 1 to 2000 mol per mol of the oligomer chain group A in the photochromic compound. When the blending ratio of the component (C) satisfies the above range, not only excellent characteristics can be exhibited but also the molar ratio of the component (A), the component (B) and the component (C) falling within the above-mentioned range can be readily controlled. As a result, mechanical characteristics can be improved. When the component (C) is less than 1 mol, the cloudiness preventing effect tends to lower. On the other hand, when the amount is more than 2000 mol, the mechanical characteristics of the resultant cured product tend to worsen. In consideration of the cloudiness preventing effect and the mechanical characteristics of the resultant cured product, preferably, the component (C) is blended in a range of 10 to 1500 mol, more preferably in a range of 50 to 1300 mol.

<Preparation of Photochromic Curable Composition Containing Component (A), Component (B) and Component (C)>

In the present invention, a photochromic curable composition can be prepared by mixing the component (A), the component (B), the component (C) and a photochromic compound. However, the component (A), the component (B) and the component (C) may relatively rapidly undergo reaction (polymerization), and therefore the mixing order may be as follows.

For example, the photochromic curable composition can be a combination of a pre-mixture 1 of the component (A) and a photochromic compound, and a pre-mixture 2 of the component (B) and the component (C). These pre-mixtures may be mixed together.

The photochromic curable composition may also be a combination of a pre-mixture 3 of the component (B), the component (C) and a photochromic compound, and a mixture of the component (A). These pre-mixtures may be mixed together.

<Photochromic Curable Composition Using <Iso(Thio)Cyanate Compound> and (Active Hydrogen-Having Compound> as Polymerizable Compounds; Other Blending Components>

In the present invention, various known compounding ingredients, for example, various stabilizers such as (E) a resin modifier, (F) a polymerization curing accelerator, (G) an internal release agent, a UV absorbent, an antistatic agent, an IR absorbent, a UV stabilizer, an antioxidant, a coloration protector, an antistatic agent, a fluorescent dye, a dye, a pigment, a fragrance, as well as an additive, a solvent, a leveling agent, and further, as a polymerization controlling agent, thiols such as t-dodecylmercaptan can be blended in the photochromic curable composition, as needed. These blending ingredients can be blended at the same time in producing the photochromic curable composition. So as not to have any negative influence on reaction and in accordance with each performance thereof, for example, the ingredients can be blended in the above-mentioned pre-mixture 1, the above-mentioned pre-mixture 2 or the above-mentioned pre-mixture 3.

<(E) Resin Modifier>

In the present invention, for the purpose of refractivity improvement or hardness regulation of the resultant cured product, a resin modifier can be added. For example, there are mentioned an episulfide compound, a thietanyl compound, a polyamine compound, an epoxy compound, and an olefin compound including a (meth)acrylate compound. Specific examples thereof are described below.

<Resin Modifier (E); Episulfide Compound>

In the present invention, the episulfide compound is a compound having 2 or more episulfide groups in one molecule, and the episulfide group undergoes ring-opening polymerization and can therefore produce a cured product. The compound can be added for the purpose of increasing the refractivity of photochromic cured products. Specific examples of the compound are shown below.

Bis(1,2-epithioethyl) sulfide, bis(1,2-epithioethyl) disulfide, bis(2,3-epithiopropyl) sulfide, bis(2,3-epithiopropylthio)methane, bis(2,3-epithiopropyl) disulfide, bis(2,3-epithiopropyldithio)methane, bis(2,3-epithiopropyldithio) ethane, bis(6,7-epithio-3,4-dithiaheptyl) sulfide, bis(6,7-epithio-3,4-dithiaheptyl) disulfide, 1,4-dithiane-2,5-bis(2,3-epithiopopyldithiomethyl), 1,3-bis(2,3-epithiopropyldithiomethyl)benzene, 1,6-bis(2,3-epithiopropyldithiomethyl)-2-(2,3-epithiopropyldithioethylthio)-4-thia hexane, 1,2,3-tris(2,3-epithiopropyldithio)propane, 1,1,1,1-tetrakis(2,3-epithiopropyldithiomethyl)methane, 1,3-bis(2,3-epithiopropyldithio)-2-thiapropane, 1,4-bis(2,3-epithiopropyldithio)-2,3-dithiabutane, 1,1,1-tris(2,3-epithiopropyldithio)methane, 1,1,1-tris(2,3-epithiopropyldithiomethylthio)methane, 1,1,2,2-tetrakis(2,3-epithiopropyldithio)ethane, 1,1,2,2-tetrakis(2,3-epithiopropyldithiomethylthio)ethane, 1,1,3,3-tetrakis(2,3-epithiopropyldithio)propane, 1,1,3,3-tetrakis(2,3-epithiopropyldithiomethylthio)propane, 2-[1,1-bis(2,3-epithiopropyldithio)methyl]-1,3-dithietane, 2-[1,1-bis(2,3-epithiopropyldithiomethylthio)methyl]-1.3-dithietane.

<Resin Modifier (E); Thietanyl Compound>

In the present invention, the thietanyl compound is a thietane compound having 2 or more thietanyl groups in one molecule, and cures through ring-opening polymerization. The compound can be added for the purpose of increasing the refractivity of photochromic cured products. Some thietanyl compounds have an episulfide group along with plural thietanyl groups, and these are shown in the above-mentioned section of episulfide compounds. Other thietane compounds include metal-containing thietanyl compounds having a metal atom in the molecule and metal-free thietane compounds not containing a metal. Specific examples of these thietanyl compounds are shown below.

Metal-free thietane compounds; bis(3-thietanyl) disulfide, bis(3-thietanyl) sulfide, bis(3-thietanyl) trisulfide, bis(3-thietanyl) tetrasulfide, 1,4-bis(3-thietanyl)-1,3,4-trithiabutane, 1,5-bis(3-thietanyl)-1,2,4,5-tetrathiapentane, 1,6-bis(3-thietanyl)-1,3,4,6-tetrathiahexane, 1,6-bis(3-thietanyl)-1,3,5,6-tetrathiahexane, 1,7-bis(3-thietanyl)-1,2,4,5,7-pentathiaheptane, 1,7-bis(3-thietanylthio)-1,2,4,6,7-pentathiaheptane, 1,1-bis(3-thietanylthio)methane, 1,2-bis(3-thietanylthio)ethane, 1,2,3-tris(3-thietanylthio)propane, 1,8-bis(3-thietanylthio)-4-(3-thietanylthiomethyl)-3,6-dithiaoctane, 1,11-bis(3-thietanylthio)-4,8-bis(3-thietanylthiomethyl)-3,6,9-trithiaundecane, 1,11-bis(3-thietanylthio)-4,7-bis(3-thietanylthiomethyl)-3,6,9-trithiaundecane, 1,11-bis(3-thietanylthio)-5,7-bis(3-thietanylthiomethyl)-3,6,9-trithiaundecane, 2,5-bis(3-thietanylthiomethyl)-1,4-dithiane, 2,5-bis[[2-(3-thietanylthio)ethyl]thiomethyl]-1,4-dithiane, 2,5-bis(3-thietanylthiomethyl)-2,5-dimethyl-1,4-dithiane, bisthietanyl sulfide, bis(thietanylthio)methane, 3-[<(thietanylthio)methylthio>methylthio]thietane, bisthietanyl disulfide, bisthietanyl trisulfide, bisthietanyl tetrasulfide, bisthietanyl pentasulfide, 1,4-bis(3-thietanyldithio)-2,3-dithiabutane, 1,1,1-tris(3-thietanyldithio)methane, 1,1,1-tris(3-thietanyldithiomethylthio)methane, 1,1,2,2-tetrakis(3-thietanyldithio)ethane, 1,1,2,2-tetrakis(3-thietanyldithiomethylthio)ethane.

<Resin Modifier (E), Metal-Containing Thietane Compound>

The thietane compound contains, as a metal atom, a Group 14 element such as an Sn atom, an Si atom, a Ge atom or Pb atom; a Group 4 element such as a Zr atom or a Ti atom; a Group 13 element such as an Al atom; or a Group 12 element such as a Zn atom, in the molecule, and preferred examples thereof include the following compounds.

An alkylthio(thietanylthio)tin including methylthiotris (thietanylthio) tin, ethylthiotris(thietanylthio)tin, propylthiotris(thietanylthio)tin, and isopropylthiotris(thietanylthio) tin.

A bis(alkylthio)bis(thietanylthio)tin including bis(methylthio)bis(thietanylthio)tin, bis(ethylthio)bis(thietanylthio) tin, bis(propylthio)bis(thietanylthio)tin, and bis(isopropylthio)bis(thietanylthio)tin.

An alkylthio(alkylthio)bis(thietanyl)tin including ethylthio(methylthio)bis(thietanylthio)tin, methylthio(propylthio) bis(thietanylthio)tin, isopropylthio(methylthio)bis(thietanylthio)tin, ethylthio(propylthio)bis(thietanylthio)tin, ethylthio(isopropylthio)bis(thietanylthio)tin, and isopropylthio(propylthio)bis(thietanylthio)tin.

A bis(thietanylthio) cyclodithiotin compound including bis(thietanylthio)dithia stannetane, bis(thietanylthio)dithiastannolane, bis(thietanylthio)dithiastanninane, and bis(thietanylthio)trithiastannocane.

An alkyl(thietanylthio)tin compound including methyltris (thietanylthio)tin, dimethylbis(thietanylthio)tin, butyltris (thietanylthio)tin, tetrakis(thietanylthio)tin, tetrakis(thietanylthio)germanium, and tris(thietanylthio)bismuth.

<Resin Modifier (E); Polyamine Compound>

In the present invention, the polyamine compound is a compound having 2 or more $NH_2$ groups in one molecule, and this forms an urea bond through reaction with a polyisocyanate and forms a thiourea bond through reaction with a polyisothiocyanate. The polyamine compound can be added for hardness control of cured products. Specific examples thereof include the following compounds.

Ethylenediamine, hexamethylenediamine, isophoronediamine, nonamethylenediamine, undecamethylenediamine, dodecamethylenediamine, metaxylylenediamine, 1,3-propanediamine, putrescine, 2-(2-aminoethylamino)ethanol, diethylenetriamine, p-phenylenediamine, m-phenylenediamine, melamine, 1,3,5-benzenetriamine.

<Resin Modifier (E); Epoxy Compound>

In the present invention, the epoxy compound has an epoxy group in the molecule and cures through ring-opening polymerization at the epoxy group. The compound can be added for the purpose of controlling refractivity or controlling lens hardness. Such epoxy compounds are grouped into aliphatic epoxy compounds, alicyclic epoxy compounds and aromatic epoxy compounds, and specific examples thereof are mentioned below.

The aliphatic epoxy compound includes ethylene oxide, 2-ethyloxirane, butyl glycidyl ether, phenyl glycidyl ether, 2,2'-methylenebisoxirane, 1,6-hexanediol diglycidyl ether, ethylene glycol diglycidyl ether, diethylene glycol diglycidyl ether, triethylene glycol diglycidyl ether, tetraethylene glycol diglycidyl ether, nonamethylene glycol diglycidyl ether, propylene glycol diglycidyl ether, dipropylene glycol diglycidyl ether, tripropylene glycol diglycidyl ether, tetrapropylene glycol diglycidyl ether, nonapropylene glycol diglycidyl ether, neopentyl glycol diglycidyl ether, trimethylolpropane triglycidyl ether, glycerol triglycidyl ether, diglycerol tetraglycidyl ether, pentaerythritol tetraglycidyl ether, and tris(2-hydroxyethyl) isocyanurate triglycidyl ether.

The alicyclic epoxy compound includes isophorone-diol diglycidyl ether, and bis-2,2-hydroxycyclohexylpropane diglycidyl ether.

The aromatic epoxy compound includes resorcinol diglycidyl ether, bisphenol A diglycidyl ether, bisphenol F diglycidyl ether, bisphenol S diglycidyl ether, diglycidyl orthophthalate, phenol novolak polyglycidyl ether, and cresol novolak polyglycidyl ether.

In addition to the above, an epoxy compound having a sulfur atom in the molecule along with the epoxy group can also be used. Such a sulfur atom-containing epoxy compound especially contributes toward refractivity improvement, and includes a linear aliphatic compound and a cycloaliphatic compound. Specific examples thereof are mentioned below.

The linear aliphatic sulfur atom-containing epoxy compound includes bis(2,3-epoxypropyl) sulfide, bis(2,3-epoxypropyl) disulfide, bis(2,3-epoxypropylthio)methane, 1,2-bis(2,3-epoxypropylthio)ethane, 1,2-bis(2,3-epoxypropylthio)propane, 1,3-bis(2,3-epoxypropylthio)propane, 1,3-bis(2,3-epoxypropylthio)-2-methylpropane, 1,4-bis(2,3-epoxypropylthio)butane, 1,4-bis(2,3-epoxypropylthio)-2-methylbutane, 1,3-bis(2,3-epoxypropylthio)butane, 1,5-bis(2,3-epoxypropylthio)pentane, 1,5-bis(2,3-epoxypropylthio)-2-methylpentane, 1,5-bis(2,3-epoxypropylthio)-3-thiapentane, 1,6-bis(2,3-epoxypropylthio)hexane, 1,6-bis(2,3-epoxypropylthio)-2-methylhexane, 3,8-bis(2,3-epoxypropylthio)-3,6-dithiaoctane, 1,2,3-tris(2,3-epoxypropylthio)propane, 2,2-bis(2,3-epoxypropyltio)-1,3-bis(2,3-epoxypropylthiomethyl)propane, and 2,2-bis(2,3-epoxypropylthiomethyl)-1-(2,3-epoxypropylthio)butane.

The cycloaliphatic sulfur atom-containing epoxy compound includes 1,3-bis(2,3-epoxypropylthio)cyclohexane, 1,4-bis(2,3-epoxypropylthio)cyclohexane, 1,3-bis(2,3-epoxypropylthiomethyl)cyclohexane, 1,4-bis(2,3-epoxypropylthiomethyl)cyclohexane, 2,5-bis(2,3-epoxypropylthiomethyl)-1,4-dithiane, 2,5-bis[<2-(2,3-epoxypropylthio)ethyl>thiomethyl]-1,4-dithiane, and 2,5-bis(2,3-epoxypropylthiomethyl)-2,5-dimethyl-1,4-dithiane.

(Resin Modifier (E); Radical Polymerizable Functional Group-Having Compound>

The radical polymerizable group-having compound can cure through radical polymerization and therefore can be used for lens hardness control. The radical polymerizable group-having compound includes a compound having an acrylate group or a methacrylate group (hereinafter referred to as (meth)acrylate compound), an allyl compound and a vinyl compound.

The (meth)acrylate compound includes ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, polypropylene glycol di(meth)acrylate, neopentyl glycol di(meth)acrylate, ethylene glycol bisglycidyl (meth)acrylate, bisphenol A di(meth)acrylate, 2,2-bis(4-meth)acryloyloxyethoxyphenyl)propane, 2,2-bis(4-(meth)acryloyloxydiethoxyphenyl)propane, 2,2-bis(4-(meth)acryloyloxyethoxyphenyl)propane, 2,2-bis(3,5-dibromo-4-(meth)acryloyloxyethoxyphenyl)propane, 2,2-bis(4-(meth)acryloyloxydipropoxyphenyl)propane, bisphenol F di(meth)acrylate, 1,1-bis(4-(meth)acryloyloxyethoxyphenyl)methane, 1,1-bis(4-(meth)acryloyloxydiethoxyphenyl)methane, dimethyloltricyclodecane di(meth)acrylate, trimethylolpropane tri(meth)acrylate, ditrimethylolpropane tetra(meth)acrylate, glycerol di(meth)acrylate, pentaerythritol tri(meth)acrylate, pentaerythritol tetra(meth)acrylate, methyl thio (meth)acrylate, phenyl thio (meth)acrylate, benzyl thio (meth)acrylate, xylylenedithiol di(meth)acrylate, mercaptoethyl sulfide di(meth)acrylate, and difunctional urethane (meth)acrylate.

The allyl compound includes allyl glycidyl ether, diallyl phthalate, diallyl terephthalate, diallyl isophthalate, diallyl carbonate, diethylene glycol bisallyl carbonate, methoxypolyethylene glycol allyl ether, polyethylene glycol allyl ether, methoxypolyethylene glycol polypropylene glycol allyl ether, butoxypolyethylene glycol polypropylene glycol allyl ether, methacryloyloxy-polyethylene glycol polypropylene glycol allyl ether, phenoxypolyethylene glycol allyl ether, and methacryloyloxy-polyethylene glycol allyl ether.

The vinyl compound includes α-methylstyrene, α-methylstyrene dimer, styrene, chlorostyrene, methylstyrene, bromostyrene, dibromostyrene, divinylbenzene, 3,9-divinylspirobi(m-dioxane).

<Polymerization Curing Accelerator (F)>

In the photochromic curable composition of the present invention, various polymerization curing accelerators can be used depending on the kind of the above-mentioned compound, for smoothly accelerating polymerization curing of the compound. In the present invention, an urethane or urea reaction catalyst can be favorably used as the polymerization curing accelerator, for accelerating the reaction between a hydroxy group and a thiol group, and an isocyanate group and an isothiocyanate group. In the case where the photochromic curable composition of the present invention contains an episulfide compound, a thietanyl compound or an epoxy compound, an epoxy curing agent or a cationic polymerization catalyst to be mentioned hereinunder can be used as the polymerization curing accelerator. In the case where a compound having a radical polymerizable group such as a (meth)acrylate group is used, a radical polymerization initiator to be mentioned hereinunder can be used as the polymerization curing accelerator.

<Polymerization Curing Accelerator (F); Urethane or Urea Reaction Catalyst>

In the present invention, a (poly)thiourethane bond-having photochromic cured product can be produced by reacting a polyiso(thio)cyanate and a polyol or a polythiol. The reaction can go on in the absence of a catalyst, but the reaction speed can be increased by using a catalyst. The catalyst includes an inorganic base, an organic base such as a tertiary amine or a phosphine, a quaternary ammonium salt, a quaternary phosphonium salt, and a Lewis acid.

The tertiary amine includes triethylamine, tri-n-propylamine, triisopropylamine, tri-n-butylamine, triisobutylamine, triethylenediamine, hexamethylenetetramine, N,N-dimethyloctylamine, N,N,N',N'-tetramethyl-1,6-diaminohexane, 4,4'-trimethylenebis(1-methylpiperidine), and 1,8-diazabicyclo-(5,4,0)-7-undecene.

The phosphine includes trimethyl phosphine, triethyl phosphine, tri-n-propyl phosphine, triisopropyl phosphine, tri-n-butyl phosphine, triphenyl phosphine, tribenzyl phosphine, 1,2-bis(diphenylphosphino)ethane, and 1,2-bis(dimethylphosphino)ethane.

The quaternary ammonium salt includes tetramethylammonium bromide, tetrabutylammonium chloride, and tetrabutylammonium bromide.

The quaternary phosphonium salt includes tetramethylphosphonium bromide, tetrabutylphosphonium chloride, and tetrabutylphosphonium bromide.

The Lewis acid includes triphenyl aluminum, dimethyltin dichloride, dimethyltin bis(isooctylthioglycolate), dibutyltin dichloride, dibutyltin dilaurate, dibutyltin maleate, dibutyltin maleate polymer, dibutyltin diricinolate, dibutyltin bis(dodecylmercaptide), dibutyltin bis(isooctylthioglycolate), dioctyltin dichloride, dioctyltin dimaleate, dioctyltin maleate polymer, dioctyltin bis(butyl maleate), dioctyltin dilaurate, dioctyltin diricinolate, dioctyltin dioleate, dioctyltin di(6-hydroxy)caproate, dioctyltin bis(isooctylthioglycolate), didodecyltin diricinolate, various metal salts, for example, copper oleate, copper acetylacetonate, iron naphthenate, iron lactate, iron citrate, iron gluconate, potassium octanoate, and 2-ethylhexyl titanate. Some Lewis acids have a high catalytic activity, and therefore when such a Lewis acid is used, curing reaction can not be controlled and the mechanical characteristics of the resultant photochromic cured product may be thereby damaged. In such a case, for suppressing the catalytic activity the above-mentioned amine can be used together.

<Polymerization Curing Accelerator (F); Epoxy Curing Agent>

The epoxy curing agent includes an amine compound and a salt thereof, a quaternary ammonium salt, an organic phosphine compound, a metal carboxylate, and an acetylacetone chelate compound. Specific examples thereof are mentioned below.

The amine compound and a salt thereof include 2-methylimidazole, 2-ethyl-4-methylimidazole, 1,8-diaza-bicyclo(5.4.0)undecene-7-trimethylamine, benzyldimethylamine, triethylamine, 2,4,6-tris(dimethylaminomethyl)phenol, and 2-(dimethylaminomethyl)phenol. The quaternary ammonium salt includes tetramethylammonium chloride, benzyltrimethylammonium bromide, and tetrabutylammonium bromide. The organic phosphine compound includes tetra-n-butylphosphonium benzotriazolate, and tetra-n-butylphosphonium O,O-diethylphosphorodithioate. The metal carboxylate includes chromium(III) tricarboxylate, and tin octylate. The acetylacetone chelate compound includes chromium acetylacetonate.

<Polymerization Curing Accelerator (F); Cationic Polymerization Catalyst>

The cationic polymerization catalyst includes a Lewis acid catalyst, a thermosetting cationic polymerization catalyst, and a UV-curable cationic polymerization catalyst. Specific examples thereof are mentioned below. The Lewis acid catalyst includes $BF_3$ amine complex, $PF_5$, $BF_3$, $AsF_5$, and $SbF_5$. The thermosetting cationic polymerization catalyst includes phosphonium salts, quaternary ammonium salts such as benzylammonium salts and benzylpyridinium salts, sulfonium salts, benzylsulfonium salts, hydrazinium salts, carboxylate esters, sulfonate esters, and amineimides. The UV-curable cationic polymerization catalyst includes diaryliodonium hexafluorophosphates, and bis(dodecylphenyl)iodonium hexafluoroantimonate.

<Polymerization Curing Accelerator (F); Radical Polymerization Initiator>

As the radical polymerization initiator, a thermal polymerization initiator is favorably used. Specific examples thereof are: a diacyl peroxide such as benzoyl peroxide, p-chlorobenzoyl peroxide, decanoyl peroxide, lauroyl peroxide, and acetyl peroxide; a peroxy ester such as t-butylperoxy-2-ethyl hexanoate, t-butylperoxy neodecanoate, cumylperoxy neodecanoate, and t-butylperoxy benzoate; a percarbonate such as diisopropylperoxy dicarbonate, and di-s-butylperoxy dicarbonate; an azo compound such as azobisisobutyronitrile, and 2,2'-azobis(2,4-dimethylvaleronitrile).

One alone or two or more kinds of the above-mentioned polymerization curing accelerator (F) can be used either singly or as combined. The amount to be used thereof may be a so-called catalytic amount, and for example, may be a small amount falling within a range of 0.001 to 10 parts by mass relative to 100 parts by mass of the total of the above-mentioned (A), (B) and (C), especially 0.01 to 5 parts by mass.

<Internal Release Agent (G)>

In the present invention, any internal release agent can be used with no limitation so long as it is effective for mold release, but preferred is one not detracting from the physical properties such as transparency of resin. In consideration of miscibility with a photochromic compound, a surfactant is favorably used. Above all, a surfactant of a phosphorus compound is preferred, and a (thio)phosphate ester-type, a (thio)phosphonate ester-type or a (thio)phosphinate ester-type surfactant is more preferred. The internal release agent as referred to herein includes the above-mentioned various catalysts that exhibit a releasing effect, and may include quaternary ammonium salts and quaternary phosphonium salts. These internal release agents can be appropriately selected in consideration of miscibility with a photochromic curable composition, polymerization condition, economical potential and easy handleability. Specific examples of (thio)phosphate ester-type, (thio)phosphonate ester-type, (thio)phosphinate ester-type, and phosphite ester-type internal release agents are shown below.

There are mentioned mono-n-butyl phosphate, mono-2-ethylhexyl phosphate, mono-n-octyl phosphate, mono-n-butyl phosphate, bis(2-ethylhexyl) phosphate, di(2-ethylhexyl) phosphate, di-n-octyl phosphate, di-n-butyl phosphate, O,O-dimethyl dithiophosphate, O,O-diethyl dithiophosphate, O,O-bis(2-ethylhexyl) dithiophosphate, O,O-dimethyl thiophosphate, O,O-diethyl thiophosphate, O,O-bis(2-ethylhexyl) thiophosphate, thiometon, disulfoton, O,O-diethyl S-methyl dithiophosphate, and dipropylphosphinic acid; and commercial products thereof include Chelex H-8, Chelex H-12, Chelex H-18D, Phoslex A-8, Phoslex A-10, Phoslex A-12, Phoslex A-13, Phoslex A-18, Phoslex DT-8, Chelex TDP, and Chelex H-OL available from SC Organic Chemical Co., Ltd., and JP-506H, JP-512, JP-524R, JP-312L, JP-333E, and JP-318-0 available from Johoku Chemical Co., Ltd.

One alone or two or more kinds of the above-mentioned various internal release agents (G) can be used either singly or as combined, and the amount to be used thereof may be a small amount, and in general, 0.001 parts by mass to 10 parts by mass relative to 100 parts by mass of the total of (A), (B) and (C) may be enough.

<Photochromic Curable Composition; where the Polymerizable Compound is a Radical Polymerizable Compound>

In the case where a radical polymerizable compound is used as the polymerizable compound, it can be grouped into a polyfunctional radical polymerizable compound and a monofunctional radical polymerizable compound, and one alone or plural kinds of these may be used either singly or as combined. The radical polymerizable group includes an unsaturated double bon-having group, that is, a vinyl group (including a styryl group, a (meth)acrylic group, and an allyl group).

The polyfunctional radical polymerizable compound indicates a compound having 2 or more radical polymerizable groups in the molecule. The polyfunctional radical polymerizable compound can be grouped into a first polyfunctional radical polymerizable compound having 2 to 10 radical polymerizable groups, and a second polyfunctional radical polymerizable compound having more than 10 radical polymerizable groups.

Though not specifically limited, the first radical polymerizable compound preferably has 2 to 6 radical polymerizable groups. Specifically the first polyfunctional radical polymerizable compound includes a polyfunctional (meth) acrylate compound such as ethylene glycol di(meth)acrylate, diethylene glycol di(meth)acrylate, triethylene glycol di(meth)acrylate, tetraethylene glycol di(meth)acrylate, ethylene glycol bisglycidyl (meth)acrylate, bisphenol A di(meth)acrylate, 2,2-bis(4-(meth)acryloyloxyethoxyphenyl)propane, and 2,2-bis(3,5-dibromo-4-(meth)acryloyloxyethoxyphenyl)propane; a polyfunctional allyl compound such as diallyl phthalate, diallyl terephthalate, diallyl isophthalate, diallyl tartrate, diallyl epoxysucciniate, diallyl fumarate, diallyl chlorendate, diallyl hexaphthalate, diallyl carbonate, allyl diglycol carbonate, trimethylolpropane triallyl carbonate; a polyfunctional thio(meth)acrylate compound such as 1,2-bis (methacryloylthio)ethane, bis(2-acryloylthioethyl) ether, and 1,4-bis(methacryloylthiomethyl)benzene; and a vinyl compound such as divinylbenzene.

The second polyfunctional radical polymerizable compound includes a compound having a relatively large molecular weight such as a radical polymerizable group-having silsesquioxane compound, and a radical polymerizable group-having polyrotaxane compound.

The monofunctional radical polymerizable compound indicates a compound having one radical polymerizable group in the molecule. Examples of the monofunctional radical polymerizable compound include an unsaturated carboxylic acid such as acrylic acid, methacrylic acid and maleic anhydride; a (meth)acrylate compound such as methyl (meth)acrylate, benzyl methacrylate, phenyl methacrylate, 2-hydroxyethyl methacrylate, glycidyl (meth)acrylate, 6-methylglycidyl (meth)acrylate, bisphenol A monoglycidyl ether methacrylate, 4-glycidyloxy methacrylate, 3-(glycidyl-2-oxyethoxy)-2-hydroxypropyl methacrylate, 3-(glycidyloxy-1-isopropyloxy)-2-hydroxypropyl acrylate, and 3-glycidyloxy-2-hydroxypropyloxy)-2-hydroxypropyl acrylate; a fumarate compound such as diethyl fumarate, and diphenyl fumarate; a thioacrylate or thiomethacrylate compound such as methyl thioacrylate, benzyl thioacrylate, and benzyl thiomethacrylate; and a vinyl compound such as styrene, chlorostyrene, methylstyrene, vinylnaphthalene, α-methylstyrene dimer, and bromostyrene.

One alone or plural kinds of the radical polymerizable compound can be used either singly or as a mixture thereof. In this case, preferably, the polyfunctional radical polymerizable compound accounts for 80 to 100 parts by mass and the monofunctional radical polymerizable compound accounts for 0 to 20 parts by mass relative to 100 parts by mass of the total of the radical polymerizable compounds, more preferably the polyfunctional radical polymerizable compound accounts for 90 to 100 parts by mass and the monofunctional radical polymerizable compound accounts for 0 to 10 parts by mass. Also preferably relative to 100 parts by mass of the total of the radical polymerizable compounds, the first polyfunctional radical polymerizable compound accounts for 80 to 100 parts by mass, the second radical polymerizable compound accounts for 0 to 20 parts by mass and the monofunctional radical polymerizable compound accounts for 0 to 20 parts by mass, more preferably the first polyfunctional radical polymerizable compound accounts for 85 to 100 parts by mass, the second polyfunctional radical polymerizable compound accounts for 0 to 10 parts by mass and the monofunctional radical polymerizable compound accounts for 0 to 10 parts by mass.

<Preferred Combination of Stabilizers to be Blended in Photochromic Curable Composition>

<Uv Stabilizer>

In the present invention, for the purpose of improving the durability of the photochromic cured product, a UV stabilizer can be used. As a UV stabilizer, known are a hindered amine-based light stabilizer, a hindered phenol-based antioxidant, and a sulfur-based antioxidant. In consideration of miscibility with a photochromic curable composition and the like, the stabilizer can be appropriately selected and used. From the viewpoint of the photochromic characteristics and the durability of the resultant photochromic cured product, the following UV stabilizers are especially preferred.

Preferably usable are bis(1,2,2,6,6-pentamethyl-4-piperidyl) sebacate; Adekastab LA-52, LA-57, LA-62, LA-63, LA-67, LA-77, LA-82, and LA-87 available from Adeka Corporation; 2,6-di-t-butyl-4-methyl-phenol, ethylenebis (oxyethylene) bis[3-(5-t-butyl-4-hydroxy-m-tolyl) propionate]; and IRGANOX1010, IRGANOX1035, IRGANOX1075, IRGANOX1098, IRGANOX1135, IRGANOX1141, IRGANOX1222, IRGANOX1330, IRGANOX1425, IRGANOX1520, IRGANOX259, IRGANOX3114, IRGANOX3790, IRGANOX5057, and IRGANOX565 available from BASF Corporation.

The amount of the UV stabilizer to be used is, though not specifically limited so far as it does not detract from the advantageous effects of the present invention, generally within a range of 0.001 parts by mass to 10 parts by mass relative to 100 parts by mass of the photochromic curable composition, preferably within a range of 0.01 parts by mass to 1 part by mass. In particular, when a hindered amine-based light stabilizer is used, the durability improving effect may fluctuate depending on the kind of the photochromic compound used and, if so, there may occur color deviation from the intended color tone. From the viewpoint of preventing color deviation, the amount of the hindered amine-based light stabilizer is preferably 0.5 to 30 mol per mol of the photochromic compound, more preferably 1 to 20 mol, even more preferably 2 to 15 mol.

EXAMPLES

Next, the present invention is described in detail with reference to Examples and Comparative Examples, but the present invention is not limited to these Examples. First, measurement devices used in the present invention and production methods for components are described below.

Examples 1 to 5 (Synthesis of Photochromic Compound of the Invention)

Example 1

First Step

Polyethylene glycol monooleyl ether (36.7 g, 100 mmol) having a number-average molecular weight of 357 and toluene sulfonyl chloride (21.0 g, 110 mmol) were dissolved in pyridine (400 mL) and stirred. 1,4-diazabicyclo[2.2.2] octane (2.2 g, 20 mmol) was dropwise added thereto, and stirred at room temperature for 12 hours. After the reaction, the reaction liquid was added to water with ice, and extracted using dichloromethane. The extracted organic layer was washed with 10% hydrochloric acid, then the solvent was evaporated away, and thus, a compound represented by the following formula (16):

(16)

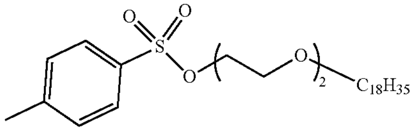

was obtained.

Second Step

4-Hydroxybenzoic acid (6.2 g, 45 mmol) and potassium carbonate (18.7 g, 135 mmol) were dissolved in DMF (450 mL). With stirring, this was heated to have a liquid temperature of 80° C. Subsequently the compound (48.6 g, 95 mmol) of the formula (16) was dropwise added over 1 hour. After the dropwise addition, this was stirred at the liquid temperature of 80° C. for 3 hours. Subsequently the reaction solution was cooled down to room temperature, then toluene and water were added for liquid-liquid separation, the organic layer was collected, and the solvent was evaporated away Ethanol (500 mL) and sodium hydroxide (4.5 g, 112.5 mmol) were added to the residue resulting from the solvent evaporation, and refluxed for 3 hours. After cooled down to room temperature, water was added to the reaction solution, and with cooling with ice, this was made to have a pH of about 5 with 10% hydrochloric acid added thereto. Next, using dichloromethane, this was subjected to liquid-liquid separation. After solvent removal by evaporation, the resultant crude product was purified through silica gel column chromatography (developing solvent: ethyl acetate), and thus, a compound represented by the following formula (17):

(17)

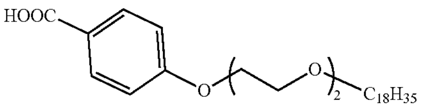

was obtained.

Third Step

The compound (17.1 g, 36 mmol) of the formula (17) was dissolved in dichloromethane (360 mL), and cooled with ice. Subsequently oxalyl chloride (18.3 g, 144 mmol) was added, then DMF (2 drops) was added, and stirred. After reacted for 5 hours, the solvent was evaporated away, and thus, a compound represented by the following formula (18):

(18)

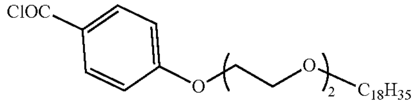

was obtained.

Fourth Step

The product of the formula (18) was dissolved in dichloromethane (300 mL), then 2-phenoxyethyl acetate (7.21 g, 40 mmol) was added thereto, and stirred with cooling with water. Tetrachlorotin (1 M dichloromethane solution, 54 mL) was gradually and dropwise added thereto over 1 hour, and after the dropwise addition, this was reacted for 5 hours. After the reaction, the reaction solution as gradually poured into water with ice, and the organic layer was separated by liquid-liquid separation. After the liquid-liquid separation, the organic solvent was evaporated away, and ethanol (300 mL) and sodium hydroxide (2.4 g, 60 mmol) were added to the resultant residue, and refluxed for 3 hours. The reaction solution was cooled down to room temperature, then water was added. With cooling with ice, the reaction solution was made to have a pH of about 5 using 10% hydrochloric acid added thereto. Subsequently using dichloromethane, this was subjected to liquid-liquid separation, and the solvent was evaporated away from the resultant organic layer. The resultant crude product was purified through silica gel column chromatography (developing solvent: chloroform-ethyl acetate mixture solvent), and thus, a compound represented by the following formula (19):

(19)

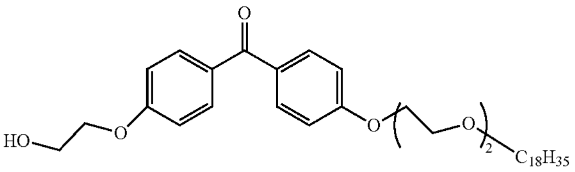

was obtained.

Fifth Step

The compound (12.0 g, 20 mmol) of the formula (19) and imidazole (5.1 g, 75 mmol) were dissolved in DMF (200 mL), and cooled with ice. A DMF solution (50 mL) of t-butyldimethylchlorosilane (4.5 g, 30 mmol) was dropwise added thereto over 30 minutes, and after the dropwise addition, this was reacted for 2 hours with stirring, and then the reaction solution as added to water with ice, and subjected to liquid-liquid separation with toluene. The solvent was evaporated away from the resultant organic layer, and thus, a compound represented by the following formula (20):

(20)

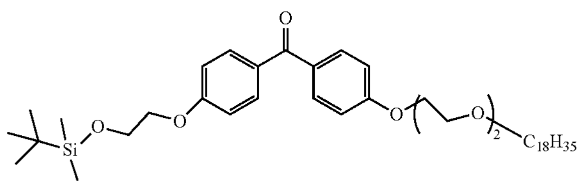

was obtained.

Sixth Step

DMF (200 mL) was added to the compound of the formula (20), and stirred with cooling with ice. A xylene suspension of sodium acetylide was dropwise added thereto. After the dropwise addition, this was heated up to room temperature, and reacted for 1.5 hours, and then the reaction solution was added to water with ice. An aqueous 10% ammonium chloride solution and toluene were added thereto for liquid-liquid separation. The solvent was evaporated away from the resultant organic layer, and thus, a compound represented by the following formula (21):

(21)

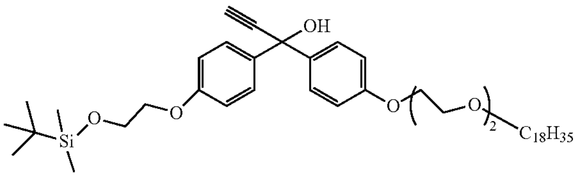

was obtained.

Seventh Step

A compound (1.6 g, 3.0 mmol) represented by the following formula (22):

(22)

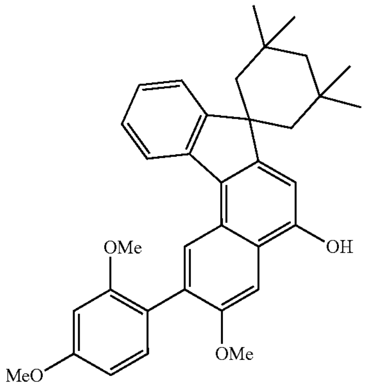

and the product (2.6 g, 3.5 mmol) of the formula (21) were dissolved in toluene (30 ml). Further, pyridinium p-toluenesulfonate (0.08 g, 0.3 mmol) was added thereto and stirred, and refluxed for 1 hour. Subsequently the reaction solution was cooled down to room temperature, water was added thereto and then subjected to liquid-liquid separation. The solvent was evaporated away from the organic layer, and the resultant residue was dissolved in THF (30 mL) added thereto. After cooled with ice, a THF solution of tetrabutylammonium fluoride (1 mM, 3.5 mL) was dropwise added to the resultant reaction solution. After heated up to room temperature, this was reacted for 2 hours. After the reaction, this was added to water with ice and subjected to liquid-liquid separation. The resultant organic layer was washed with 10% saline water, and the organic solvent was evaporated away. The resultant crude product was purified through silica gel column chromatography (developing solvent: chloroform-ethyl acetate mixture solvent), and thus, a chromene compound precursor represented by the following formula (23):

(23)

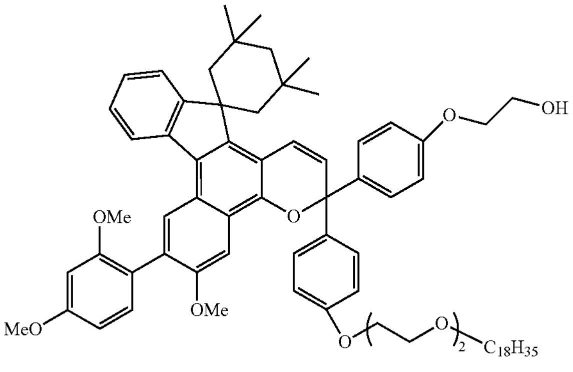

was obtained.

Eighth Step

Polypropylene glycol monobutyl ether (number-average molecular weight 3500, 35 g, 10 mmol), succinic anhydride (2.0 g, 20 mmol), triethylamine (2.5 g, 25 mmol) and dichloromethane (50 mL) were reacted at room temperature for 12 hours. After the reaction, with cooling with ice and using 10% hydrochloric acid, the reaction solution was made to have a pH of 5, and then subjected to liquid-liquid separation. The resultant organic layer was dried over anhydrous magnesium sulfate, filtered, and the solvent was evaporated away. Dichloromethane (50 mL) was added to the resultant residue, cooled with ice, then oxalyl chloride (5.1 g, 40 mmol) was added to the reaction solution and further DMF (2 drops) was added and stirred. After reacted for 5 hours, the solvent was evaporated away, and thus, a compound represented by the following formula (24):

(24)

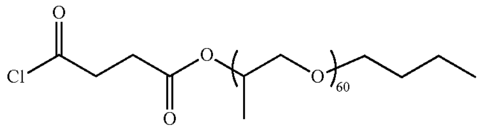

was obtained.

Ninth Step

The compound (2.5 g, 2.2 mmol) of the formula (23) was dissolved in dichloromethane (25 mL). After dissolved with stirring, triethylamine (2.4 g, 2.2 mmol) was added thereto and cooled with ice. A dichloromethane solution of the compound (8.3 g, 2.3 mmol) of the formula (24) was dropwise added thereto over 30 minutes. After the dropwise addition, this was heated up to room temperature, and stirred for 12 hours. Subsequently with cooling with ice and using 10% hydrochloric acid, the reaction solution was made to have a pH of 5. Subsequently the resultant reaction solution was subjected to liquid-liquid separation, and the organic solvent was evaporated away. The resultant crude product was purified through column chromatography (developing solvent: chloroform-ethyl acetate mixture solvent) to give a chromene compound (photochromic compound of the present invention) represented by the following formula (25):

(25)

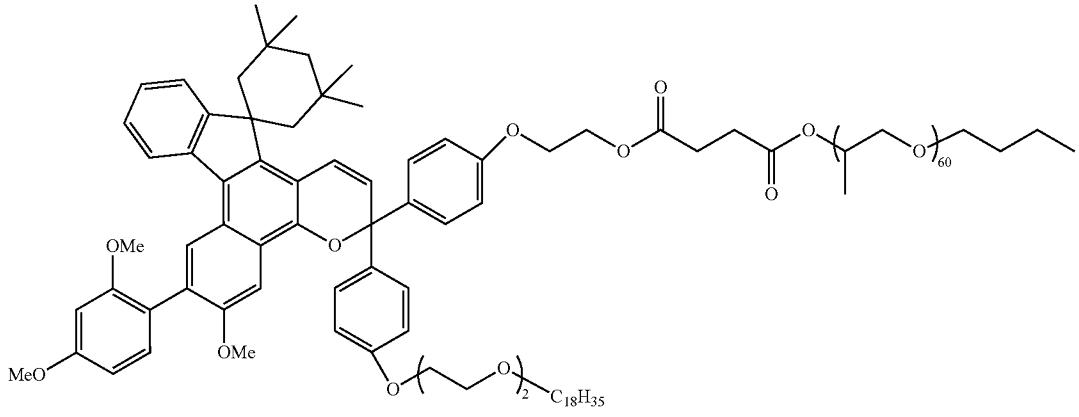

The yield was 85%.

In proton nuclear magnetic resonance spectrometry the compound gave peaks of about 240 H based on protons of a cyclohexane ring, a butyl group, a succinic acid moiety a propyleneoxy moiety and an oleyl group at around 1.0 to 3.0 ppm; peaks of about 205 H based on a methoxy group, an ethylene glycol moiety a butoxy group, an oleyl group, and a propyleneoxy moiety at around δ 3.0 to 5.2 ppm; and peaks of 21 H based on an aromatic proton and an alkene proton at around δ 5.2 to 9.0 ppm, and from these, the compound was identified to have the structure of the formula (25).

Example 2

First Step

In the same reaction as in the eighth step in Example 1, except that polypropylene glycol (number-average molecular weight 2500) was used in place of the polypropylene glycol monobutyl ether (number-average molecular weight 3500) used in the eighth step in Example 1, so that a compound represented by the following formula (26):

(26)

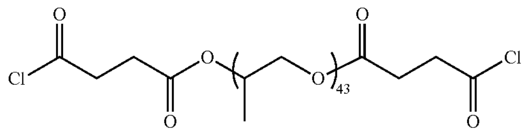

was produced.

Second Step

In the same manner as in the seventh step in Example 1, except that a naphthol compound represented by the following formula (27):

(27)

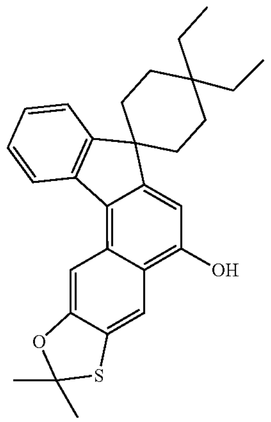

was used in place of the naphthol compound represented by the formula (22), a chromene precursor represented by the following formula (28):

(28)

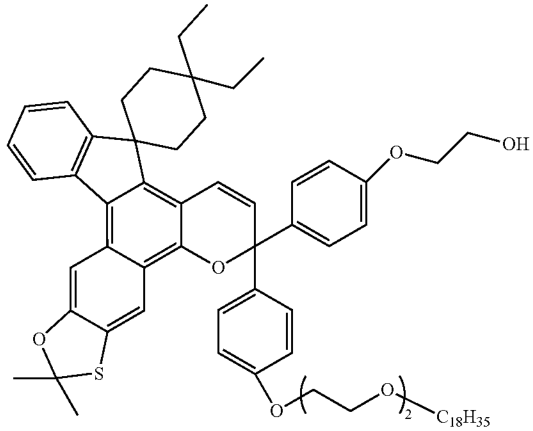

was produced.

Third Step

In the same manner as in the ninth step in Example 1, except that the chromene precursor of the formula (28) was used in place of the chromene compound precursor of the formula (23) and the compound of the formula (26) was used in place of the formula (24), a chromene compound (photochromic compound of the present invention) represented by the following formula (29) was produced.

(29)

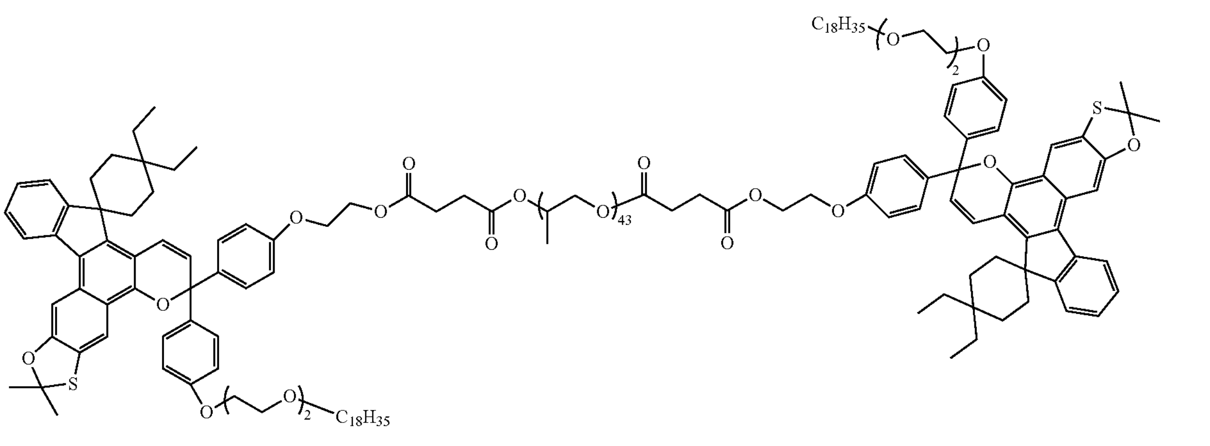

The yield was 80%.

In proton nuclear magnetic resonance spectrometry, the compound gave peaks of about 247 H based on protons of a cyclohexane ring, a methyl group, a succinic acid moiety a propyleneoxy moiety and an oleyl group at around 1.0 to 3.0 ppm; peaks of about 157 H based on an ethylene glycol moiety an oleyl group, and a propyleneoxy moiety at around δ 3.0 to 5.2 ppm; and peaks of 36 H based on an aromatic proton and an alkene proton at around δ 5.2 to 9.0 ppm, and from these, the compound was identified to have the structure of the formula (29).

Example 3

First Step 4,4-Dihydroxybenzophenone (1.0 g, 4.5 mmol), potassium carbonate (1.9 g, 13.5 mmol) and DMF (45 mL) were stirred and heated until the inner temperature reached 80° C. After heating, the compound (4.6 g, 9.1 mmol) of the formula (16) was dropwise added over 1 hour. After the dropwise addition, the reaction was carried out for 4 hours at the liquid temperature of 80° C. After the reaction, the reaction solution was cooled down to room temperature, water was added, and using toluene, this was subjected to liquid-liquid separation. The organic solvent was evaporated away, and then the resulting residue was purified through silica gel column chromatography (developing solvent: chloroform-ethyl acetate mixture solvent), and thus, a compound represented by the following formula (30):

(30)

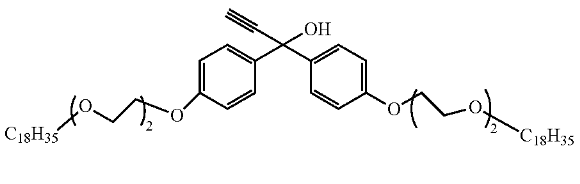

was obtained.

Second Step

According to the same operation as that for the sixth step in Example 1, except that the compound represented by the formula (30) was used in place of the compound represented by the formula (20) used in the sixth step in Example 1, so that a compound represented by the following formula (31):

(31)

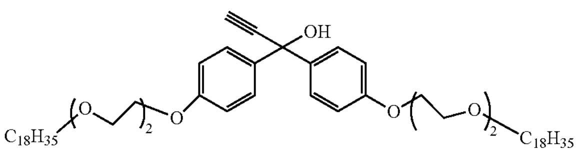

was produced.

Third Step

A compound (0.9 g, 3.0 mmol) represented by the following formula (32):

(32)

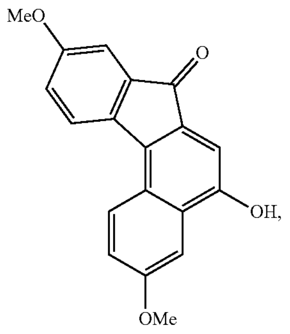

and the compound (3.2 g, 3.5 mmol) of the formula (31) were dissolved in methyl isobutyl ketone (50 ml). Further, p-toluenesulfonic acid (0.06 g, 0.3 mmol) was added and refluxed for 1 hour. After the reaction, this was cooled down to room temperature, water was added, and using toluene, this was subjected to liquid-liquid separation. The organic solvent was evaporated away from the resultant organic layer to give a crude product. The resultant crude product was purified through silica gel column chromatography (developing solvent: chloroform-ethyl acetate mixture solvent), and thus, a compound represented by the following formula (33):

(33)

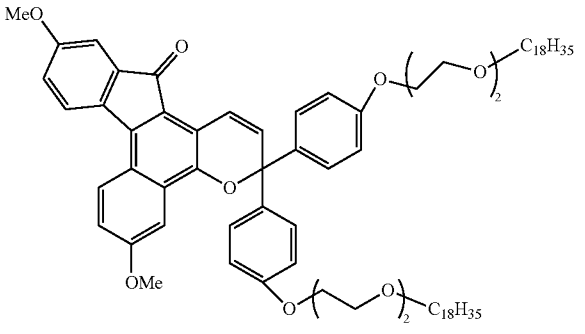

was obtained.

Fourth Step

The compound (2.4 g, 2.0 mmol) of the formula (33) was dissolved in THF (24 mL), and cooled down to −78° C. Methyl lithium (1.0 M, 2.4 mL) was gradually and dropwise added thereto. Subsequently this was gradually heated up to −10° C. Water was added thereto, and then the reaction solution was heated up to room temperature. This was extracted with toluene, the resultant organic layer was washed with 10% saline water, and the organic solvent was evaporated away. The resultant crude product was purified through silica gel column chromatography (developing solvent: chloroform-ethyl acetate mixture solvent), and thus, a compound represented by the following formula (34):

(34)

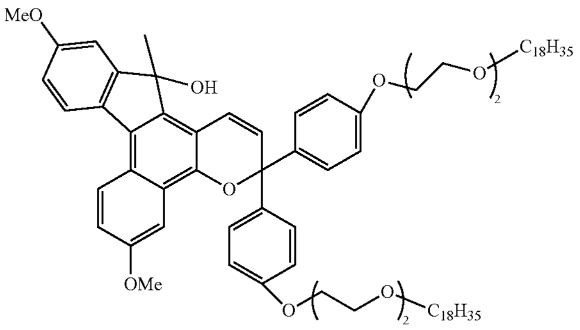

was obtained.

Fifth Step

In the same manner as in the eighth step in Example 1, except that, in place of polypropylene glycol monobutyl ether (number-average molecular weight 3500) used in the eighth step in Example 1, polydimethylsiloxane (number-average molecular weight 1000) having a hydroxy group terminal represented by the following formula (35):

(35)

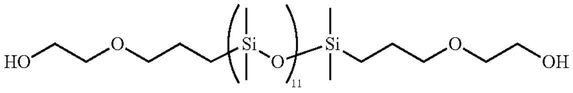

was used, a compound represented by the following formula (36):

(36)

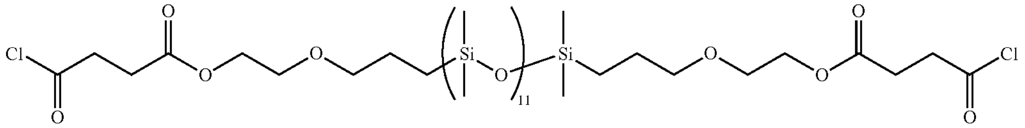

was produced.

Sixth Step

In the same manner as in the third step in Example 2, except that the compound represented by the formula (34) was used in place of the compound represented by the formula (28) used in the third step in Example 2 and the compound represented by the formula (36) was used in place of the compound represented by the formula (26), a chromene compound (photochromic compound of the present invention) represented by the following formula (37) was produced.

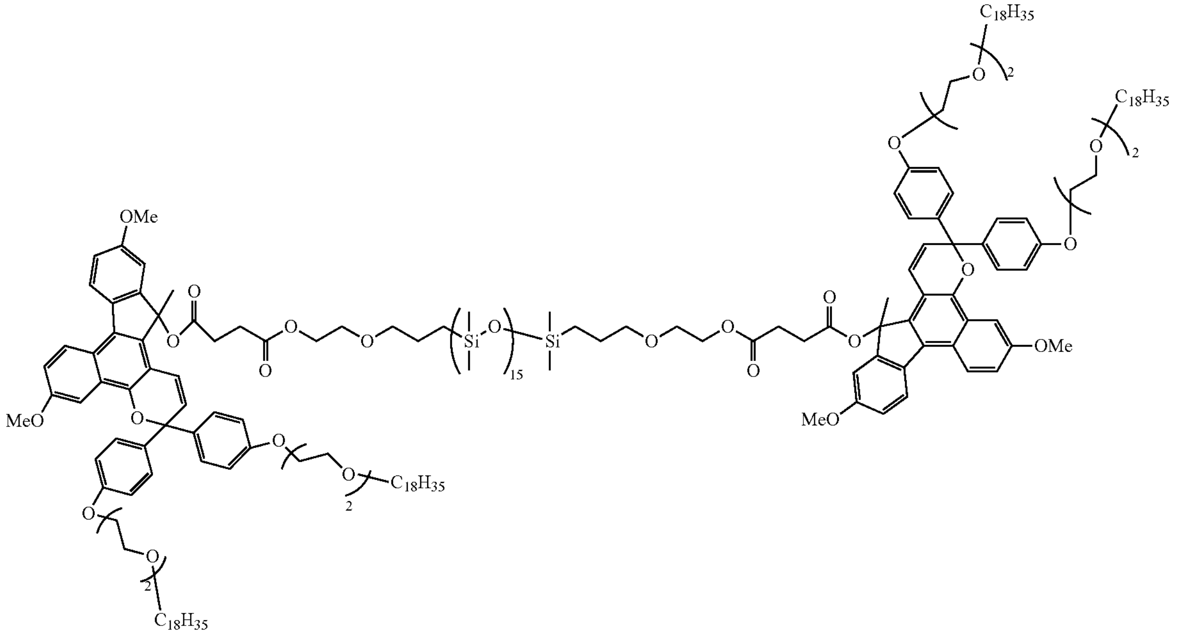

The yield was 65%.

In proton nuclear magnetic resonance spectrometry, the compound gave peaks of about 236 H based on protons of a dimethylsiloxane, a methyl group, a succinic acid moiety a propoxy group and an oleyl group at around 0 to 3.0 ppm; peaks of about 64 H based on an ethylene glycol moiety an oleyl group, a methoxy group and a propoxy group at around δ 3.0 to 5.2 ppm; and peaks of 40 H based on an aromatic proton and an alkene proton at around δ 5.2 to 9.0 ppm, and from these, the compound was identified to have the structure of the formula (37).

Example 4

First Step

Polypropylene glycol (number-average molecular weight 2500, 50.0 g, 20 mmol) and imidazole (5.1 g, 75 mmol) were dissolved in DMF (200 mL) and cooled with ice. A DMF (50 mL) solution of t-butyldimethylchlorosilane (2.9 g, 19.5 mmol) was dropwise added over 1 hour. After the dropwise addition, this was stirred for 2 hours, and the reaction solution was added to water with ice. Using ethyl acetate, this was subjected to liquid-liquid separation, and the solvent was evaporated away from the resultant organic layer. The resultant crude product was purified through silica gel column chromatography (developing solvent: acetone-ethyl acetate mixture solvent), and thus, a compound represented by the following formula (38):

(38)

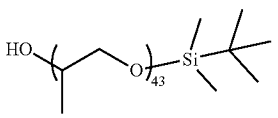

was obtained.

Second Step

Sodium hydride (0.8 g, 33.3 mmol) dispersed in liquid paraffin was stirred in heptane, and then heptane was removed through decantation. DMF (20 mL) was added thereto, and the compound (46.2 g, 17.5 mmol) of the formula (38) was gradually and dropwise added thereto. This was stirred at room temperature for 1 hour, then the compound (9.2 g, 18.0 mmol) represented by the formula (16) was added, and stirred at room temperature for 12 hours. The reaction solution was added to water with ice, and subjected to liquid-liquid separation using ethyl acetate. The resultant organic layer was dried over anhydrous magnesium sulfate, filtered and the solvent was evaporated away. THF (300 mL) was added to the resultant residue to dissolve it with stirring. After cooled with ice, a THF solution (1 M, 25 mL) of tetrabutylammonium fluoride was dropwise added thereto. This was heated up to room temperature, and reacted for 2 hours. Subsequently the reaction solution was added to water with ice, and subjected to liquid-liquid separation with ethyl acetate. The organic layer was washed with 10% saline water, and the solvent was evaporated away. The resultant crude product was purified through silica gel column chromatography (developing solvent: acetone-ethyl acetate mixture solvent), and thus, a compound represented by the following formula (39):

(39)

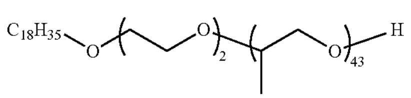

was obtained.

Third Step

In the same manner as in the eighth step in Example 1, except that the compound represented by the formula (39) was used in place of polypropylene glycol monobutyl ether (number-average molecular weight 3500), so that a compound represented by the following formula (40):

(40)

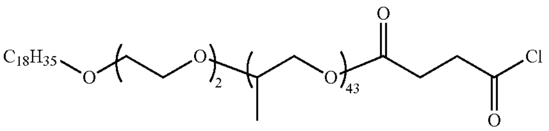

was produced.

Fourth Step

In the same manner as in the ninth step in Example 1, except that a compound represented by the following formula (41):

(41)

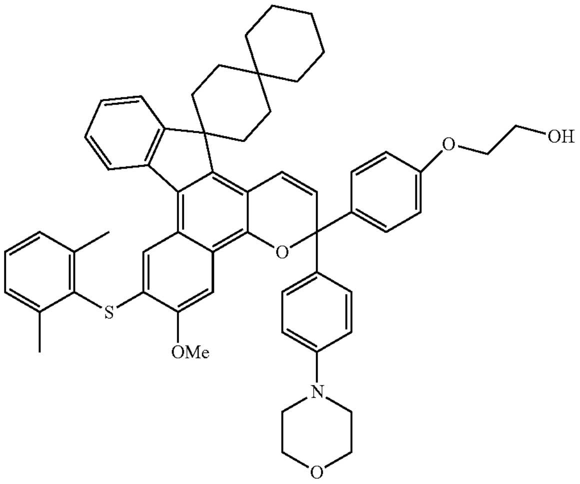

was used in place of the compound represented by the formula (23) used in the ninth step in Example 1 and the compound represented by the formula (40) was used in place of the compound represented by the formula (24), a chromene compound (photochromic compound of the present invention) represented by the following formula (42) was produced.

(42)

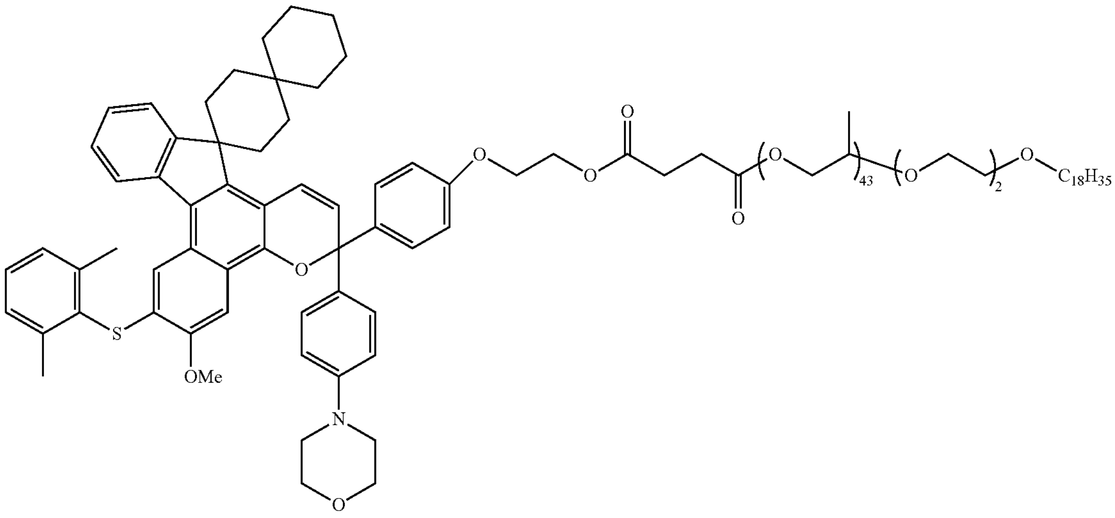

The yield was 80%.

In proton nuclear magnetic resonance spectrometry, the compound gave peaks of about 188 H based on protons of a cyclohexane ring moiety a methyl group, a succinic acid moiety a polypropylene glycol moiety and an oleyl group at around 1.0 to 3.0 ppm; peaks of about 154 H based on an ethylene glycol moiety an oleyl group, a methoxy group, a polypropylene glycol moiety and a morpholino group at around δ 3.0 to 5.2 ppm; and peaks of 21 H based on an aromatic proton and an alkene proton at around δ 5.2 to 9.0 ppm, and from these, the compound was identified to have the structure of the formula (42).

Example 5

First Step 4,4-Dihydroxybenzophenone (1.0 g, 4.5 mmol), potassium carbonate (0.6 g, 4.5 mmol) and DMF (45 mL) were stirred and heated until the inner temperature reached 80° C. After heating, the compound (2.2 g, 4.4 mmol) of the formula (16) was dropwise added over 2 hours. After the dropwise addition, the reaction was carried out for 4 hours at the inner temperature of 80° C. After the reaction, this was cooled down to room temperature, and toluene and water were added for liquid-liquid separation. The solvent was concentrated and the residue was purified through chromatography on silica gel using a mixture solvent of chloroform-ethyl acetate, and thus, a compound represented by the following formula (43):

(43)

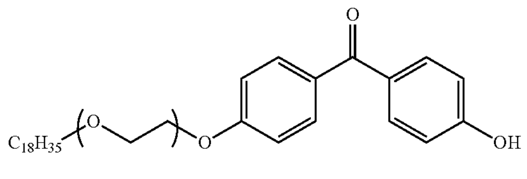

was obtained.

Second Step

In the same manner as in the first step in Example 1, except that a compound represented by the following formula (44) having a number-average molecular weight of 1100, (44)

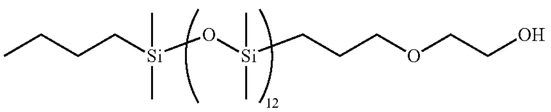

was used in place of polyethylene glycol monooleyl ether therein, so that a compound represented by the following formula (45):

(45)

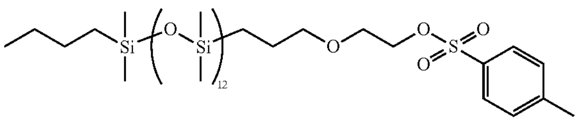

was produced by substituting a tosyl group.

Third Step

The compound (2.2 g, 3.9 mmol) of the formula (43), potassium carbonate (1.2 g, 9.0 mmol) and DMF (40 mL) were stirred and heated until the inner temperature reached 80° C. After heating, the compound (7.3 g, 5.9 mmol) of the formula (45) was dropwise added over 1 hour. After the dropwise addition, the reaction was carried out for 4 hours at the inner temperature of 80° C. After the reaction, this was cooled down to room temperature, and toluene and water were added for liquid-liquid separation. The solvent was concentrated and the residue was purified through chromatography on silica gel using a chloroform-ethyl acetate mixture solvent, and thus, a compound represented by the following formula (46):

(46)

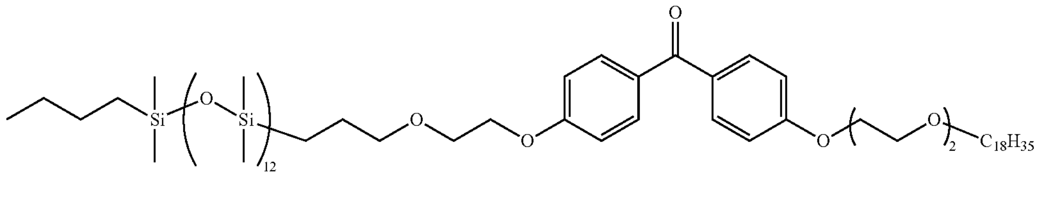

was obtained.

Fourth Step

In the same manner as in the sixth step in Example 1, except that the compound of the formula (46) obtained in the first step was used in place of the formula (20), so that a compound represented by the following formula (47):

(47)

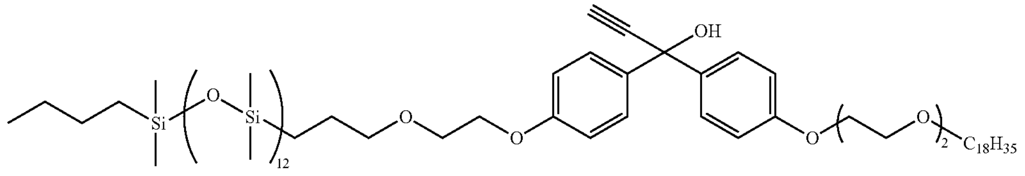

was produced.

Fifth Step

In the same manner as in the third step in Example 3, except that a naphthol compound represented by the following formula (48):

(48)

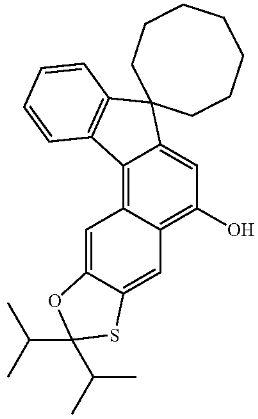

was used in place of the naphthol compound of the formula (32) therein, and the compound of the formula (47) was used in place of the compound of the formula (31), a compound (photochromic compound of the present invention) represented by the following formula (49) was produced.

(49)

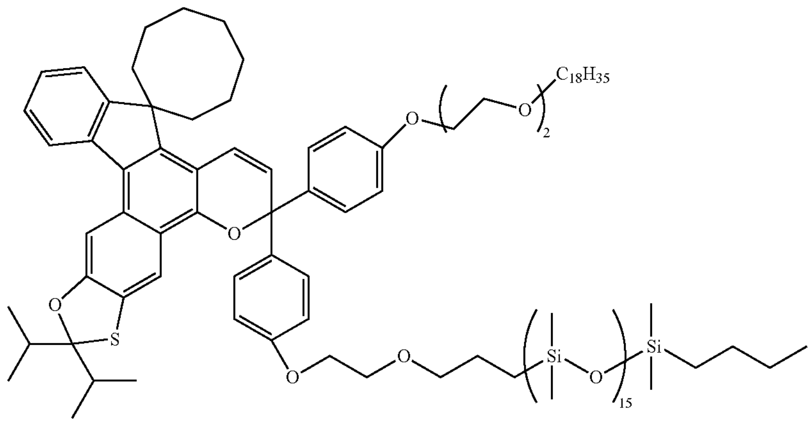

The yield was 67%.

In proton nuclear magnetic resonance spectrometry, the compound gave peaks of about 168 H based on protons of a dimethylsiloxane, an isopropyl group, a butyl group and an oleyl group at around 0 to 3.0 ppm; peaks of about 16 H based on an ethylene glycol moiety an oleyl group and a propoxy group at around δ 3.0 to 5.2 ppm; and peaks of 18 H based on an aromatic proton and an alkene proton at around δ 5.2 to 9.0 ppm, and from these, the compound was identified to have the structure of the formula (49).

Examples 6 to 10 (Production and Evaluation of Photochromic Cured Product (Molded Product))

In Examples 5 to 8, the photochromic characteristics of the above-mentioned chromene compounds were evaluated according to the following evaluation methods. Constituent components were mixed according to the following formulation to prepare a photochromic curable composition. The blending amount of each component is shown below. Table 1 shows the results of photochromic characteristics.

(Blend Composition of Polymerizable Compounds)

<Component A>

M-xylylene diisocyanate; 48.0 parts by mass

<Component B>

Pentaerythritol tetrakis(3-mercaptopropionate); 25.5 parts by mass

4-Mercaptomethyl-3,6-dithia-octane-dithiol; 25.5 parts by mass

<Other Components>

Dimethyldichlorotin; 0.1 parts by mass

JP-506H (from Johoku Chemical Co., Ltd.); 0.1 parts by mass

The component A, the component B and the other components mentioned above were mixed to prepare a blend composition, and the chromene compound (photochromic compound) was added to the composition in such a manner that the indenonaphthopyran moiety of the compound was 48 μmol relative to 100 parts by mass of the blend composition to prepare a photochromic curable composition. Using the resultant photochromic curable composition, a photochromic cured product (polymeric molded product) was produced by a kneading method. The polymerization method is as mentioned below.

(Polymerization Method)

Using a glass mold and a gasket formed of an ethylene-vinyl acetate copolymer, a casting mold having a thickness of 2 mm was formed. Subsequently, the above-mentioned photochromic curable composition that had been fully defoamed was cast into the casting mold. Next, with gradually heating from 20° C. up to 120° C., polymerization reaction was carried out to cure the photochromic curable composition. After the composition was cured, over 20 hours, the resultant photochromic cured product was taken out of the casting mold.

(Evaluation Method for Photochromic Cured Product)

The resultant photochromic cured product was evaluated in point of (1) the photochromic characteristics, (2) the L-scale Rockwell hardness and (3) the transparency thereof. The evaluation methods are as mentioned below.

(1) Photochromic Characteristics

Using a xenon lamp L-2480 (300 W) SHL-100 from Hamamatsu Photonics K.K., the photochromic cured product was photoirradiated via Air Mass Filter 2.0 (from Koyosha Co., Ltd.) to make the photochromic cured product colored, and evaluated in point of various photochromic characteristics thereof. The conditions in irradiation are as follows.

Irradiation temperature; 23±0.1° C.

Emission intensity; 50,000 lux in a range of 300 to 500 nm

Irradiation time; 120 seconds

As the photochromic characteristics of the photochromic cured product, the maximum absorption wavelength, the coloration density and the decoloration rate were evaluated. For the measurement, a spectrophotometer from Otsuka Electronics Co., Ltd. (instantaneous multichannel photodetector MCPD1000) was used.

Maximum absorption wavelength (Amax):

This is a maximum absorption wavelength in a visible light region of the photochromic cured product after colored. The maximum absorption wavelength relates to the color tone in coloration.

Coloration Density {ε(120)−ε(0)}:

This is a difference between the absorbance {ε(120)} after photoirradiation for 120 seconds and the absorbance ε(0) before photoirradiation at the maximum absorption wavelength, and is to evaluate the coloration density. A higher value of the difference means more excellent photochromic characteristics.

Decoloration Rate [t1/2 (Sec)]:

The photochromic cured product was photoirradiated for 120 seconds, and after the photoirradiation was stopped, the time taken for reducing the absorbance at the maximum absorption wavelength to a half of {ε(120)−ε(0)} was measured to evaluate the decoloration rate. A shorter time means more excellent photochromic characteristics.

Residual Ratio ($A_{200}/A_0 \times 100$):

The resultant photochromic cured product was acceleratedly degraded for 200 hours, using a xenon weather meter X25 from Suga Test Instruments Co., Ltd. Before and after the degradation test, the coloration density was evaluated. The coloration density ($A_0$) before the test and the coloration density ($A_{200}$) after the test were measured, and the ratio ($A_{200}/A_0$) is referred to as a residual ratio to indicate the coloration durability. A higher ratio means higher coloration durability.

(2) L-Scale Rockwell Hardness (HL)

The photochromic cured product (thickness 2 mm) was stored in a desiccator at 23° C. for 1 day and then, using Akashi Rockwell Hardness Meter (model: AR-10), the L-scale Rockwell hardness of the cured product was measured.

(3) Transparency of Photochromic Cured Product

The photochromic cured product was visually checked for cloudiness under crossed nicols.

1: No-problem level as a product, and there was no or little cloudiness.

2: No-problem level as a product, but there was some cloudiness.

3: No-problem level as a product, but the cloudiness was higher than 2.

4: Unacceptable as a product because of cloudiness.

Comparative Examples 1 to 2

For comparison, using compounds represented by the following formulae (A) and (B), photochromic cured products were produced in the same manner as in Examples 5 to 8, and the characteristics thereof were evaluated.

(A)

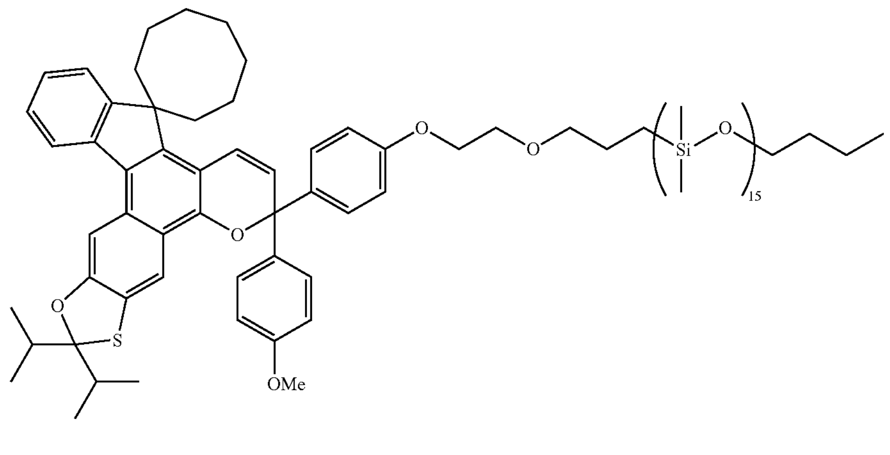

-continued

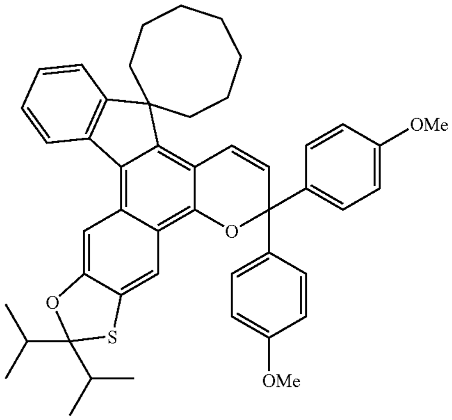

(B)

TABLE 1

| Example | Compound No. (photochromic compound) | Number-average Molecular Weight of Oligomer Chain Group A per mol of indenonaphthopyran moiety | Photochromic Characteristics | | | | | |
|---|---|---|---|---|---|---|---|---|
| | | | Maximum Absorption Wavelength (nm) | Coloration Density (—) | Decoloration Rate (sec) | Residual Ratio (%) | HL | Transparency |
| Example 6 | Example 1 | 3500 | 452 | 0.57 | 49 | 78 | 123 | 1 |
| | (formula 25) | | 569 | 0.57 | 48 | 79 | | |
| Example 7 | Example 2 | 1250 | 457 | 0.75 | 59 | 82 | 123 | 1 |
| | (formula 29) | | 565 | 0.49 | 59 | 82 | | |
| Example 8 | Example 3 | 550 | 443 | 0.34 | 53 | 53 | 124 | 1 |
| | (formula 37) | | 584 | 0.50 | 53 | 54 | | |
| Example 9 | Example 4 | 2500 | 475 | 0.65 | 77 | 80 | 123 | 2 |
| | (formula 42) | | 581 | 0.64 | 77 | 81 | | |
| Example 10 | Example 5 | | 458 | 0.90 | 89 | 80 | 123 | 2 |
| | (formula 49) | 1100 | 567 | 0.61 | 90 | 81 | | |
| Comparative Example 1 | A | 1100 | Unmeasurable as cloudy. | | | | 123 | 4 |
| Comparative Example 2 | B | — | No photochromic characteristics | | | | 125 | 1 |

As obvious from Table 1, the photochromic compounds of the present invention are excellent in photochromic characteristics in a high-hardness matrix, as compared with already-existing photochromic compounds. Specifically the photochromic compounds of the present invention have an oligomer chain group A, and therefore exhibited excellent photochromic characteristics in a high-hardness matrix. In addition, by introducing an oleyl group into the photochromic compounds, a heretofore insoluble problem of cloudiness of cured products can be solved.

Example 11

First Step

In the same manner as in the first step to the fifth step of Example 1, except that cis-4-decen-1-ol was used in place of polyethylene glycol monooleyl ether having a number-average molecular weight of 357, a compound represented by the following formula (50) was produced.

(50)

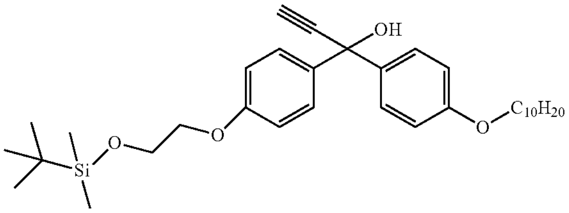

Second Step

In the seventh step of Example 1, using a naphthol compound represented by the following formula (51):

(51)

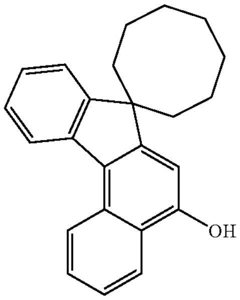

was used in place of the formula (22), a chromene precursor represented by the following formula (52) was produced.

(52)

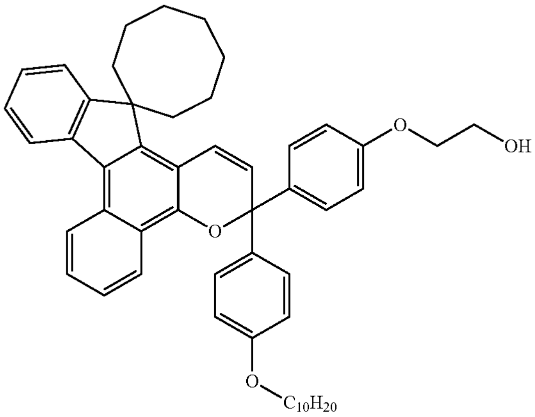

Third Step

In the same manner as in the eighth step to the ninth step of Example 1, except that polyoxyethylene polyoxypropylene monobutyl ether (number-average molecular weight 3300) was used in place of polypropylene glycol monobutyl ether (number-average molecular weight 3500), a compound (photochromic compound of the present invention) represented by the following formula (53) was produced.

(53)

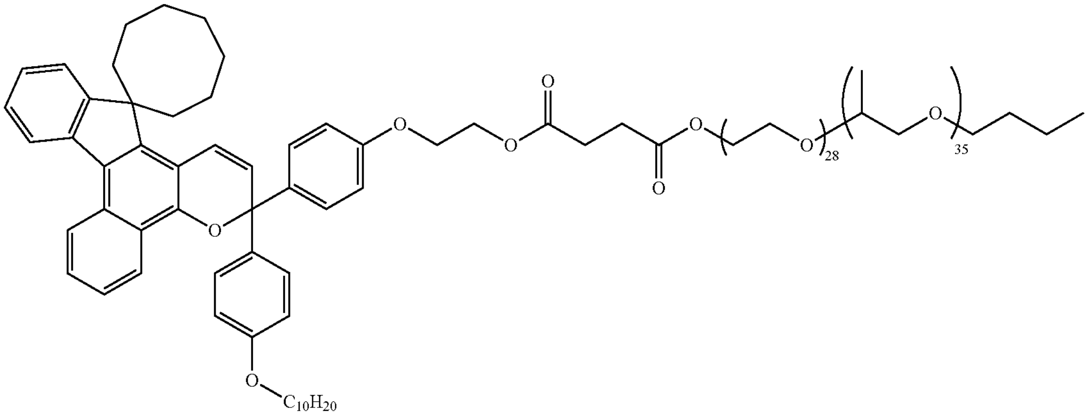

The yield was 65%.

In proton nuclear magnetic resonance spectrometry, the compound gave peaks of about 145 H based on protons of a cyclohexane ring, a butyl group, a succinic acid moiety a propyleneoxy moiety and a cis-4-decene moiety at around 1.0 to 3.0 ppm; peaks of about 225 H based on an ethylene glycol moiety a butoxy group, a cis-4-decene moiety a polyoxypropylene moiety and a polyoxyethylene moiety at around δ 3.0 to 5.2 ppm; and peaks of 20 H based on an aromatic proton and an alkene proton at around δ 5.2 to 9.0 ppm, and from these, the compound was identified to have the structure of the formula (53).

Examples 12 to 14

Constituent components (the photochromic compound, the component A, the component B, the component C and the other components) were mixed according to the following formulation to prepare a photochromic curable composition. The blending ratio is shown in Table 2.

TABLE 2

| Example | Photochromic Compound | Component A (part by mass) | Component B (part by mass) | Component C (part by mass) | Others (part by mass) | n1/(n2 + n3) | n2/n3 | Molar Number of Component C per mol of oligomer chain group A of photochromic compound |
|---|---|---|---|---|---|---|---|---|
| Example 12 | Example 11 (formula 53) | XDI(48.0) | PEMP(25.5) MTODT(25.5) | — | Dimethyldichlorotin (0.1) JP-506H(0.1) | 1.02 | — | — |
| Example 13 | Example 4 (formula 42) | XDI(42.5) | PEMP(50.0) | PGME2(7.5) | Dimethyldichlorotin (0.1) JP-506H(0.1) | 1.05 | 19.5 | 437.7 |
| Example 14 | Example 4 (formula 42) | NBDI(42.0) | PEMP(14.0) DPMP(34.0) | PGME10(10.0) | Dimethyldichlorotin (0.1) JP-506H(0.1) | 1.05 | 26.6 | 293.8 |

n1: Total molar number of the isocyanate group in the component A.
n2: Total molar number of the active hydrogen in the component B.
n3: Total molar number of the active hydrogen in the component C.

The chromene compound (photochromic compound) was added to the above-mentioned blend composition in such a manner that the indenonaphthopyran moiety of the compound is 48 μmol relative to 100 parts by mass of the blend composition to prepare a photochromic curable composition. 100 parts by mass of the blend composition means a total amount, 100 parts by mass, of the component A, the component B, the component C and the other components.

Abbreviations of the compounds used in Table 2 are shown below.

Bicyclo[2.2.1]heptane-2,5-(2,6)-diyl)bismethylene diisocyanate; NBDI m-Xylylene diisocyanate; XDI Pentaerythritol tetrakis(3-mercaptopropionate); PEMP Pentaerythritol tetrakis(3-mercaptopropionate); MTODT Dipentaerythritol hexakis(3-mercaptopropionate); DPMP Polyethylene glycol monooleyl ether (recurring number of ethylene glycol, about 2, Mn=357); PGME2

Polyethylene glycol monooleyl ether (recurring number of ethylene glycol, about 10, Mn=709); PGME10

The photochromic curable composition was polymerized according to the same method as in Example 6 to give a photochromic cured product. The resultant photochromic cured product was evaluated in the same manner as in Example 6.

The results are shown in Table 3.

TABLE 3

| Example | Compound No. | Number-average Molecular Weight of Oligomer Chain Group A per mol of indenonaphthopyran moiety | Photochromic Characteristics: Maximum Absorption Wavelength (nm) | Coloration Density (—) | Decoloration Rate (sec) | Residual Ratio (%) | HL | Transparency |
|---|---|---|---|---|---|---|---|---|
| Example 12 | Example 11 (formula 53) | 3300 | 428 | 0.51 | 65 | 78 | 123 | 1 |
| | | | 542 | 0.76 | 65 | 80 | | |

TABLE 3-continued

| Example | Compound No. | Number-average Molecular Weight of Oligomer Chain Group A per mol of indenonaphthopyran moiety | Photochromic Characteristics Maximum Absorption Wavelength (nm) | Coloration Density (—) | Decoloration Rate (sec) | Residual Ratio (%) | HL | Transparency |
|---|---|---|---|---|---|---|---|---|
| Example 13 | Example 4 (formula 42) | 1100 | 478<br>583 | 0.82<br>0.82 | 72<br>72 | 81<br>81 | 104 | 1 |
| Example 14 | Example 4 (formula 42) | 1100 | 478<br>588 | 0.88<br>0.88 | 70<br>70 | 81<br>81 | 95 | 1 |

The invention claimed is:

1. A photochromic compound having an indenonaphthopyran moiety, in which the indenonaphthopyran moiety has:

an alkenyl group having 10 to 30 carbon atoms, and an oligomer chain group A having 3 or more recurring units selected from a polyalkylene oxide oligomer chain group, a polyester oligomer chain group, a polysiloxane chain group and a polyester polyether oligomer chain group, wherein the photochromic compound is represented by the following formula (1):

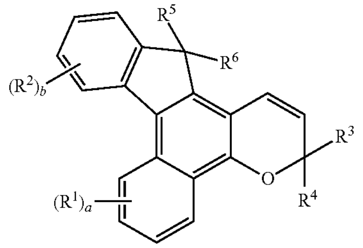

(1)

the compound being a chromene compound having an indenonaphthopyran moiety represented by the formula (1), wherein:

$R^1$ and $R^2$ each independently represent the oligomer chain group A, the alkenyl group having 10 to 30 carbon atoms, a group having an alkenyl group having 10 to 30 carbon atoms at the terminal thereof, a hydroxy group, an alkyl group, a haloalkyl group, a cycloalkyl group optionally having a substituent, an alkoxy group, an amino group, a substituted amino group, a heterocyclic group optionally having a substituent, a cyano group, a halogen atom, an alkylthio group, an arylthio group optionally having a substituent, a nitro group, a formyl group, a hydroxycarbonyl group, an alkylcarbonyl group, an alkoxycarbonyl group, an aralkyl group optionally having a substituent, an aralkoxy group optionally having a substituent, an aryloxy group optionally having a substituent, an aryl group optionally having a substituent, a heteroaryl group optionally having a substituent, a thiol group, an alkoxyalkylthio group, a haloalkylthio group, or a cycloalkylthio group optionally having a substituent;

a represents an integer of 0 to 4, and b represents an integer of 0 to 4, when a is 2 to 4, plural $R^1$'s may be the same or different, when b is 2 to 4, plural $R^2$'s may be the same or different, when a is 2 to 4 and when the compound has neighboring $R^1$'s, the neighboring $R^1$'s may form together and along with the carbon atoms bonding to these $R^1$'s, a ring optionally containing an oxygen atom, a carbon atom, a sulfur atom, or a nitrogen atom, and further the ring may have a substituent;

when b is 2 to 4 and when the compound has neighboring $R^2$'s, the neighboring $R^2$'s may form together and along with the carbon atoms bonding to these $R^2$'s, a ring optionally containing an oxygen atom, a carbon atom, a sulfur atom, or a nitrogen atom, and further the ring may have a substituent;

$R^3$ and $R^4$ each independently represent an aryl group optionally having a substituent, or a heteroaryl group optionally having a substituent;

$R^5$ and $R^6$ each independently represent the alkenyl group having 10 to 30 carbon atoms, the oligomer chain group A, a group having an alkenyl group having 10 to 30 carbon atoms at the terminal thereof, a hydrogen atom, a hydroxy group, an alkyl group, a haloalkyl group, a cycloalkyl group, an alkoxy group, an alkoxyalkyl group, a formyl group, a hydroxycarbonyl group, an alkylcarbonyl group, an alkoxycarbonyl group, a halogen atom, an aralkyl group optionally having a substituent, an aralkoxy group optionally having a substituent, an aryloxy group optionally having a substituent, an aryl group optionally having a substituent, or a heterocyclic group optionally having a substituent;

$R^5$ and $R^6$ may together form, along with the 13-positioned carbon atom in the indenonaphthopyran moiety to which they bond, an aliphatic ring having 3 to 20 ring carbon atoms, a condensed polycyclic ring formed by condensation of the aliphatic ring with an aromatic ring or an aromatic hetero ring, a hetero ring having 3 to 20 ring atoms, or a condensed polycyclic ring formed by condensation of the hetero ring with an aromatic ring or an aromatic hetero ring, and these rings may have a substituent, or also they may form, along with the 13-positioned carbon atom in the indenonaphthopyran moiety to which they bond, an aliphatic hydrocarbon ring having 3 to 20 ring carbon atoms, a condensed polycyclic ring formed by condensation of the aliphatic hydrocarbon ring with an aromatic ring or an aromatic hetero ring, a hetero ring having 3 to 20 ring atoms, or a condensed polycyclic ring formed by condensation of the hetero ring with an aromatic hydrocarbon ring or an aromatic hetero ring;

the substituent of the group optionally having a substituent may be a group having an alkenyl group having 10 to 30 carbon atoms at the terminal thereof, an alkenyl group having 10 to 30 carbon atoms, or the oligomer chain group A, or, the substituent of the group optionally having a substituent may be the alkenyl group having 10 to 30 carbon atoms or a group having an alkenyl group having 10 to 30 carbon atoms at the terminal thereof in such a manner that the number of the alkenyl group having 10 to 30 carbon atoms can be 1 to 12 per one oligomer chain group A contained in one molecule.

2. The photochromic compound according to claim 1, wherein $R^5$ and $R^6$ may together form, along with the 13-positioned carbon atom in the indenonaphthopyran moiety to which they bond, an aliphatic ring having 3 to 20 ring carbon atoms, a condensed polycyclic ring formed by condensation of the aliphatic ring with an aromatic ring or an aromatic hetero ring, a hetero ring having 3 to 20 ring atoms, or a condensed polycyclic ring formed by condensation of the hetero ring with an aromatic ring or an aromatic hetero ring; and these rings may have a substituent;

the substituent may be the oligomer chain group A, the alkenyl group having 10 to 30 carbon atoms, or a group having an alkenyl group having 10 to 30 carbon atoms at the terminal thereof.

3. The photochromic compound according to claim 1, represented by the following formula (2):

(2)

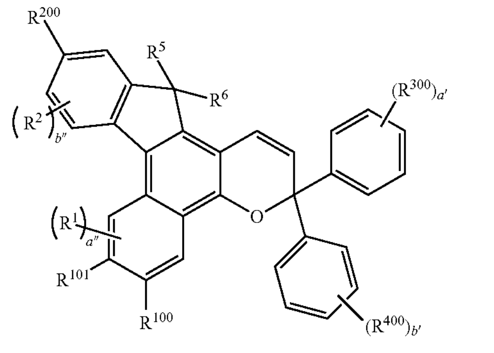

wherein:

$R^1$, $R^2$, $R^5$, and $R^6$ have the same meanings as those in the formula (1);

a" represents an integer of 0 to 2, and b" represents an integer of 0 to 3, when a" is 2, plural $R^1$'s may be the same as or different from each other;

when b" is 2 or 3, plural $R^2$'s may be the same as or different from each other, $R^{100}$ and $R^{101}$ each independently represent the oligomer chain group A, the alkenyl group having 10 to 30 carbon atoms, a group having an alkenyl group having 10 to 30 carbon atoms at the terminal thereof, a hydrogen atom, a hydroxy group, an alkyl group having 1 to 6 carbon atoms, a haloalkyl group having 1 to 6 carbon atoms, a cycloalkyl group having 3 to 8 carbon atoms, an alkoxy group having 1 to 6 carbon atoms, an amino group, a substituted amino group, a heterocyclic group optionally having a substituent, a cyano group, a halogen atom, an alkylthio group having 1 to 6 carbon atoms, an arylthio group having 6 to 10 carbon atoms and optionally having a substituent, a nitro group, a formyl group, a hydroxycarbonyl group, an alkylcarbonyl group having 2 to 7 carbon atoms, an alkoxycarbonyl group having 2 to 7 carbon atoms, an aralkyl group having 7 to 11 carbon atoms and optionally having a substituent, an aralkoxy group having 7 to 11 carbon atoms and optionally having a substituent, an aryloxy group having 6 to 12 carbon atoms and optionally having a substituent, an aryl group having 6 to 12 carbon atoms and optionally having a substituent, a heteroaryl group having 3 to 12 carbon atoms and optionally having a substituent, a thiol group, an alkoxyalkylthio group having 2 to 9 carbon atoms, a haloalkylthio group having 1 to 6 carbon atoms, or a cycloalkylthio group having 3 to 8 carbon atoms;

$R^{100}$ and $R^{101}$ may together form a ring represented by the following formula (3):

(3)

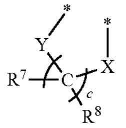

wherein * indicates the 6-position or 7-position carbon atom of the indenonaphthopyran moiety;

one or both of X and Y are a sulfur atom, a methylene group, an oxygen atom or a group represented by the following formula (4):

(4)

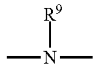

wherein:

$R^9$ represents the alkenyl group having 10 to 30 carbon atoms, the oligomer chain group A, a group having an alkenyl group having 10 to 30 carbon atoms at the terminal thereof, a hydrogen atom, a hydroxy group, an alkyl group having 1 to 6 carbon atoms, a haloalkyl group having 1 to 6 carbon atoms, a cycloalkyl group having 3 to 8 carbon atoms, an alkoxy group having 1 to 6 carbon atoms, an aryl group having 6 to 12 carbon atoms and optionally having a substituent, or a heteroaryl group having 3 to 12 carbon atoms and optionally having a substituent;

$R^7$ and $R^8$ each independently represent the alkenyl group having 10 to 30 carbon atoms, the oligomer chain group A, a group having an alkenyl group having 10 to 30 carbon atoms at the terminal thereof, a hydroxy group, an alkyl group having 1 to 6 carbon atoms, a haloalkyl group having 1 to 6 carbon atoms, a cycloalkyl group having 3 to 8 carbon atoms, an alkoxy group having 1 to 6 carbon atoms, an amino group, a substituted amino group, a heterocyclic group optionally having a substituent, a cyano group, a nitro group, a formyl group, a hydroxycarbonyl group, an alkylcarbonyl group having 2 to 7 carbon atoms, an alkoxycarbonyl group having 2 to 7 carbon atoms, a halogen atom, an aralkyl group having 7 to 11 carbon atoms and optionally having a substituent, an aralkoxy group having 7 to 11 carbon atoms and optionally having a substituent, an aryl group having 6 to 12 carbon atoms and optionally having a substituent, a thiol group, an alkylthio group having 1 to 6 carbon atoms, an alkoxyalkylthio group having 2 to 9 carbon atoms, a haloalkylthio group having 1 to 6 carbon atoms, a cycloalkylthio group having 3 to 8 carbon atoms, or an arylthio group having 6 to 10 carbon atoms and optionally having a substituent;

$R^7$ and $R^8$ may form, along with the carbon atom to which they bond, an aliphatic ring optionally having a substituent; c represents an integer of 1 to 3;

$R^{200}$ represents the oligomer chain group A, the alkenyl group having 10 to 30 carbon atoms, a group having an alkenyl group having 10 to 30 carbon atoms at the terminal thereof, a hydrogen atom, a hydroxy group, an alkyl group having 1 to 6 carbon atoms, a haloalkyl group having 1 to 6 carbon atoms, a cycloalkyl group having 3 to 8 carbon atoms, an alkoxy group having 1 to 6 carbon atoms, an amino group, a substituted amino group, a heterocyclic group optionally having a substituent, a cyano group, a nitro group, a formyl group, a hydroxycarbonyl group, an alkylcarbonyl group having 2 to 7 carbon atoms, an alkoxycarbonyl group having 2 to 7 carbon atoms, a halogen atom, an aralkyl group having 7 to 11 carbon atoms and optionally having a substituent, an aralkoxy group having 7 to 11 carbon atoms and optionally having a substituent, an aryl group having 6 to 12 carbon atoms and optionally having a substituent, a thiol group, an alkylthio group having 1 to 6 carbon atoms, an alkoxyalkylthio group having 2 to 9 carbon atoms, a haloalkylthio group having 1 to 6 carbon atoms, a cycloalkylthio group having 3 to 8 carbon atoms, or an arylthio group having 6 to 10 carbon atoms and optionally having a substituent;

$R^{300}$ and $R^{400}$ each independently represent the oligomer chain group A, the alkenyl group having 10 to 30 carbon atoms, a group having an alkenyl group having 10 to 30 carbon atoms at the terminal thereof, a hydroxy group, an alkyl group having 1 to 6 carbon atoms, a haloalkyl group having 1 to 6 carbon atoms, a cycloalkyl group having 3 to 8 carbon atoms, an alkoxy group having 1 to 6 carbon atoms, an amino group, a substituted amino group, a heterocyclic group optionally having a substituent, a cyano group, a halogen atom, an alkylthio group having 1 to 6 carbon atoms, or an arylthio group having 6 to 10 carbon atoms and optionally having a substituent;

a' represents an integer of 0 to 5, and when a' is 2 or more, $R^{300}$'s may be the same as or different from each other;

b' represents an integer of 0 to 5, and when b' is 2 or more, $R^{400}$'s may be the same as or different from each other;

the substituent of the group optionally having a substituent may be a group having an alkenyl group having 10 to 30 carbon atoms at the terminal thereof, or the oligomer chain group A;

or, the substituent of the group optionally having a substituent may be the alkenyl group having 10 to 30 carbon atoms or a group having an alkenyl group having 10 to 30 carbon atoms at the terminal thereof in such a manner that the number of the alkenyl group having 10 to 30 carbon atoms can be 1 to 12 per one oligomer chain group A contained in one molecule.

4. The photochromic compound according to claim 1, wherein:

the oligomer chain group A comprises formulae (5a) to (5d), or a combination of these groups:

(5a)

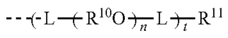

-continued (5b)

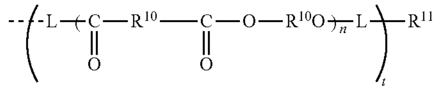

(5c)

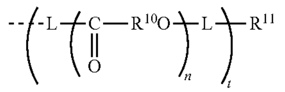

(5d)

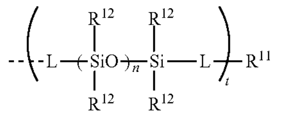

wherein:

$R^{10}$ represents a linear or branched alkylene group having 1 to 20 carbon atoms, and when the compound has plural $R^{10}$'s in one molecule, $R^{10}$'s may be the same or different;

n indicates the recurring unit of the oligomer chain group A, and is an integer of 3 to 200, the divalent groups in plural recurring units may be the same as or different from each other;

L represents a divalent bonding group, and is a group represented by the following formula (6):

(6)

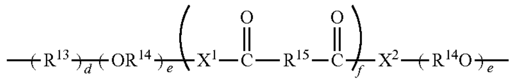

wherein:

$R^{13}$ represents a divalent group, and is a linear or branched alkylene group having 1 to 20 carbon atoms, a cycloalkylene group having 3 to 12 ring carbon atoms and optionally having a substituent, an arylene group having 6 to 12 ring carbon atoms and optionally having a substituent, or a heterocyclic group having 3 to 12 ring atoms and optionally having a substituent; $R^{14}$ represents a divalent group, and is a linear or branched alkylene group having 1 to 20 carbon atoms, a cycloalkylene group having 3 to 12 ring carbon atoms and optionally having a substituent, or an arylene group having 6 to 12 ring carbon atoms and optionally having a substituent;

$R^{15}$ represents a divalent group, and is a linear or branched alkylene group having 1 to 20 carbon atoms, a cycloalkylene group having 3 to 12 ring carbon atoms and optionally having a substituent, or an arylene group having 6 to 12 ring carbon atoms and optionally having a substituent:

$X^1$ and $X^2$ each represent a divalent group, and is independently a direct bond, O, S, an amino group, a substituted amino group, a (thio)amide group, or a (thio)ester group;

d represents an integer of 0 to 50, e represents an integer of 0 to 50, f represents an integer of 0 to 50;

when d is 2 or more, plural $R^{13}$ may be the same as or different from each other, when e is 2 or more, plural divalent groups of the unit of e may be the same as or different from each other, when f is 2 or more, plural divalent groups of the unit of f may be the same as or different from each other;

the substituent of the group optionally having a substituent may be the alkenyl group having 10 to 30 carbon atoms, or a group having an alkenyl group having 10 to 30 carbon atoms at the terminal thereof;

plural L's may be the same as or different from each other;

the broken line indicates a bond to the indenonaphthopyran moiety;

t indicates the number of the oligomer chain groups A, and is an integer of 1 to 10;

when t is 1, $R^{11}$ is an alkenyl group having 10 to 30 carbon atoms, a hydrogen atom, or an alkyl group having 1 to 20 carbon atoms;

when t is 2, $R^{11}$ is a bond, or a divalent organic residue;

when t is 3 to 10, $R^{11}$'s each are an organic residue having the same valence as the number t;

and wherein $R^{12}$ in the formula (5d) represents a linear or branched alkyl group having 1 to 20 carbon atoms, or an aryl group having 6 to 14 carbon atoms, and when the compound has plural $R^{12}$'s in one molecule, $R^{12}$'s may be the same or different.

5. The photochromic compound according to claim 4, wherein the bonding group L that bonds to the indenonaphthopyran moiety comprises,

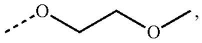,
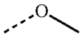,

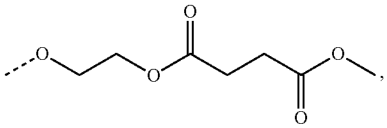,

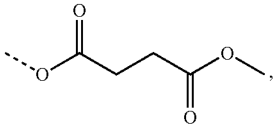,

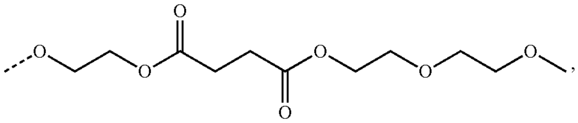,

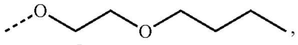, or

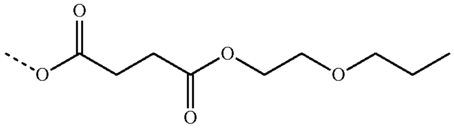

wherein the broken line indicates bonding to the indenonaphthopyran moiety.

6. The photochromic compound according to any of claim 1, having a group to form an aliphatic hydrocarbon ring along with the 13-position carbon atom of the indenonaphthopyran moiety, wherein the group to form an aliphatic hydrocarbon ring is a ring selected from:

a cyclopentane ring, a cyclohexane ring, a cycloheptane ring, a cyclooctane ring, a cyclononane ring, a cyclodecane ring, a cycloundecane ring, a cyclododecane ring and a spirodicyclohexane ring, and the group to form the aliphatic hydrocarbon ring may have 1 to 10 substituents of an alkyl group having 1 to 3 carbon atoms or a cycloalkyl group having 5 to 7 carbon atoms, or the group to form the aliphatic hydrocarbon ring may be a group of a condensed ring with a cycloalkyl group having 5 to 7 carbon atoms.

7. The photochromic compound according to claim 1, wherein the alkenyl group having 10 to 30 carbon atoms or a group having the alkenyl group having 10 to 30 carbon atoms at the terminal thereof, and the oligomer chain group A exist at different substitution positions of the indenonaphthopyran moiety.

8. A photochromic curable composition comprising the photochromic compound of claim 1 and a polymerizable compound.

9. The photochromic curable composition according to claim 8, wherein the polymerizable compound contains:

(A) a polyiso(thio)cyanate compound having 2 or more iso(thio)cyanate groups in the molecule, (B) a polyfunctional compound having 2 or more active hydrogens in one molecule, and (C) a monofunctional compound having one active hydrogen in one molecule, and wherein:

the amount of the component (C) is 1 to 2000 mol per mol of the oligomer chain group A in the photochromic compound.

10. The photochromic curable composition according to claim 9, wherein:

when the total molar number of the iso(thio)cyanate group in the component (A) is represented by n1, the total molar number of the active hydrogen in the component (B) is represented by n2, and the total molar number of the active hydrogen in the component (C) is represented by n3, n1/(n2+n3)=(0.9 to 1.5)/1, and n2/n3=(1 to 300)/1.

11. A photochromic optical article produced by polymerizing the photochromic curable composition of claim 8.

12. A polymeric molded article containing the photochromic compound of claim 1 dispersed therein.

13. An optical article coated with a polymeric film containing the photochromic compound of claim 1 dispersed therein.

* * * * *